US012006174B2

(12) United States Patent
Takeuchi et al.

(10) Patent No.: US 12,006,174 B2
(45) Date of Patent: Jun. 11, 2024

(54) SHEET CONVEYANCE APPARATUS AND IMAGE FORMING APPARATUS

(71) Applicant: CANON KABUSHIKI KAISHA, Tokyo (JP)

(72) Inventors: Masaaki Takeuchi, Tokyo (JP); Yusuke Niikawa, Kanagawa (JP); Hiroki Yamaguchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 17/690,463

(22) Filed: Mar. 9, 2022

(65) Prior Publication Data

US 2022/0297965 A1 Sep. 22, 2022

(30) Foreign Application Priority Data

Mar. 17, 2021 (JP) ................................ 2021-043044

(51) Int. Cl.
*B65H 5/36* (2006.01)
*B65H 15/00* (2006.01)
*G03G 15/00* (2006.01)

(52) U.S. Cl.
CPC ............ *B65H 15/004* (2020.08); *B65H 5/36* (2013.01); *G03G 15/6529* (2013.01); *B65H 2301/33312* (2013.01); *B65H 2404/16* (2013.01)

(58) Field of Classification Search
CPC ...... G03G 15/6529; B65H 5/36; B65H 29/58; B65H 29/60; B65H 85/00; B65H 2301/33312; B65H 2403/70; B65H 2403/72; B65H 2404/16; B65H 2404/63
USPC ........................................................ 271/184
See application file for complete search history.

(56) References Cited

U.S. PATENT DOCUMENTS 7,431,293 B2 * 10/2008 Carter .................... B65H 29/58 271/225
7,918,451 B2 * 4/2011 Honda .................. G03G 15/50 271/225
8,613,445 B2 * 12/2013 Nishii .................... B65H 9/006 271/69
8,919,761 B2 * 12/2014 Morinaga ........... B65H 3/0684 271/10.04
9,296,585 B2 * 3/2016 Yamada ................. B65H 29/58
9,511,972 B1 * 12/2016 Ouchi ................. H04N 1/0057
(Continued)

FOREIGN PATENT DOCUMENTS

JP 2012140201 A 7/2012
JP 2015098399 A 5/2015
(Continued)

*Primary Examiner* — Leslie A Nicholson, III
(74) *Attorney, Agent, or Firm* — ROSSI, KIMMS & McDOWELL LLP

(57) ABSTRACT

A sheet conveyance apparatus includes a conveyance section, the conveyance section including a roller rotatable in a first rotation direction and a second rotation direction, a guide member configured to move between a first position and a second position, a drive source, a drive switching unit including an input unit, an output unit, and a switching unit, a drive interruption unit configured to transition between a transmission state and a non-transmission state. The roller is configured to rotate by the driving force output from the output unit of the drive switching unit while the guide member moves between the first position and the second position.

19 Claims, 31 Drawing Sheets

(56) References Cited

U.S. PATENT DOCUMENTS

| | | | | |
|---|---|---|---|---|
| 9,656,819 | B2 | 5/2017 | Yamada | |
| 10,462,317 | B2 | 10/2019 | Kawata | |
| 10,556,762 | B2 * | 2/2020 | Ogata | G03G 15/6511 |
| 10,703,594 | B2 * | 7/2020 | Furusawa | B65H 29/52 |
| 10,996,610 | B2 * | 5/2021 | Kurita | G03G 15/234 |
| 2015/0084264 | A1 * | 3/2015 | Hino | B65H 3/0684 271/3.18 |
| 2015/0108715 | A1 * | 4/2015 | Yamada | G03G 21/1647 74/52 |
| 2020/0201234 | A1 * | 6/2020 | Kurita | G03G 15/6579 |

FOREIGN PATENT DOCUMENTS

| | | | |
|---|---|---|---|
| JP | 2019163131 | A | 9/2019 |
| JP | 2020050491 | A | 4/2020 |

* cited by examiner

FIG.7A
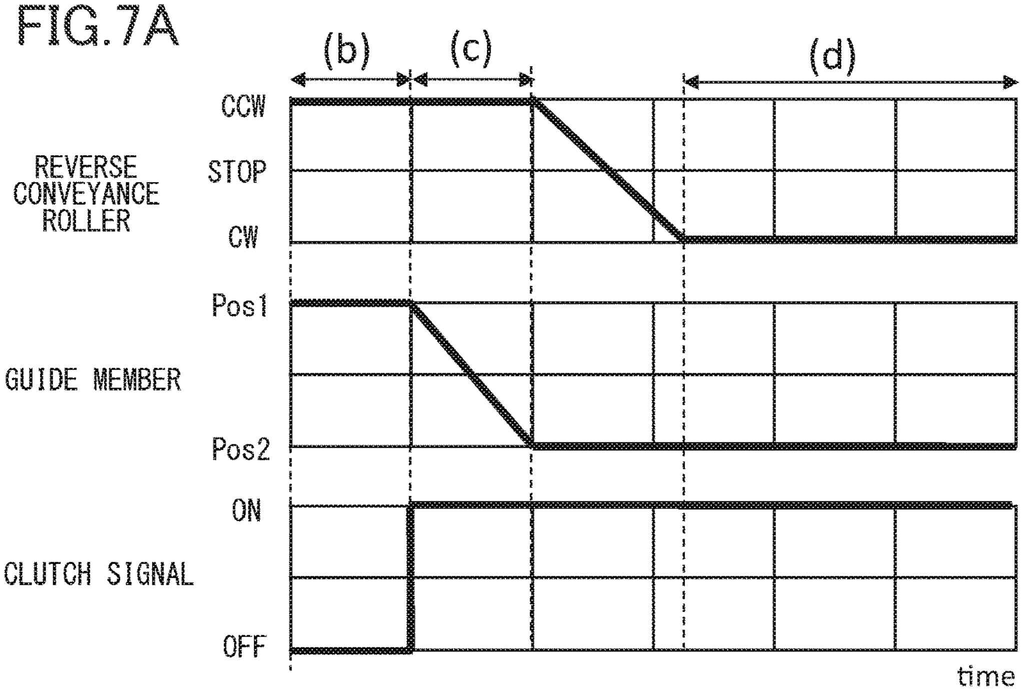
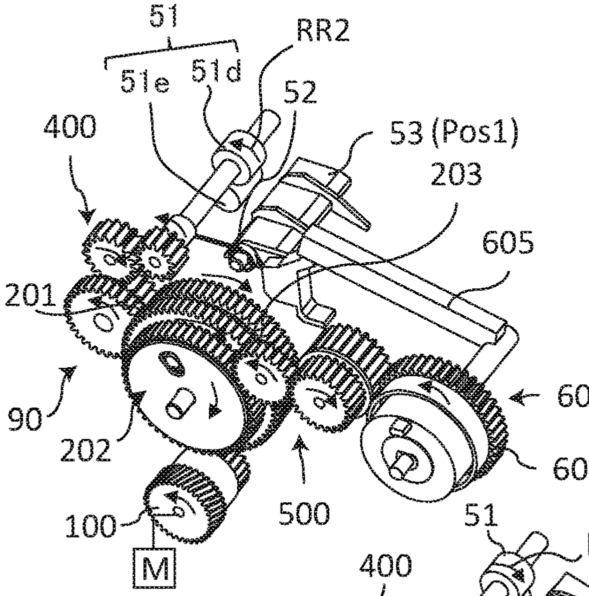
FIG.7B
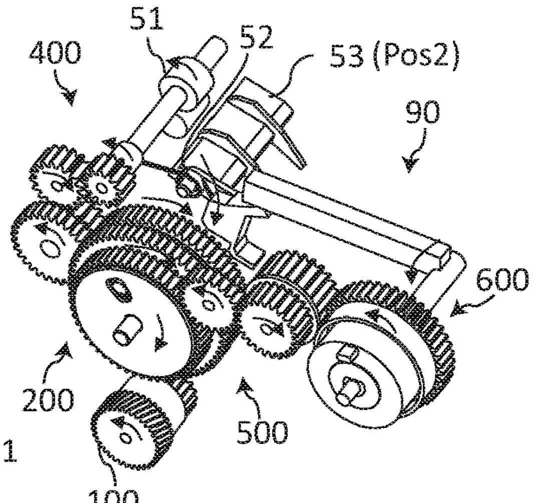
FIG.7C
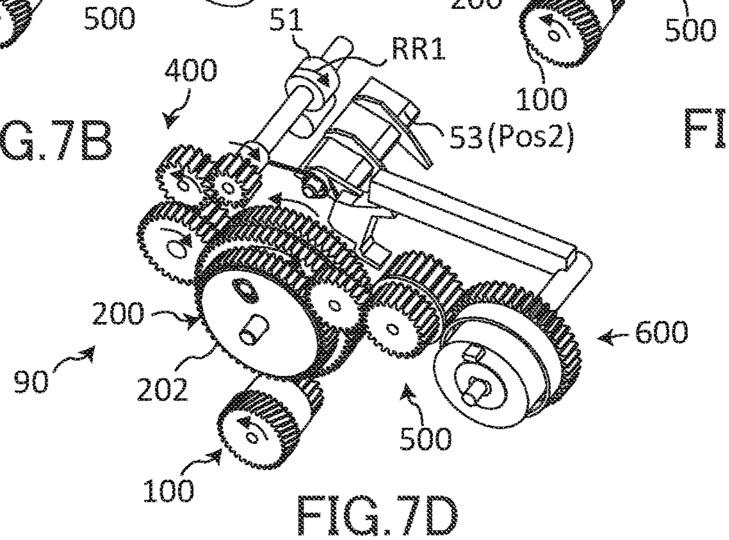
FIG.7D

SHEET CONVEYANCE APPARATUS AND IMAGE FORMING APPARATUS

BACKGROUND OF THE INVENTION

Field of the Invention

The present invention relates to a sheet conveyance apparatus which conveys a sheet and an image forming apparatus including the same.

Description of the Related Art

In general, in an image forming apparatus that forms images on both surfaces of a sheet, when image formation of the first surface is completed, the sheet is switched back and conveyed to a duplex conveyance path for re-conveyance to an image forming unit. In this case, the sheet is reliably conveyed to the duplex conveyance path using a moving member capable of switching a conveyance path of the sheet. Recently, it is desired to increase a printing speed at the time of duplex printing of an image forming apparatus to improve productivity.

Japanese Patent Laid-Open No. 2015-98399 proposes a printer including an input gear, a planetary gear mechanism to which a driving force is input from the input gear, and a moving member and a discharge reverse conveyance roller which are driven by the driving force output from the planetary gear mechanism. A rotation direction of the input gear is switched by a drive motor and a solenoid. The moving member can switch a conveyance path of the sheet by moving between a first guiding position and a second guiding position, and the discharge reverse conveyance roller switches back the sheet by rotating forward and backward.

However, in the printer described in Japanese Patent Laid-Open No. 2015-98399, when the rotation direction of the input gear is switched, the moving member moves between the first guiding position and the second guiding position, but the driving force is not input to the discharge reverse conveyance roller while the moving member is moving. That is, the rotation direction of the discharge reverse conveyance roller is switched only after the movement of the moving member is completed, and it takes time to switch the rotation direction. For this reason, productivity has been reduced.

SUMMARY OF THE INVENTION

According to an aspect of the present invention, a sheet conveyance apparatus includes a conveyance section configured to convey a sheet, the conveyance section including a roller rotatable in a first rotation direction and a second rotation direction opposite to the first rotation direction, a guide member configured to guide the sheet and to move between a first position and a second position different from the first position, a drive source, a drive switching unit including an input unit to which a driving force is input from the drive source, an output unit configured to output the driving force to the roller, and a switching unit, the switching unit, in a first state, outputting the driving force transmitted from the input unit to the output unit such that the roller rotates in the second rotation direction, the switching unit, in a second state different from the first state, outputting the driving force transmitted from the input unit to the output unit such that the roller rotates in the first rotation direction, a drive interruption unit configured to transition between a transmission state in which the driving force transmitted from the switching unit is transmitted to the guide member and a non-transmission state in which the driving force is not transmitted to the guide member. The roller is configured to rotate by the driving force output from the output unit of the drive switching unit while the guide member moves between the first position and the second position.

Further features of the present invention will become apparent from the following description of exemplary embodiments with reference to the attached drawings.

BRIEF DESCRIPTION OF THE DRAWINGS

FIG. 7A is a timing chart illustrating operation timings of a reverse conveyance roller, a guide member, and a clutch signal.

FIG. 7B is a perspective view illustrating the drive mechanism in a period (b) of FIG. 7A.

FIG. 7C is a perspective view illustrating the drive mechanism in a period (c) of FIG. 7A.

FIG. 7D is a perspective view illustrating the drive mechanism in a period (d) of FIG. 7A.

DESCRIPTION OF THE EMBODIMENTS

First Embodiment

Overall Configuration

First, a first embodiment of the present invention will be described. A printer 1 serving as an image forming apparatus is an electrophotographic laser beam printer that forms a monochrome toner image. In the following description, a sheet S is a sheet on which an image is formed by the printer 1, and includes, for example, paper, an OHT sheet, and the like.

Figure 1:
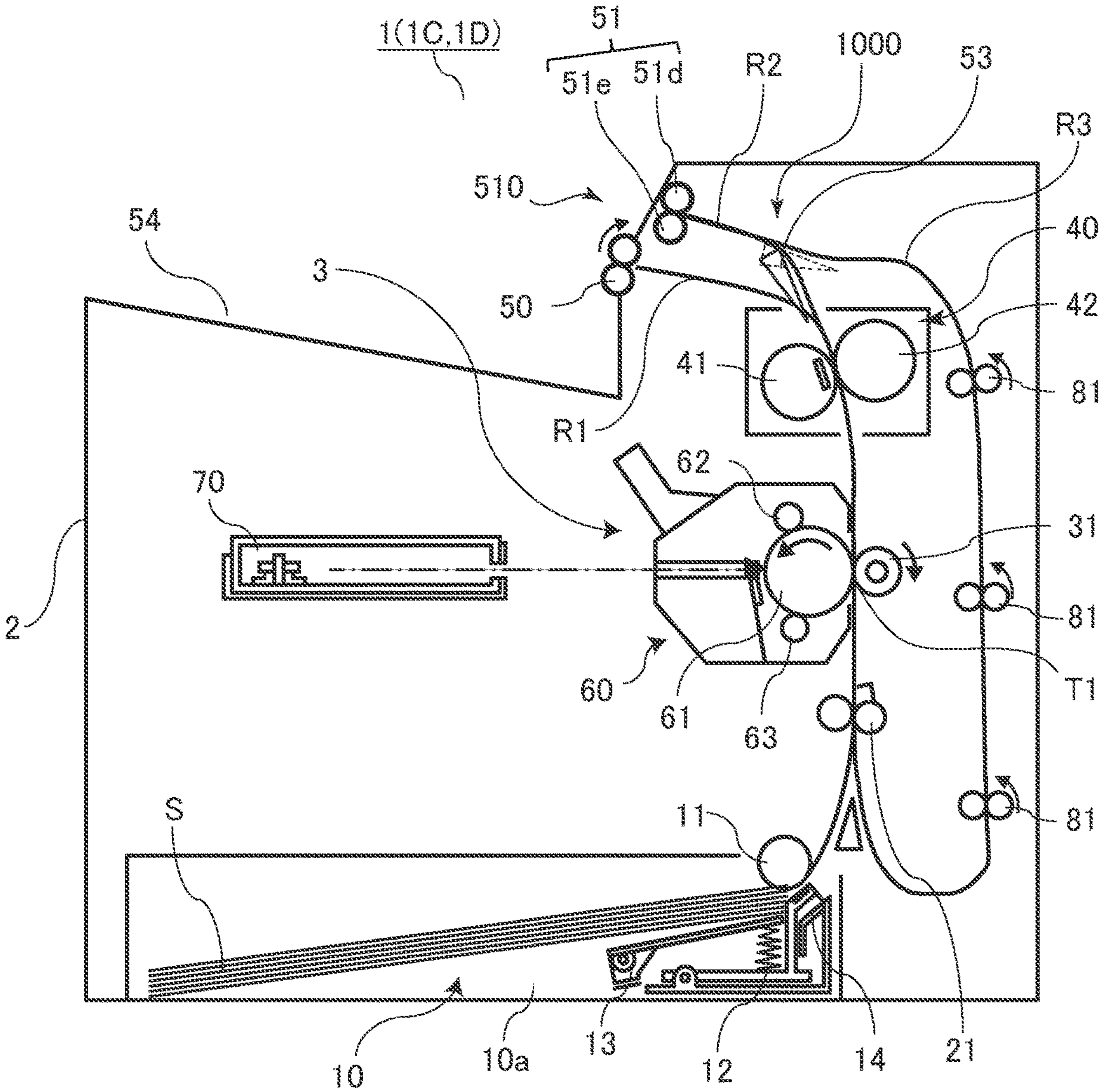
FIG. 1 is an overall schematic view illustrating a printer according to a first embodiment.

As illustrated in FIG. 1, the printer 1 includes a feeding unit 10 that feeds a stacked sheet S, an image forming unit 3 that forms an image on the sheet S, and a fixing unit 40 that fixes the image transferred to the sheet S. Further, the printer 1 includes a sheet discharge roller pair 50 capable of discharging the sheet S to a sheet discharge tray 54, and a reverse conveyance roller pair 51 that switches back the sheet S and conveys the sheet S to a duplex conveyance path R3. The sheet discharge roller pair 50 and the reverse conveyance roller pair 51 constitute a conveyance section 510. The conveyance section 510, a guide member 53, and a drive mechanism 90 to be described later constitute a sheet conveyance apparatus 1000. The reverse conveyance roller pair 51 includes a driving roller 51*d* serving as a roller and a driven roller 51*e* that rotates following the driving roller 51*d*.

When an image forming job is output to the printer 1, an image forming process by the image forming unit 3 starts based on image information input from an external computer or the like connected to the printer 1. The image forming unit 3 includes a laser scanner 70, a process cartridge 60 having a photosensitive drum 61, and a transfer roller 31. The process cartridge 60 is configured to be detachable from an apparatus body 2. A charging roller 62, a developing roller 63, and the like are provided around the photosensitive drum 61. The photosensitive drum 61 and the transfer roller 31 form a transfer nip T1.

The laser scanner 70 irradiates the photosensitive drum 61 with laser light based on the input image information. In this case, the photosensitive drum 61 is charged in advance by the charging roller 62, and an electrostatic latent image is formed on the photosensitive drum 61 by being irradiated with laser light. Thereafter, the electrostatic latent image is developed by the developing roller 63, and a monochrome toner image is formed on the photosensitive drum 61.

In parallel with the above-described image forming process, the sheet S is fed from the feeding unit 10. The feeding unit 10 includes a cassette 10*a* that can be pulled out and attached to the apparatus body 2 of the printer 1, a middle plate 13 supported by the cassette 10*a* so as to be movable up and down, a coil spring 12 that biases the middle plate 13 upward, a feed roller 11, and a separation pad 14.

When a feeding command stored in the cassette 10*a* is issued, the feed roller 11 starts to rotate. In conjunction with this, the middle plate 13 rotates upward by a biasing force of the coil spring 12, and the sheet S loaded on the middle plate 13 abuts on the feed roller 11. As a result, the sheet S is fed and separated one by one by the separation pad 14.

The cassette 10*a* may not be provided with the middle plate 13 and the coil spring 12, and may be provided with a mechanism for raising and lowering the feed roller 11. Further, a separation roller or a retard roller may be provided instead of the separation pad 14.

The sheet S fed from the feeding unit 10 is subjected to skew correction by a registration roller pair 21, and is conveyed in accordance with the transfer timing at the transfer nip T1. In the sheet S, the toner image on the photosensitive drum 61 is transferred at the transfer nip T1 by the electrostatic load bias applied to the transfer roller 31. The remaining toner remaining on the photosensitive drum 61 is collected by a cleaning blade (not illustrated). Predetermined heat and pressure are applied to the sheet S to which the toner image has been transferred by a fixing film 41 and a pressure roller 42 of the fixing unit 40, and the toner is melted and fixed. A heating member such as a ceramic heater is disposed inside the fixing film 41.

Figure 2A:
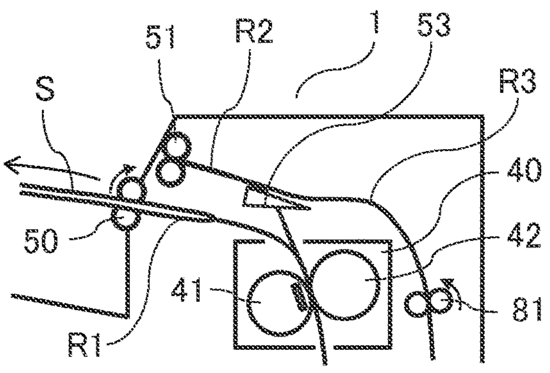
FIG. 2A is a schematic view illustrating conveyance of a sheet in a single-sided printing mode.

In a case of a single-sided printing mode in which an image is formed on only one side of the sheet S, the sheet S on which the toner image is fixed by the fixing unit 40 is guided to a discharge conveyance path R1 by the guide member 53 and discharged to the sheet discharge tray 54 by the sheet discharge roller pair 50 as illustrated in FIG. 2A.

Figure 2B:
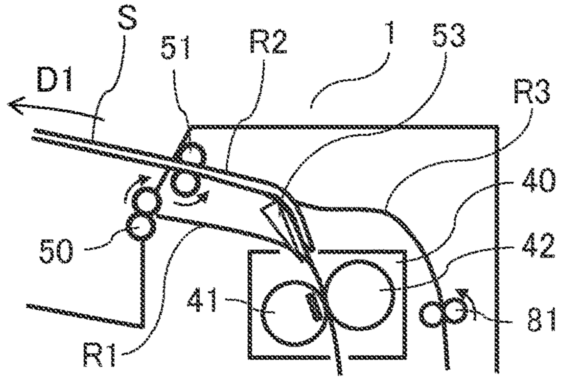
FIG. 2B is a schematic view illustrating conveyance of the sheet in a first direction in a double-sided printing mode.
Figure 2C:
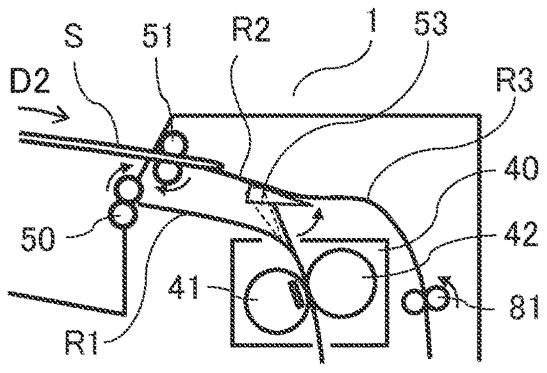
FIG. 2C is a schematic view illustrating a state in which the sheet is switched back from the first direction to the second direction in the double-sided printing mode.
Figure 2D:
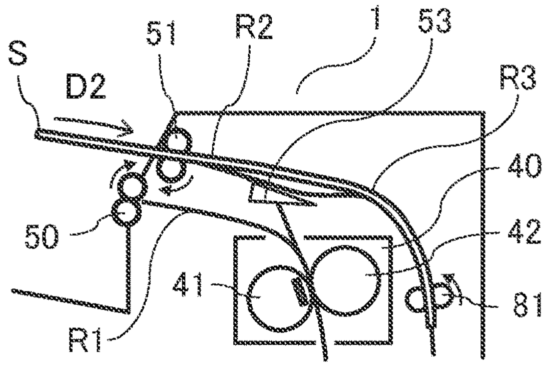
FIG. 2D is a schematic view illustrating a state in which the sheet is conveyed in the second direction in the double-sided printing mode.

In a double-sided printing mode in which images are formed on both sides of the sheet S, the sheet S having an image formed on a first surface is guided to the reverse conveyance path R2 by the guide member 53 as illustrated in FIG. 2B. Then, the sheet S is first conveyed in a first direction D1 by the reverse conveyance roller pair 51, and when a trailing edge of the sheet S passes through the guide member 53, as illustrated in FIG. 2C, the reverse conveyance roller pair 51 is reversed and the guide member 53 moves from a position indicated by a broken line to a position indicated by a solid line. As a result, as illustrated in FIG. 2D, the sheet S is switched back and conveyed in a second direction D2 opposite to the first direction D1, and is guided to a duplex conveyance path R3 by the guide member 53. The first direction D1 is a direction in which the sheet S is directed to the outside of the apparatus, and the second direction D2 is a direction in which the sheet S is directed to the inside of the apparatus.

The sheet S is conveyed on the duplex conveyance path R3 by the conveyance roller pair 81, and is conveyed again to the transfer nip T1 by the registration roller pair 21. Then, an image is formed on a second surface of the sheet S at the transfer nip T1, and the sheet S is discharged to the sheet discharge tray 54 by the sheet discharge roller pair 50.

Drive Mechanism

Figure 3A:
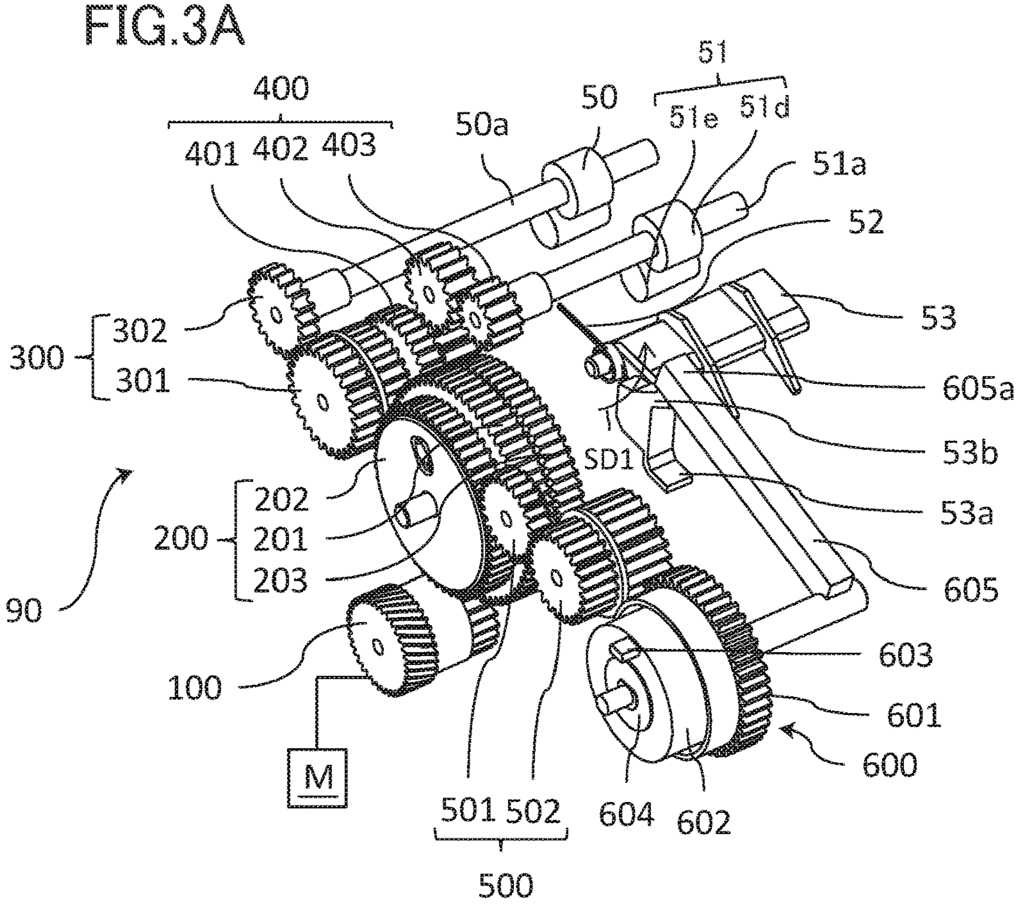
FIG. 3A is a perspective view illustrating a drive mechanism.
Figure 3B:
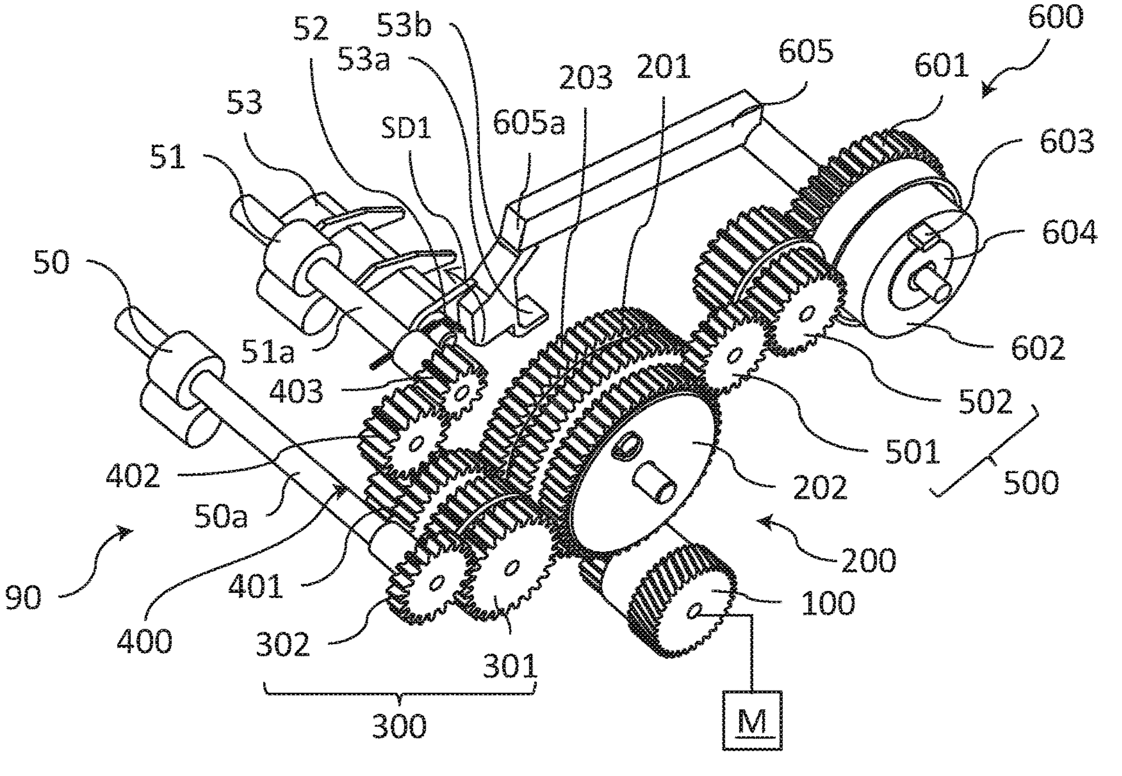
FIG. 3B is another perspective view illustrating the drive mechanism.

Next, the drive mechanism 90 for driving the sheet discharge roller pair 50, the reverse conveyance roller pair 51, and the guide member 53 will be described. As illustrated in FIGS. 3A and 3B, the drive mechanism 90 includes a drive motor M that rotates only in one direction, a discharge reverse conveyance input gear 100, a reverse conveyance unit 200, a discharge drive train 300, a reverse conveyance drive train 400, a clutch drive train 500, and a clutch unit 600.

The discharge reverse conveyance input gear 100 is driven by a drive source, a first drive source, and a drive motor M serving as a motor via a gear train (not illustrated). The reverse conveyance unit 200 is driven by the discharge reverse conveyance input gear 100, and outputs driving forces to the discharge drive train 300, the reverse conveyance drive train 400, and the clutch drive train 500. The sheet discharge roller pair 50 is driven by the driving force transmitted to the discharge drive train 300. The reverse conveyance roller pair 51 is driven by the driving force transmitted to the reverse conveyance drive train 400. The driving force transmitted from the reverse conveyance unit 200 to the clutch drive train 500 is transmitted to the clutch unit 600. The guide member 53 is driven by the driving force transmitted to the clutch unit 600.

Next, the reverse conveyance unit 200, the discharge drive train 300, the reverse conveyance drive train 400, the clutch drive train 500, and the clutch unit 600 will be described in more detail. The reverse conveyance unit 200 includes a reverse conveyance input gear 201, a reverse conveyance switching gear 202, and a reverse conveyance output gear 203. As will be described later, the reverse conveyance unit 200 can output forward rotation or backward rotation (clockwise or counterclockwise rotation) by switching a rotation state of the reverse conveyance switching gear 202.

The discharge drive train 300 includes a discharge stage gear 301 that meshes with the reverse conveyance input gear 201 and a discharge roller gear 302 that meshes with the discharge stage gear 301. The discharge roller gear 302 is fixed to a drive shaft 50*a* of the sheet discharge roller pair 50, and when the discharge roller gear 302 rotates, the sheet discharge roller pair 50 rotates via the drive shaft 50*a*.

The reverse conveyance drive train 400 includes a reverse conveyance stage gear 401 that meshes with the reverse conveyance output gear 203, a reverse conveyance idler gear 402 that meshes with the reverse conveyance stage gear 401, and a reverse conveyance roller gear 403 that meshes with the reverse conveyance idler gear 402. The reverse conveyance roller gear 403 is fixed to the drive shaft 51*a* of the driving roller 51*d* of the reverse conveyance roller pair 51, and when the reverse conveyance roller gear 403 rotates, the reverse conveyance roller pair 51 rotates via the drive shaft 51*a*. The reverse conveyance idler gear 402 is disposed coaxially with the discharge stage gear 301.

The clutch drive train 500 includes a clutch idler gear 501 that meshes with the reverse conveyance switching gear 202 and a clutch stage gear 502 that meshes with the clutch idler gear 501.

The clutch unit 600 includes a clutch input gear 601 meshing with the clutch stage gear 502, a clutch fixing portion 602, a clutch output portion 604, and a guide switching lever 605. The clutch fixing portion 602 is held by fixing a rotation stopper 603. The clutch output portion 604 is connected to the guide switching lever 605.

The clutch unit 600 serving as a drive interruption unit switches a connection state between the clutch input gear 601 and the clutch output portion 604 according to an energized state of the clutch unit 600. That is, when the clutch unit 600 is in a power failure state as a non-transmission state, the clutch input gear 601 and the clutch output portion 604 are not drivingly connected. Meanwhile, when the clutch unit 600 is in the energized state as a transmission state, the clutch input gear 601 and the clutch output portion 604 are drivingly connected.

The guide switching lever 605 rotated integrally with the clutch output portion 604 has a contact portion 605*a* capable of being in contact with a contacted portion 53*b* of the guide member 53. The guide member 53 is biased in a direction of an arrow SD1 by a return spring 52 serving as a biasing unit. The return spring 52 is a torsion coil spring, and has one end in contact with a member (not illustrated) and the other end in contact with the guide member 53 to bias the guide member 53 in the direction of the arrow SD1. The guide member 53 biased by the return spring 52 has an abutment portion 53*a* that abuts on a member (not illustrated). The abutment portion 53*a* abuts on the member (not illustrated), whereby the guide member 53 is held at the first position (position indicated by the broken line in FIG. 1).

When the guide switching lever 605 rotates, the contact portion 605*a* of the guide switching lever 605 presses the abutment portion 53*a* of the guide member 53, and the guide member 53 moves in a direction opposite to the direction of the arrow SD1 against the biasing force of the return spring 52. As a result, the guide member 53 moves from the first position to a second position (position indicated by the solid line in FIG. 1).

That is, the clutch unit 600 can transmit the driving force transmitted from the reverse conveyance switching gear 202 to the guide member 53 in the energized state, and does not transmit the driving force transmitted from the reverse conveyance switching gear 202 to the guide member 53 in the power failure state.

Internal Configuration of Reverse Conveyance Unit

Figure 4A:
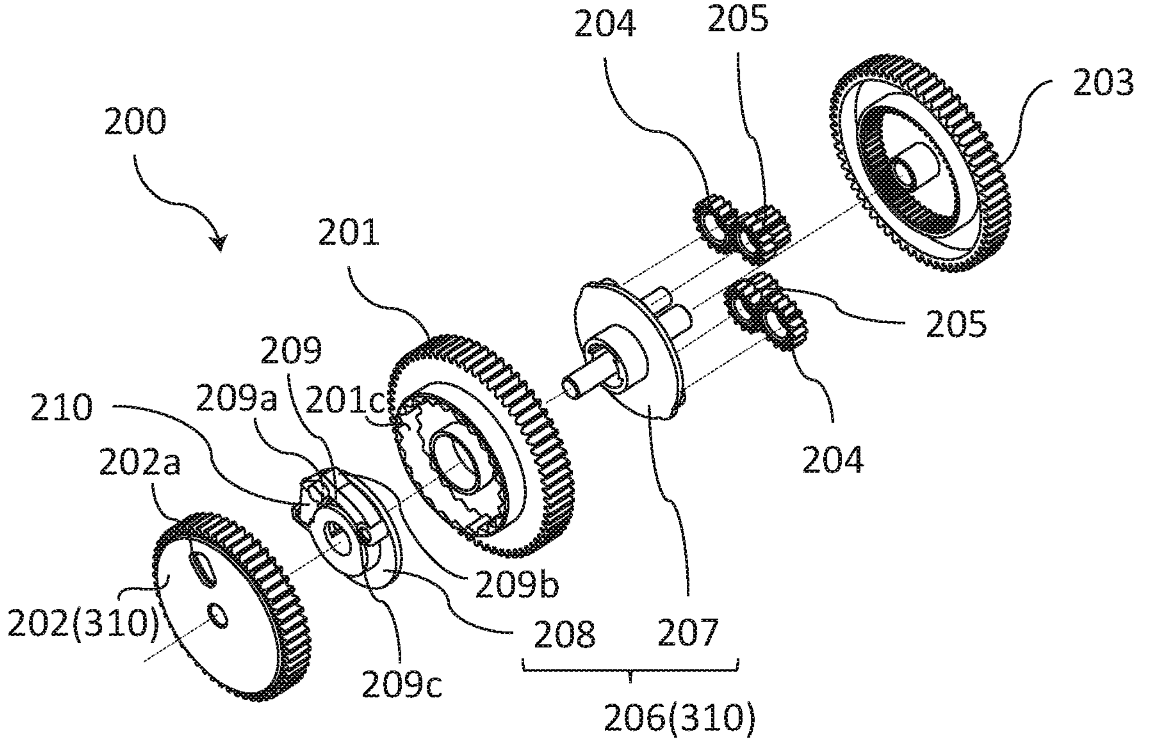
FIG. 4A is an exploded perspective view illustrating a reverse conveyance unit.
Figure 4B:
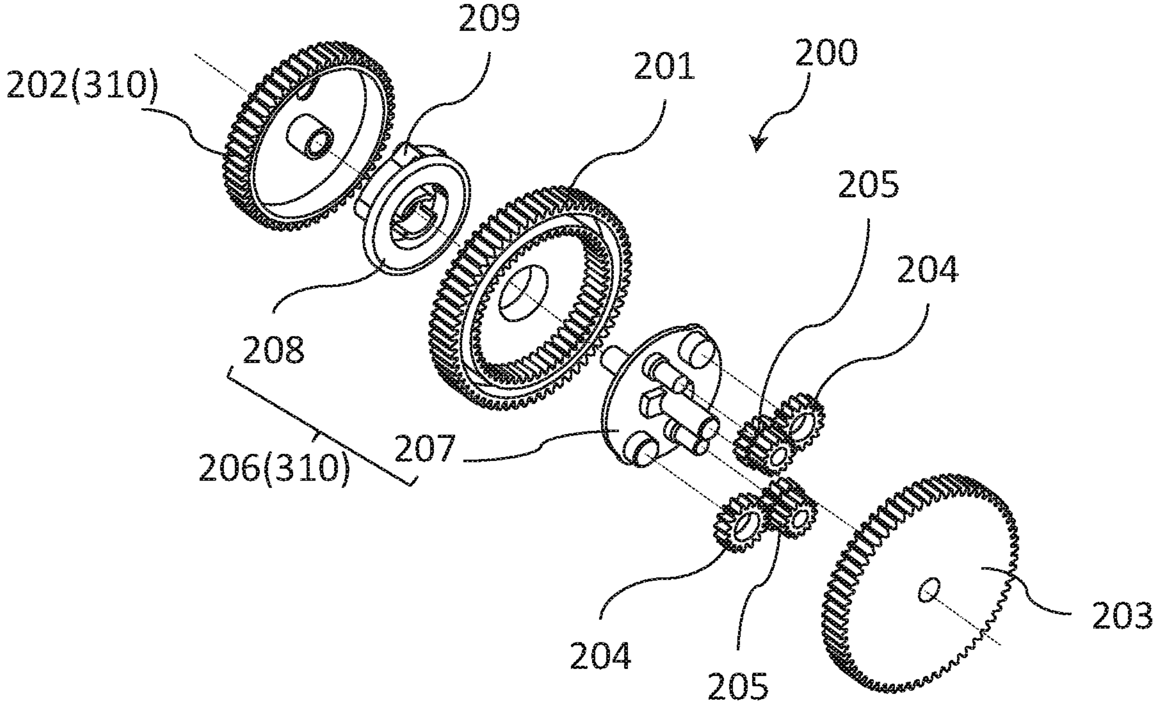
FIG. 4B is another exploded perspective view illustrating the reverse conveyance unit.

Next, an internal configuration of the reverse conveyance unit 200 will be described with reference to FIGS. 4A and 4B. As illustrated in FIGS. 4A and 4B, the reverse conveyance unit 200 serving as a drive switching unit includes the reverse conveyance input gear 201, the reverse conveyance switching gear 202, the reverse conveyance output gear 203, an internal idler gear 204, an internal stage gear 205, and a carrier unit 206. The reverse conveyance input gear 201 serving as an input unit is an input member that rotates by receiving the driving force transmitted from the discharge reverse conveyance input gear 100 described above. The reverse conveyance output gear 203 serving as an output unit is an output member that outputs driving force to the reverse conveyance drive train 400 that rotates the reverse conveyance roller pair 51. The internal idler gear 204 and the internal stage gear 205 are constituted by two symmetrically arranged gear trains, and are drive transmission members for transmitting drive from the reverse conveyance input gear 201 to the reverse conveyance output gear 203.

The carrier unit 206 includes an internal holder 207 and a stopper holder 208, and the internal holder 207 and the stopper holder 208 are connected so as to rotate integrally. The internal holder 207 rotatably supports the reverse conveyance input gear 201, and includes the reverse conveyance switching gear 202, the reverse conveyance output gear 203, the internal idler gear 204, and the rotation shaft of the internal stage gear 205.

The stopper holder 208 holds a locking lever 209 and a pressing spring 210. The locking lever 209 is rotatably supported about a rotation shaft 209*c* with respect to the stopper holder 208. The locking lever 209 includes a protrusion 209*a* engageable with the hole 202*a* formed in the reverse conveyance switching gear 202, and a locking portion 209*b* engageable with a locked portion 201*c* of the reverse conveyance input gear 201. The locking lever 209 is movable between an engagement position where the locking portion 209*b* is engaged with the locked portion 201*c* of the reverse conveyance input gear 201 and a non-engagement position where the locking portion 209*b* is not engaged with the locked portion 201*c*. The reverse conveyance switching gear 202, the carrier unit 206, the locking lever 209, and the pressing spring 210 constitute a switching unit 310 that forward and backward rotates the driving force transmitted from the reverse conveyance input gear 201 according to the state of the reverse conveyance switching gear 202 and outputs the driving force to the reverse conveyance output gear 203.

The pressing spring 210 biases the locking lever 209 toward the engagement position. When the reverse conveyance input gear 201 is locked by the locking lever 209 located at the engagement position, the reverse conveyance input gear 201 and the carrier unit 206 are integrated.

That is, in the first state, the locking lever 209 serving as an engaging member is engaged with the reverse conveyance input gear 201, and thus, the switching unit 310 rotates integrally with the reverse conveyance input gear 201. In the switching unit 310, the locking lever 209 is separated from the reverse conveyance input gear 201 in the second state. The reverse conveyance switching gear 202 is configured to control the operation of the locking lever 209 according to its own rotation state.

Figure 5A:
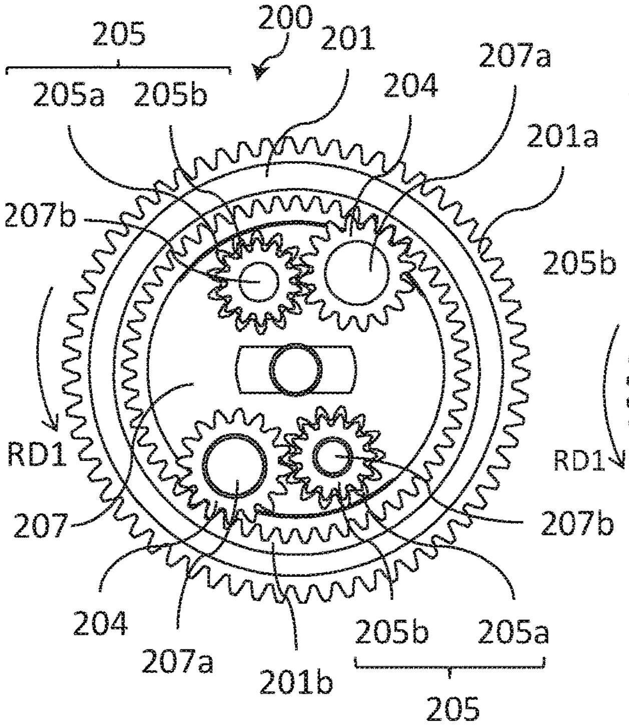
FIG. 5A is a rear view illustrating the reverse conveyance unit.
Figure 5B:
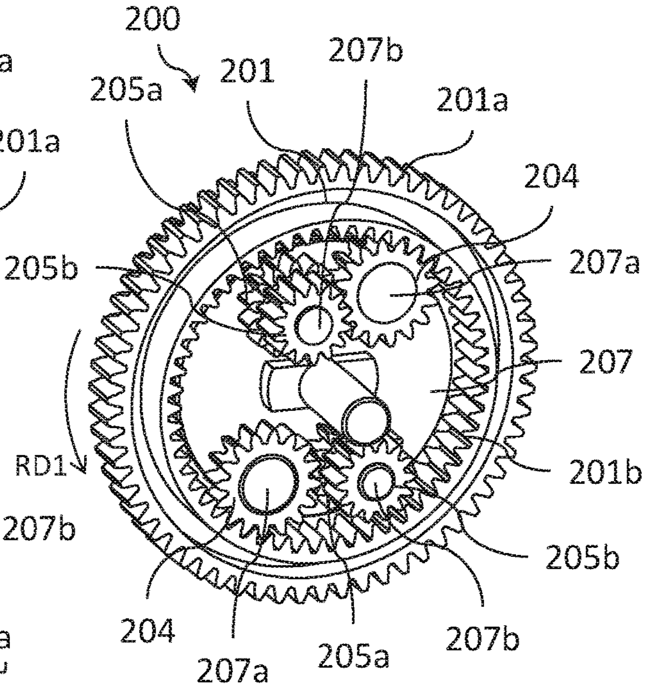
FIG. 5B is a perspective view illustrating the reverse conveyance unit.
Figure 5C:
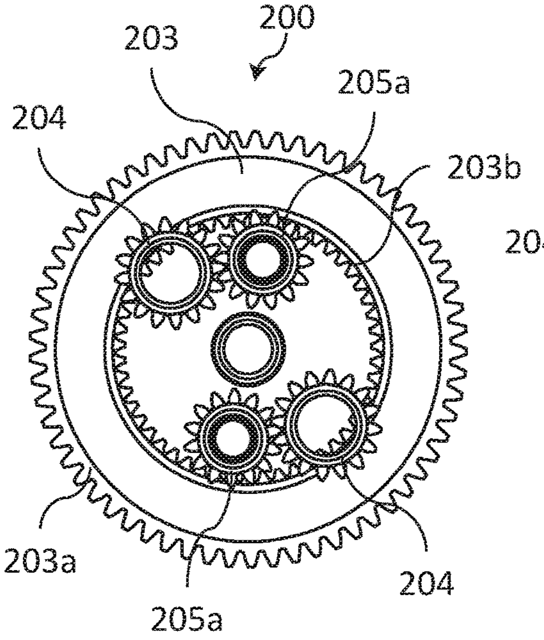
FIG. 5C is a front view illustrating the reverse conveyance unit.
Figure 5D:
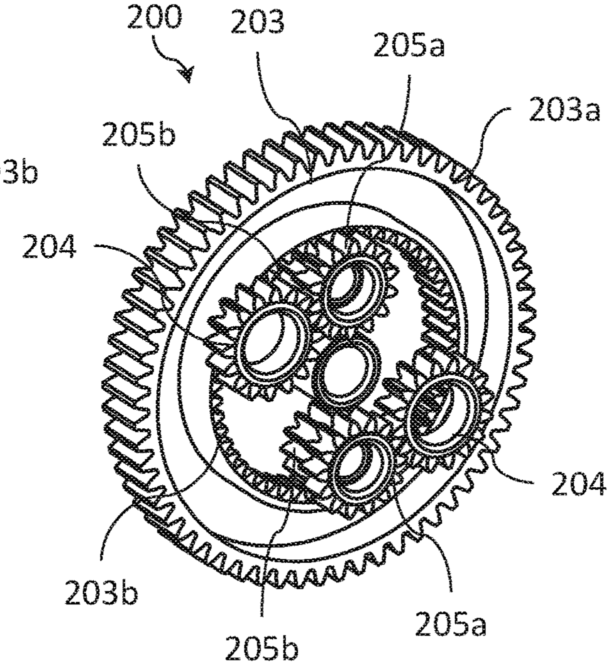
FIG. 5D is another perspective view illustrating the reverse conveyance unit.

Next, a meshing relationship of the respective gears in the reverse conveyance unit 200 will be described with reference to FIGS. 5A to 5D. FIG. 5A is a rear view of the reverse conveyance unit 200 from which the reverse conveyance output gear 203 is omitted, and FIG. 5B is a perspective view of the reverse conveyance unit 200 from which the reverse conveyance output gear 203 is omitted. FIG. 5C is a front view of the reverse conveyance unit 200 in which the reverse conveyance input gear 201, the reverse conveyance switching gear 202, and the carrier unit 206 are omitted. FIG. 5D is a perspective view of the reverse conveyance unit 200 in which the reverse conveyance input gear 201, the reverse conveyance switching gear 202, and the carrier unit 206 are omitted.

As illustrated in FIGS. 5A and 5B, the reverse conveyance input gear 201 includes external teeth 201*a* that mesh with the discharge reverse conveyance input gear 100 described above and receives a driving force, and internal teeth 201*b* that mesh with the internal idler gear 204, and is rotatably supported by a shaft portion of the internal holder 207. The internal idler gear 204 and the internal stage gear 205 are constituted by two symmetrically arranged gear trains, and are rotatably supported by a rotation shaft 207*a* and a rotation shaft 207*b* provided in the internal holder 207, respectively.

The internal stage gear 205 includes first teeth 205*a* and second teeth 205*b* that rotate integrally, and the first teeth 205*a* mesh with the internal idler gear 204. As illustrated in FIGS. 5C and 5D, the reverse conveyance output gear 203 includes external teeth 203*a* that output driving force to the reverse conveyance drive train 400, internal teeth 203*b* that mesh with the second teeth 205*b* of the internal stage gear 205, and a hole through which the shaft of the internal holder 207 is inserted. Further, the reverse conveyance output gear 203 is rotatably supported by a shaft portion of the internal holder 207. The internal idler gear 204 meshes with the internal teeth 201*b* of the reverse conveyance input gear 201, and the first teeth 205*a* of the internal stage gear 205 meshes with the internal idler gear 204. Further, when the second teeth 205*b* of the internal stage gear 205 mesh with the internal teeth 203*b* of the reverse conveyance output gear 203, the driving force is sequentially transmitted from the reverse conveyance input gear 201 to the reverse conveyance output gear 203.

In the reverse conveyance unit 200 configured as described above, the driving force is transmitted from the discharge reverse conveyance input gear 100 to the external teeth 201*a* of the reverse conveyance input gear 201, and the driving force is obtained to rotate in one direction in the direction of the arrow RD1. Further, the reverse conveyance roller gear 403 that rotates the reverse conveyance roller pair 51 is driven by the external teeth 203*a* of the reverse conveyance output gear 203 via the reverse conveyance drive train 400, and when the rotation direction of the reverse conveyance output gear 203 is switched, the reverse conveyance roller pair 51 also follows and switches the rotation direction.

Drive Switching Operation of Reverse Conveyance Unit

Figure 6A:
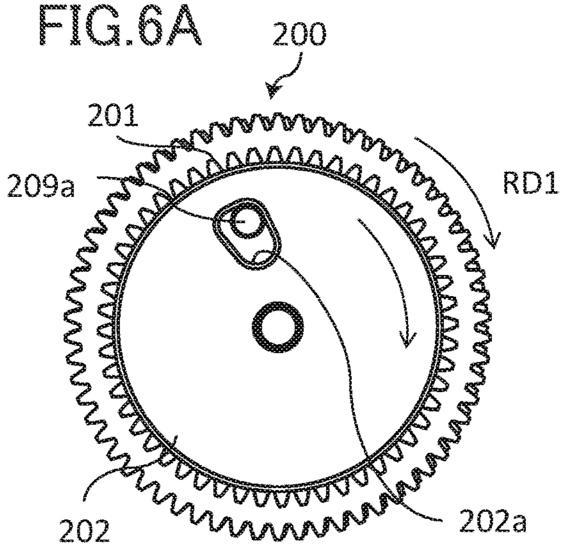
FIG. 6A is a front view illustrating the reverse conveyance unit at the time of a forward rotation.
Figure 6D:
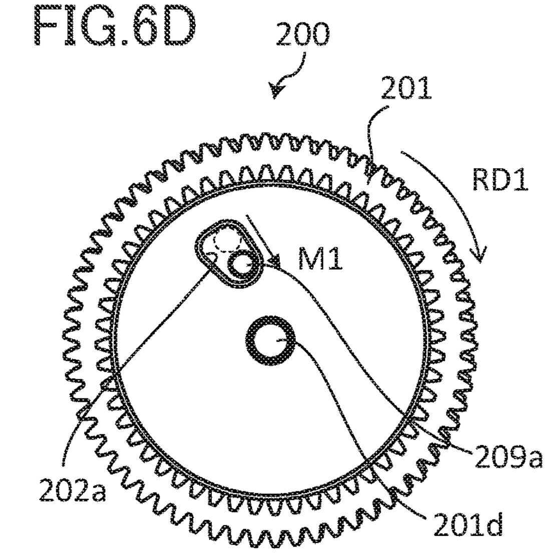
FIG. 6D is a front view illustrating the reverse conveyance unit at the time of a reverse rotation.
Figure 6B:
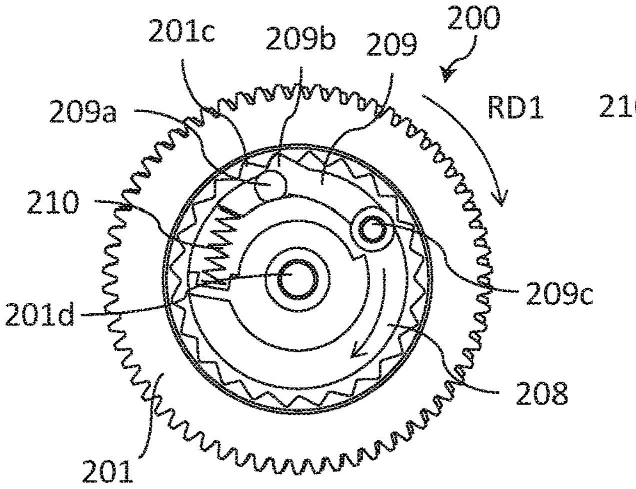
FIG. 6B is a front view illustrating the reverse conveyance unit in which a reverse conveyance switching gear is omitted.
Figure 6E:
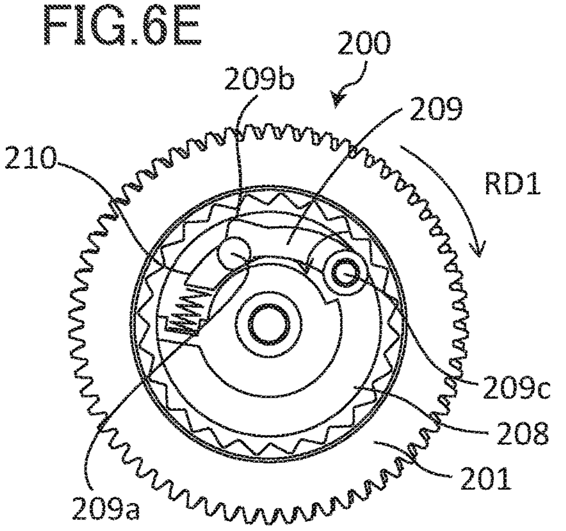
FIG. 6E is a front view illustrating the reverse conveyance unit in which the reverse conveyance switching gear is omitted.
Figure 6C:
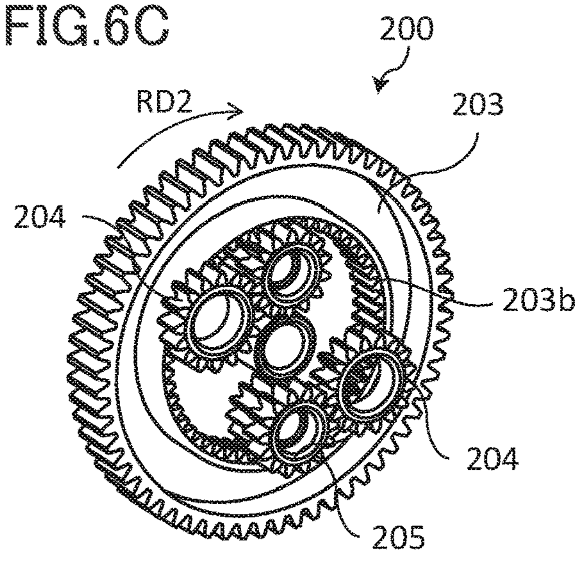
FIG. 6C is a perspective view illustrating the reverse conveyance unit at the time of the forward rotation.
Figure 6F:
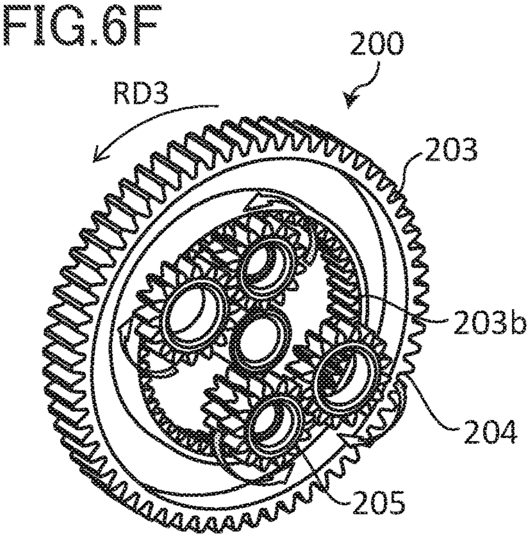
FIG. 6F is a perspective view illustrating the reverse conveyance unit at the time of the reverse rotation.

Next, an operation of switching the rotation direction of the reverse conveyance output gear 203 of the reverse conveyance unit 200 will be described with reference to FIGS. 6A to 6F. FIG. 6A is a front view of the reverse conveyance unit 200 at the time of the forward rotation. FIG. 6B is a front view of the reverse conveyance unit 200 at the time of the forward rotation in which the reverse conveyance switching gear 202 is omitted. FIG. 6C is a perspective view of the reverse conveyance unit 200 at the time of the forward rotation in which the reverse conveyance input gear 201, the reverse conveyance switching gear 202, and the carrier unit 206 are omitted. FIG. 6D is a front view of the reverse conveyance unit 200 at the time of a backward rotation. FIG. 6E is a front view of the reverse conveyance unit 200 at the time of the backward rotation in which the reverse conveyance switching gear 202 is omitted. FIG. 6F is a perspective view of the reverse conveyance unit 200 at the time of the backward rotation in which the reverse conveyance input gear 201, the reverse conveyance switching gear 202, and the carrier unit 206 are omitted.

Hereinafter, a state of the reverse conveyance unit 200 when the reverse conveyance output gear 203 rotates in a direction of an arrow RD2 that is the same as the direction of the arrow RD1 that is the rotation direction of the reverse conveyance input gear 201 is referred to as the time of the forward rotation or the forward rotation state. In addition, a state of the reverse conveyance unit 200 when the reverse conveyance output gear 203 rotates in a direction of an arrow RD3 that is opposite to the direction of the arrow RD1 that is the rotation direction of the reverse conveyance input gear 201 is referred to as the time of the backward rotation or the backward rotation state.

First, as illustrated in FIGS. 6A and 6B, a state is considered in which the reverse conveyance switching gear 202 can freely rotate without being restricted from the outside. In this case, the locking lever 209 is located at the engagement position where the locking portion 209*b* is engaged with the locked portion 201*c* of the reverse conveyance input gear 201 by the pressing spring 210. Therefore, the locking lever 209 rotates integrally with the reverse conveyance input gear 201 in the direction of the arrow RD1. In addition, since the protrusion 209*a* of the locking lever 209 is engaged with the hole 202*a* of the reverse conveyance switching gear 202, the reverse conveyance switching gear 202 in a freely rotatable state also rotates integrally with the reverse conveyance input gear 201 in the direction of the arrow RD1.

Since the locking lever 209 is held by the stopper holder 208, the internal holder 207 integrated with the stopper holder 208 also rotates in the direction of the arrow RD1. The internal idler gear 204 rotatably supported by the internal holder 207 is maintained in a stopped (fixed) state with respect to the internal holder 207 since no relative displacement occurs between the internal holder 207 and the reverse conveyance input gear 201. Similarly, the internal stage gear 205 rotatably supported by the internal holder 207 is also maintained in the stopped (fixed) state with respect to the internal holder 207 since no relative displacement occurs between the internal idler gear 204 and the internal holder 207.

Therefore, the internal stage gear 205 revolves integrally with the reverse conveyance input gear 201, the reverse conveyance switching gear 202, and the carrier unit 206 in the same direction as the direction of the arrow RD1 around the rotation shaft 201*d* of the reverse conveyance input gear 201. The rotation in the direction of the arrow RD1 input to the reverse conveyance input gear 201 is transmitted to the reverse conveyance output gear 203 via the internal idler gear 204 and the internal stage gear 205 revolving in the same direction as the reverse conveyance input gear 201 and the carrier unit 206 rotate integrally. That is, as illustrated in FIG. 6C, the reverse conveyance output gear 203 receives a driving force from the internal stage gear 205 that revolves in a fixed state with respect to the internal holder 207 to the internal teeth 203*b*, and thus, the reverse conveyance output gear 203 rotates in the direction of the arrow RD2, which is the same direction as the direction of the arrow RD1, and outputs a rotational driving force.

That is, when the reverse conveyance switching gear 202 rotates in the same direction and at the same rotational speed as the reverse conveyance input gear 201, the switching unit 310 (see FIG. 4A) is in the first state. In this case, the switching unit 310 outputs the driving force transmitted from the reverse conveyance input gear 201 to the reverse conveyance output gear 203 so that the driving roller 51*d* of the reverse conveyance roller pair 51 rotates in a second rotation direction RR2 (see FIG. 7B).

Next, as illustrated in FIGS. 6D and 6E, a state in which the reverse conveyance switching gear 202 is restricted from the outside and the rotation thereof is stopped will be considered. In the initial state, as described above, the locking lever 209 is located at the engagement position where the locking portion 209*b* is engaged with the locked portion 201*c* of the reverse conveyance input gear 201 by the pressing spring 210. When the locking lever 209 rotates together with the reverse conveyance input gear 201 in this state, the protrusion 209*a* of the locking lever 209 moves in the direction of an arrow M1 along an edge of the hole 202*a* of the reverse conveyance switching gear 202 in the stopped state.

As a result, as illustrated in FIG. 6E, the locking lever 209 rotates about a rotation shaft 209*c* from the engagement position to the non-engagement position against a biasing force of the pressing spring 210. Then, the rotation of the reverse conveyance input gear 201 in the direction of the arrow RD1 is not transmitted to the stopper holder 208 and the internal holder 207 holding the locking lever 209, and the stopper holder 208 and the internal holder 207 are in the stopped state.

Meanwhile, the rotation in the direction of the arrow RD1 input to the reverse conveyance input gear 201 is transmitted to the reverse conveyance output gear 203 via the internal idler gear 204 and the internal stage gear 205 rotatably supported by the stopped internal holder 207. As illustrated in FIG. 6F, since the internal idler gear 204 meshes with the internal teeth 201*b* of the reverse conveyance input gear 201, the internal idler gear 204 rotates in the same rotation direction as the reverse conveyance input gear 201. The internal stage gear 205 also rotates in the same direction as the reverse conveyance output gear 203 because the internal stage gear 205 meshes with the internal teeth 203*b* of the reverse conveyance output gear 203.

Since the internal idler gear 204 and the internal stage gear 205 rotate in directions opposite to each other, the reverse conveyance output gear 203 rotates in the direction of the arrow RD3 opposite to the direction of the arrow RD1 and outputs a rotational driving force.

That is, when the reverse conveyance switching gear 202 is stopped by an external force, the switching unit 310 (see FIG. 4A) is in the second state and is stopped. In this case, the switching unit 310 outputs the driving force transmitted from the reverse conveyance input gear 201 to the reverse conveyance output gear 203 so that the driving roller 51*d* of the reverse conveyance roller pair 51 rotates in the first rotation direction RR1 (see FIG. 7D).

As described above, the reverse conveyance output gear 203 is configured to be rotatable in the direction of the arrow RD2 and the direction of the arrow RD3 opposite to the direction of the arrow RD2 depending on whether or not the reverse conveyance switching gear 202 is stopped by an external force.

Operation of Reverse Conveyance Roller Pair and Guide Member

Next, operations of the reverse conveyance roller pair 51 and the guide member 53 when the sheet S is switched back will be described. FIG. 7A is a timing chart illustrating operation timings of the reverse conveyance roller pair 51, the guide member 53, and the clutch unit 600 when the clutch unit 600 is switched from the power failure state to the energized state. FIG. 7B is a perspective view illustrating the drive mechanism 90 in a period (b) of FIG. 7A. FIG. 7C is a perspective view illustrating the drive mechanism 90 in a period (c) of FIG. 7A. FIG. 7D is a perspective view illustrating the drive mechanism 90 in a period (d) of FIG. 7A.

Figure 8A:
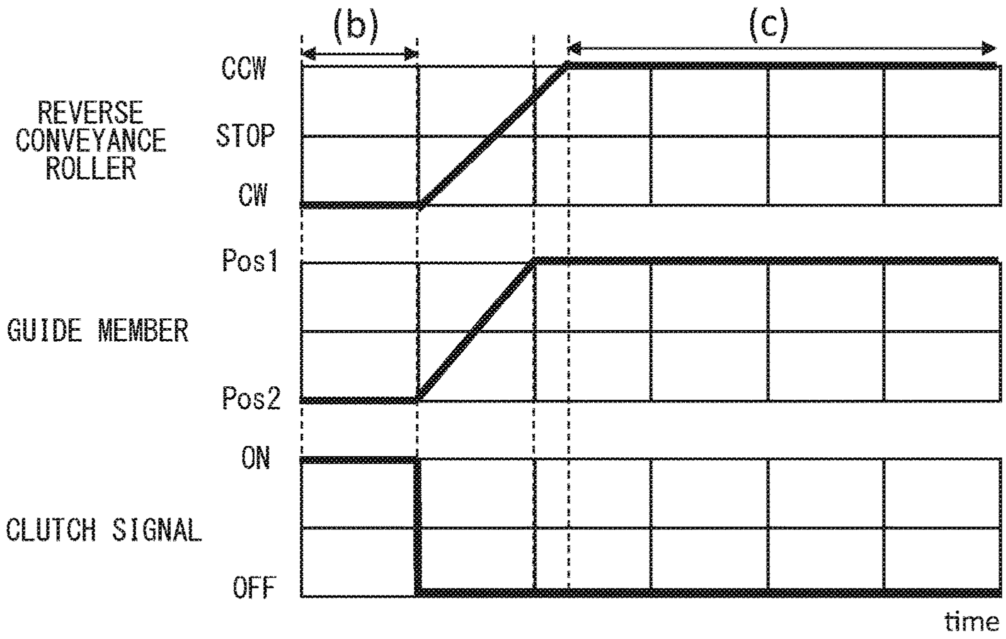
FIG. 8A is a timing chart illustrating operation timings of the reverse conveyance roller, the guide member, and the clutch signal.
Figure 8B:
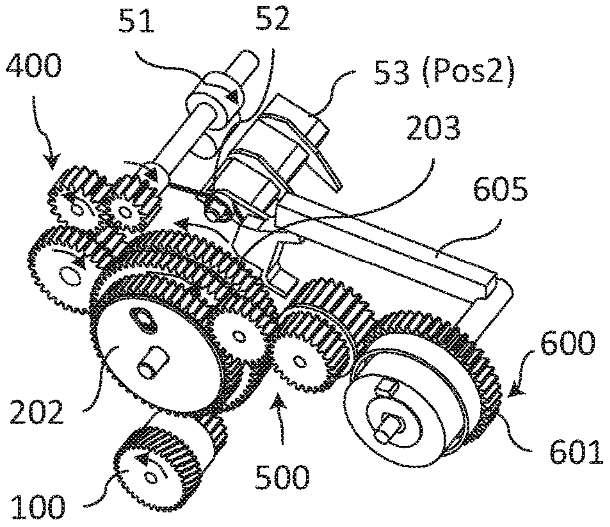
FIG. 8B is a perspective view illustrating the drive mechanism in a period (b) of FIG. 8A.
Figure 8C:
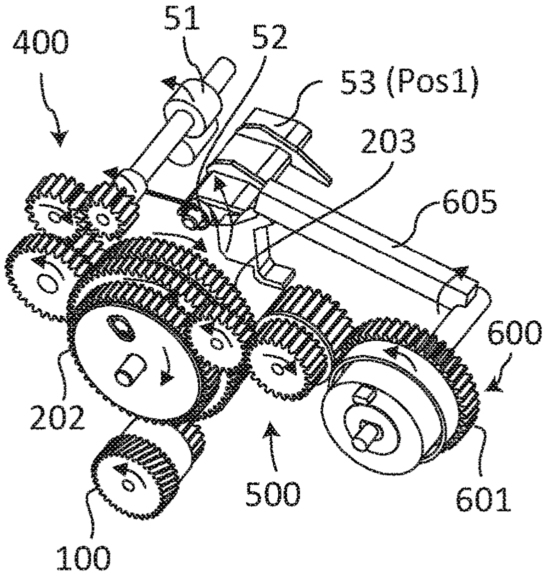
FIG. 8C is a perspective view illustrating the drive mechanism in a period (c) of FIG. 8A.

FIG. 8A is a timing chart of signals of the reverse conveyance roller pair 51, the guide member 53, and the clutch unit 600 when the clutch unit 600 is switched from the energized state to the power failure state. FIG. 8B is a perspective view illustrating the drive mechanism 90 in a period (b) of FIG. 8A. FIG. 8C is a perspective view illustrating the drive mechanism 90 in a period (c) of FIG. 8A. In FIGS. 7B to 7D and FIGS. 8B and 8C, the discharge drive train 300 and the sheet discharge roller pair 50 are omitted, and the rotation direction of each member is indicated by an arrow.

In the following description, for example, the printing operation is executed to drive the drive motor M, and the discharge reverse conveyance input gear 100 and the reverse conveyance input gear 201 are rotated by the driving force of the drive motor M.

As illustrated in FIGS. 7A and 7B, when the clutch unit 600 is in the power failure state, the reverse conveyance roller pair 51 rotates in a direction of conveying the sheet S in the second direction D2 (see FIG. 2C). That is, the driving roller 51*d* of the reverse conveyance roller pair 51 rotates in the second rotation direction RR2. In this case, the rotation direction of the reverse conveyance roller pair 51 is defined as a backward rotation direction. A rotation direction of the reverse conveyance roller pair 51 when the sheet S is conveyed in the first direction D1 (see FIG. 2B) is defined as a forward rotation direction. In this case, the driving roller 51*d* of the reverse conveyance roller pair 51 rotates in the first rotation direction RR1 opposite to the second rotation direction RR2. Similarly, the rotation direction of the sheet discharge roller pair 50 when the sheet S is discharged to the outside of the apparatus is defined as a forward rotation direction, and the rotation direction in the opposite direction is defined as a backward rotation direction.

Since the drive connection between the clutch input gear 601 and the guide switching lever 605 is released when the clutch unit 600 is in the power failure state, the rotation of the clutch input gear 601 is not transmitted to the guide switching lever 605. Therefore, the guide member 53 is located at the first position (denoted as pos1 in the drawing) by the biasing force of the return spring 52, and can guide the sheet S conveyed by the fixing unit 40 toward the sheet discharge roller pair 50. The sheet discharge roller pair 50 rotates in the forward rotation direction. That is, when the single-sided printing mode is executed and when the sheet S is discharged in the double-sided printing mode, the clutch unit 600 is in a power failure state.

When the sheet S is conveyed to the reverse conveyance path R2 in the double-sided printing mode, the signal of the clutch unit 600 is switched from OFF to ON. As illustrated in FIGS. 7A and 7C, when the signal of the clutch unit 600 is switched from OFF to ON, the clutch unit 600 transitions from the power failure state to the energized state. As a result, the clutch input gear 601 and the guide switching lever 605 are drivingly connected. The guide switching lever 605 is rotated by the driving force transmitted from the clutch input gear 601 via the reverse conveyance switching gear 202 and the clutch drive train 500, and moves the guide member 53 from the first position to the second position (denoted as Pos2 in the drawing). In addition, while the guide member 53 rotates from the first position to the second position, the rotation of the reverse conveyance switching gear 202 is not restricted and rotates integrally with the reverse conveyance input gear 201. That is, the switching unit 310 (see FIG. 4A) of the reverse conveyance unit 200 is maintained in the first state. Therefore, the sheet discharge roller pair 50 remains rotated in the forward rotation direction, and the reverse conveyance roller pair 51 remains rotated in the backward rotation direction.

After the guide member 53 moves to the second position, the guide member 53 abuts on a member (not illustrated), and thus, the rotation thereof stops. Since the driving force is continuously transmitted from the reverse conveyance unit 200 to the guide switching lever 605, the guide member 53 is continuously held at the second position. As illustrated in FIG. 7D, when the rotation of the guide member 53 is stopped, the guide switching lever 605, the clutch drive train 500, and the reverse conveyance switching gear 202 linked with the guide member 53 are simultaneously stopped.

When the reverse conveyance switching gear 202 is stopped, the above-described reverse conveyance unit 200 is switched from the forward rotation state to the backward rotation state, and the rotation direction of the reverse conveyance output gear 203 is switched from the direction of the arrow RD2 to the direction of the arrow RD3 (see FIGS. 6C and 6F). Therefore, the rotation direction of the reverse conveyance drive train 400 meshing with the reverse conveyance output gear 203 and the rotation direction of the reverse conveyance roller pair 51 are also switched in conjunction with each other. As a result, the reverse conveyance roller pair 51 rotates in the forward rotation direction to convey the sheet S in the first direction D1 (see FIG. 2B), that is, convey the sheet S toward the outside of the printer 1.

In other words, based on that the clutch unit 600 is in the energized state and the guide member 53 moving from the first position to the second position stops at the second position, the switching unit 310 (see FIG. 4A) of the reverse conveyance unit 200 transitions from the first state to the second state. When the clutch unit 600 is in the energized state and the guide member 53 is stopped at the second position, the switching unit 310 (see FIG. 4A) of the reverse conveyance unit 200 is in the second state. As a result, the sheet S is guided to the reverse conveyance path R2 by the guide member 53 located at the second position, and is conveyed in the first direction D1 by the reverse conveyance roller pair 51.

As illustrated in FIGS. 8A and 8B, when the clutch unit 600 is in the energized state, as described above, the guide member 53 is held at the second position, and the reverse conveyance roller pair 51 rotates in the forward rotation direction. When the trailing edge of the sheet S passes through the guide member 53, the signal of the clutch unit 600 is switched from ON to OFF, and the clutch unit 600 is changed from the energized state to the power failure state. Accordingly, the drive connection between the clutch input gear 601 and the guide switching lever 605 is released.

Since no driving force is input to the guide switching lever 605, the guide member 53 is rotated from the second position to the first position by the biasing force of the return spring 52 as illustrated in FIG. 8C. When the guide member 53 starts to rotate from the second position to the first position, the rotation restriction of the reverse conveyance switching gear 202 is released, and the reverse conveyance switching gear can freely rotate. As a result, the reverse conveyance unit 200 is switched from the backward rotation state to the forward rotation state, and the rotation direction of the reverse conveyance output gear 203 is switched from the direction of the arrow RD3 to the direction of the arrow RD2 (see FIGS. 6C and 6F).

Therefore, the rotation direction of the reverse conveyance drive train 400 meshing with the reverse conveyance output gear 203 and the rotation direction of the reverse conveyance roller pair 51 are also switched in conjunction with each other. As a result, the reverse conveyance roller pair 51 rotates in the backward rotation direction to convey the sheet S in the second direction D2 (see FIG. 2C), that is, convey the sheet S toward the inside of the printer 1. In other words, while the guide member 53 rotates between the first position and the second position, the reverse conveyance roller pair 51 is configured to be rotatable by the driving force output from the reverse conveyance output gear 203. Therefore, the sheet S is switched back, and the sheet S is guided to the duplex conveyance path R3 by the guide member 53 located at the first position. Even when the guide member 53 is located at the first position, the rotation of the reverse conveyance switching gear 202 is not restricted because the clutch unit 600 is in the power failure state. Therefore, the sheet discharge roller pair 50 remains rotated in the forward rotation direction.

Effects of First Embodiment

As described above, the drive mechanism 90 according to the present embodiment is a mechanism that drives the reverse conveyance roller pair 51 and the guide member 53 using the driving force of the drive motor M. As described above, by using the drive mechanism 90 of the present embodiment, the stopped state of the reverse conveyance roller pair 51 is made as short as possible while the rotation direction of the reverse conveyance roller pair 51 is switched after the signal of the clutch unit 600 is switched. Since the time when the rotation direction of the reverse conveyance roller pair 51 is switched is shortened and the sheet interval at the time of duplex printing can be reduced, productivity can be increased.

More specifically, as illustrated in FIG. 8A, when the signal of the clutch unit 600 is switched from ON to OFF, the guide member 53 rotates from the second position to the first position by the action of the reverse conveyance unit 200 and the clutch unit 600. Further, the rotation direction of the reverse conveyance roller pair 51 is switched from the forward rotation direction to the backward rotation direction.

In this case, the switching operation in the rotation direction of the reverse conveyance roller pair 51 is performed in parallel with the operation in which the guide member 53 rotates from the second position to the first position. Therefore, the switching operation in the rotation direction of the reverse conveyance roller pair 51 is performed without waiting for the completion of the rotation of the guide member 53 to the first position, and thus, there is almost no stop time of the reverse conveyance roller pair 51 in the switching operation in the rotation direction of the reverse conveyance roller pair 51. Therefore, the time for switching the rotation direction of the reverse conveyance roller pair 51 is shortened, and the productivity can be improved.

When the signal of the clutch unit 600 is switched from OFF to ON, the guide member 53 rotates from the first position to the second position by the actions of the reverse conveyance unit 200 and the clutch unit 600. While the guide member 53 rotates from the first position to the second position, the rotation of the reverse conveyance switching gear 202 is not restricted and the reverse conveyance switching gear 202 rotates integrally with the reverse conveyance input gear 201. That is, the sheet discharge roller pair 50 remains rotated in the forward rotation direction. Therefore, as illustrated in FIGS. 2A and 2B, the guide member 53 can start to move from the first position to the second position before the sheet S comes out of the sheet discharge roller pair 50 and is discharged to the outside of the apparatus. Thus, the timing of switching the signal of the clutch unit 600 can be advanced, and the productivity can be improved.

Modification of First Embodiment

In the present embodiment, the discharge stage gear 301 and the reverse conveyance stage gear 401 are disposed coaxially, but may be disposed on different shafts. In the present embodiment, the discharge drive train 300 is configured to be included in the drive mechanism 90 by transmitting the driving force from the reverse conveyance input gear 201 and driving the same. However, the sheet discharge roller pair 50 may be driven from a drive motor (not illustrated) via another drive train.

In the present embodiment, the torsion coil spring is used as the return spring 52 that biases the guide member 53, but another spring type such as a compression spring, a tension spring, or a leaf spring may be used. In the present embodiment, the configuration in which the guide member 53 is moved via the guide switching lever 605 is used, but as another method, a method in which an output unit of the guide member 53 and the clutch unit 600 is transmitted by a belt, a link, or the like may be used.

In the present embodiment, the internal idler gear 204 and the internal stage gear 205 disposed inside the reverse conveyance unit 200 are configured by two pairs of gears, but the present invention is not limited thereto. For example, a method of arranging only one pair of gear trains of the internal idler gear 204 and the internal stage gear 205 or a method of arranging a plurality of pairs of three or more pairs may be used.

Second Embodiment

Next, a printer 1A according to a second embodiment of the present invention will be described. The printer 1A is different from that of the first embodiment in that a discharge reverse conveyance triple roller 55 is provided instead of the sheet discharge roller pair 50 and the reverse conveyance roller pair 51. In addition, the printer 1A is different from that of the first embodiment in that the discharge drive train 300 is omitted, a reverse conveyance drive train 400A is provided instead of the reverse conveyance drive train 400, and a guide member 56 is provided instead of the guide member 53 and the guide switching lever 605. Therefore, configurations similar to those of the first embodiment will be described by omitting illustration or attaching the same reference numerals to the drawings.

Overall Configuration

Figure 9:
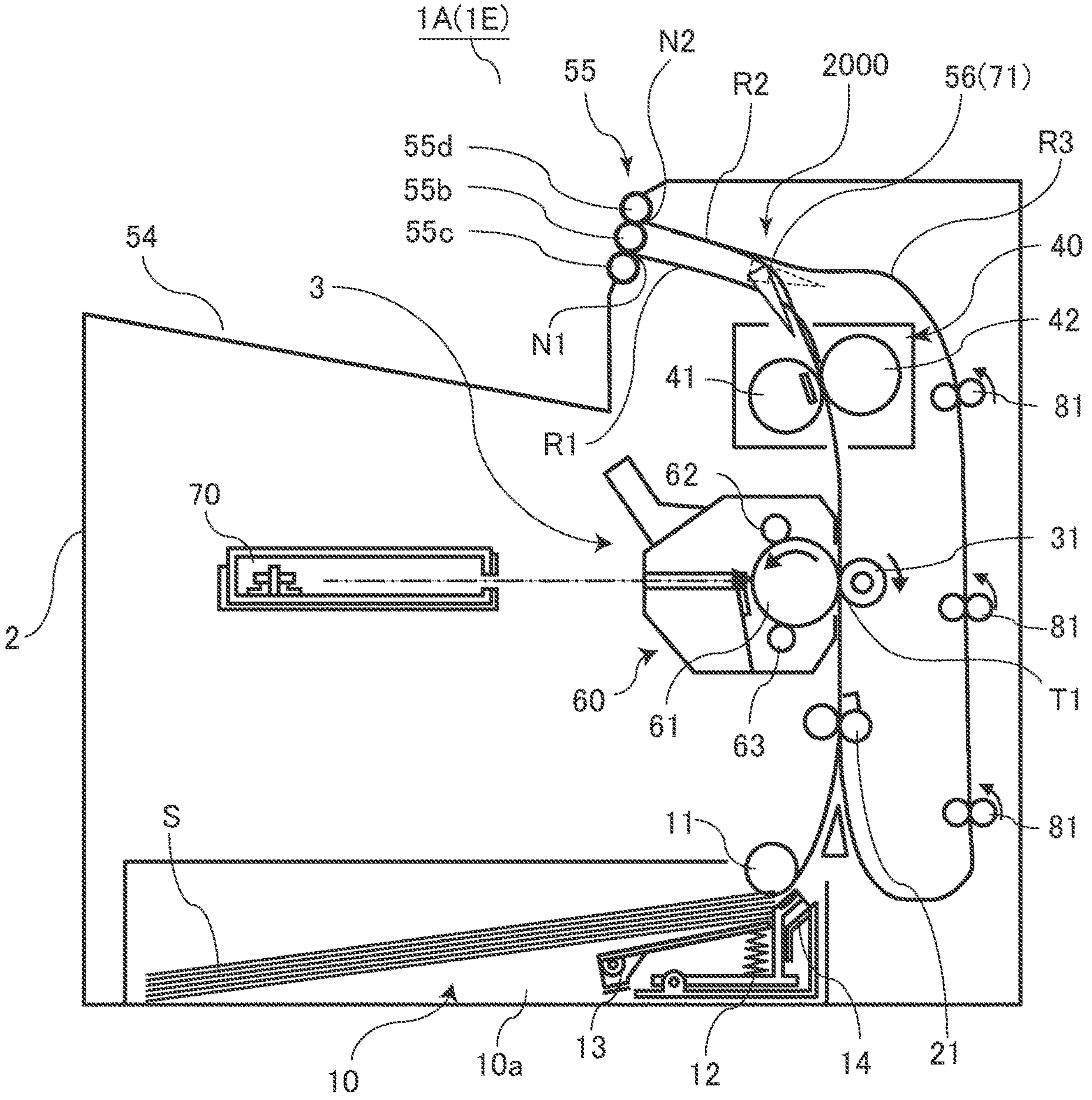
FIG. 9 is an overall schematic view illustrating a printer according to a second embodiment.

As illustrated in FIG. 9, the printer 1A serving as an image forming apparatus includes a feeding unit 10 that feeds a stacked sheet S, an image forming unit 3 that forms an image on the sheet S, and a fixing unit 40 that fixes the image transferred to the sheet S. Further, the printer 1A includes the discharge reverse conveyance triple roller 55 capable of discharging and switching back the sheet S to a sheet discharge tray 54 and conveying the sheet S to a duplex conveyance path R3, and the guide member 56.

The discharge reverse conveyance triple roller 55 includes a driving roller **55*b* serving as a roller that can rotate forward and backward, a discharge driven roller 55*c* serving as a first driven roller that rotates following the driving roller 55*b*, and a reverse conveyance driven roller 55*d* serving as a second driven roller that rotates following the driving roller 55*b*. The discharge driven roller 55*c* is in pressure contact with the driving roller 55*b* to form a discharge nip N1 as a first nip. The reverse conveyance driven roller 55*d* is in pressure contact with the driving roller 55*b* to form a reverse conveyance nip N2 as a second nip. The guide member 56 is movable to a first position indicated by a broken line in FIG. 9 and a second position indicated by a solid line in FIG. 9. The discharge reverse conveyance triple roller 55, the guide member 56, and a drive mechanism 90A to be described later constitute a sheet conveyance apparatus 2000**.

Figure 10A:
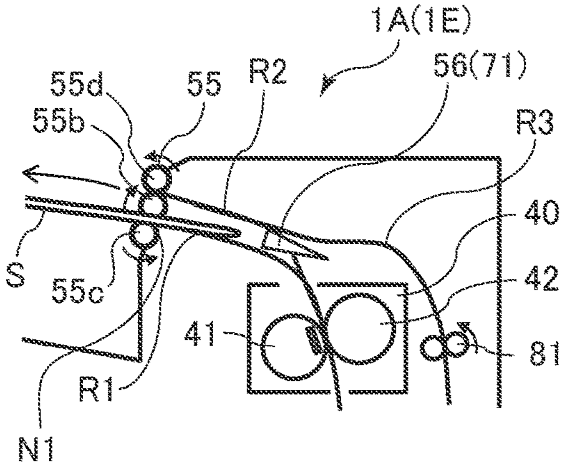
FIG. 10A is a schematic view illustrating conveyance of a sheet in a single-sided printing mode.

In a case of a single-sided printing mode in which an image is formed only on one side of the sheet S, the sheet S on which the toner image is fixed by the fixing unit 40 is guided to the discharge conveyance path R1 by the guide member 56 located at the first position as illustrated in FIG. 10A. Then, the sheet S is discharged to the sheet discharge tray 54 by the discharge nip N1.

Figure 10B:
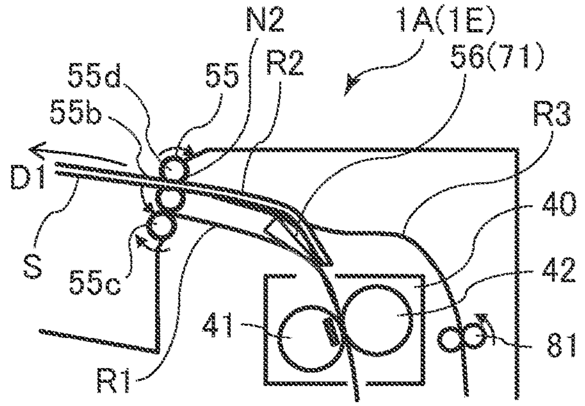
FIG. 10B is a schematic view illustrating conveyance of a sheet in a first direction in a double-sided printing mode.
Figure 10C:
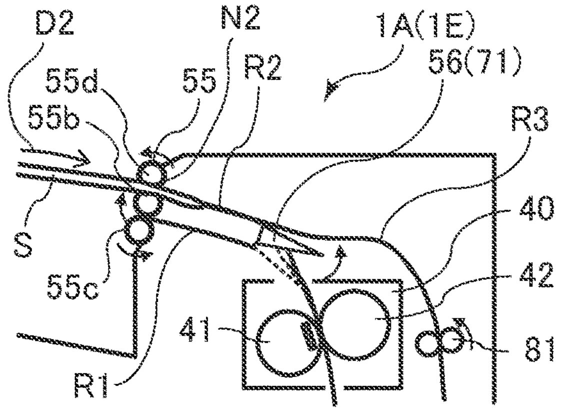
FIG. 10C is a schematic view illustrating a state in which the sheet is switched back from the first direction to the second direction in the double-sided printing mode.
Figure 10D:
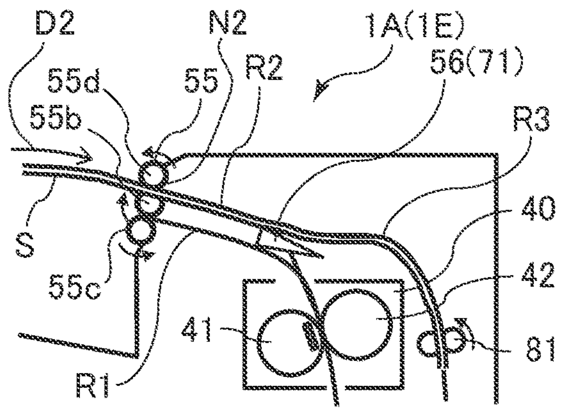
FIG. 10D is a schematic view illustrating a state in which the sheet is conveyed in the second direction in the double-sided printing mode.

In a double-sided printing mode in which images are formed on both surfaces of the sheet S, the sheet S having an image formed on a first surface is guided to the reverse conveyance path R2 by the guide member 56 located at the second position as illustrated in FIG. 10B. Then, the sheet S is first conveyed in a first direction D1 by the reverse conveyance nip N2, and when a trailing edge of the sheet S passes through the guide member 56, as illustrated in FIG. 10C, the driving roller 55*b* is reversed, and the guide member 56 moves from the second position indicated by the broken line to the first position indicated by the solid line. As a result, as illustrated in FIG. 10D, the sheet S is switched back and conveyed in a second direction D2 opposite to the first direction D1, and is guided to a duplex conveyance path R3 by the guide member 56 located at the first position.

The sheet S is conveyed on the duplex conveyance path R3 by the conveyance roller pair 81, and is conveyed again to the transfer nip T1 by the registration roller pair 21. Then, an image is formed on a second surface of the sheet S at the transfer nip T1, and the sheet S is discharged to the sheet discharge tray 54 by the discharge nip N1.

Drive Mechanism

Figure 11A:
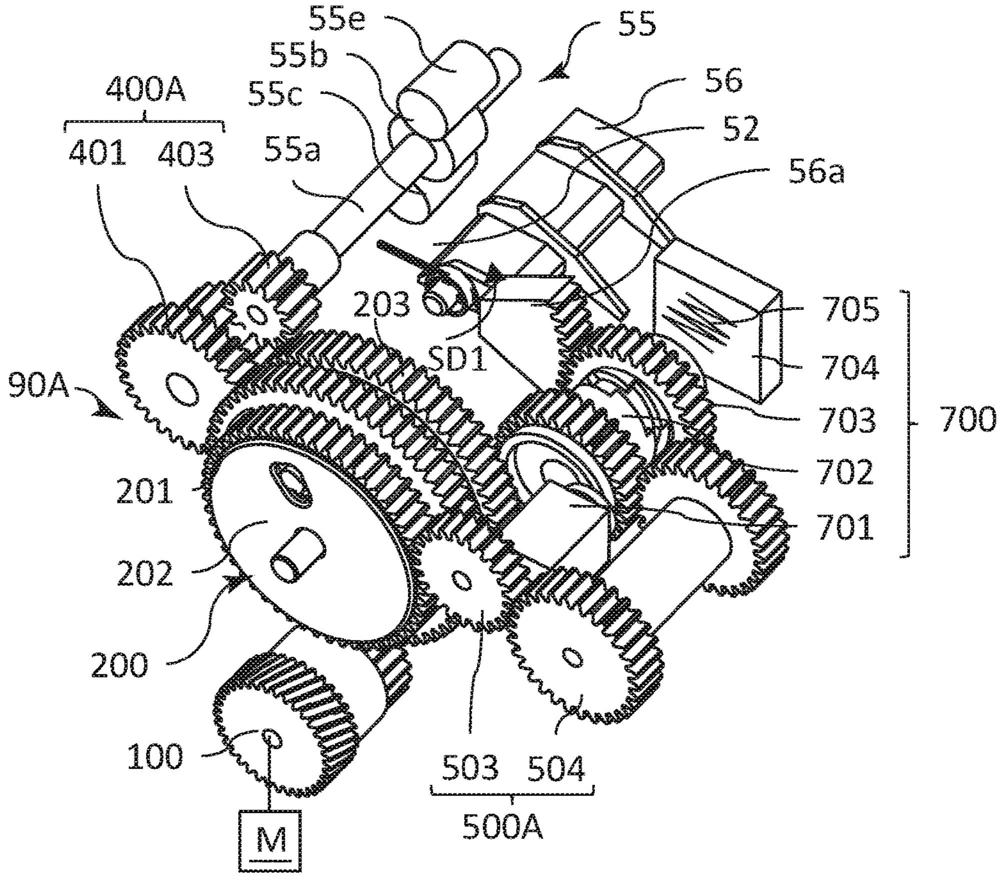
FIG. 11A is a perspective view illustrating a drive mechanism.

Next, the drive mechanism 90A for driving the discharge reverse conveyance triple roller 55 and the guide member 56 serving as a conveyance section will be described. As illustrated in FIG. 11A, the drive mechanism 90A includes a drive motor M, a discharge reverse conveyance input gear 100, a reverse conveyance unit 200, a reverse conveyance drive train 400A, a connection switching gear train 500A, and an uncoupling unit 700.

The discharge reverse conveyance input gear 100 is driven by the drive motor M via a gear train (not illustrated). The reverse conveyance unit 200 is driven by the discharge reverse conveyance input gear 100, and outputs a driving force to the reverse conveyance drive train 400A and the connection switching gear train 500A. The discharge reverse conveyance triple roller 55 is driven by the driving force transmitted to the reverse conveyance drive train 400A. The reverse conveyance roller pair 51 is driven by the driving force transmitted to the reverse conveyance drive train 400A. The driving force transmitted from the reverse conveyance unit 200 to the connection switching gear train 500A is transmitted to the uncoupling unit 700. The guide member 56 is driven by the driving force transmitted to the uncoupling unit 700.

Next, the reverse conveyance unit 200, the reverse conveyance drive train 400A, the connection switching gear train 500A, and the uncoupling unit 700 will be described in more detail. The reverse conveyance unit 200 includes a reverse conveyance input gear 201, a reverse conveyance switching gear 202, and a reverse conveyance output gear 203. As described in the first embodiment, the reverse conveyance unit 200 can output the forward rotation or the backward rotation (clockwise or counterclockwise) by switching the rotation state of the reverse conveyance switching gear 202.

The reverse conveyance drive train 400A includes a reverse conveyance stage gear 401 that meshes with the reverse conveyance output gear 203 and a reverse conveyance roller gear 403 that meshes with the reverse conveyance stage gear 401. The reverse conveyance roller gear 403 is fixed to a drive shaft 55*a* of the driving roller 55*b* of the discharge reverse conveyance triple roller 55, and when the reverse conveyance roller gear 403 rotates, the driving roller 55*b* rotates via the drive shaft 55*a*.

The connection switching gear train 500A includes a connection switching idler gear 503 and a connection switching gear pair 504. The connection switching idler gear 503 meshes with the reverse conveyance switching gear 202 and the connection switching gear pair 504, and the rotation of the reverse conveyance switching gear 202 is transmitted to the uncoupling unit 700 via the connection switching idler gear 503 and the connection switching gear pair 504.

Figure 11B:
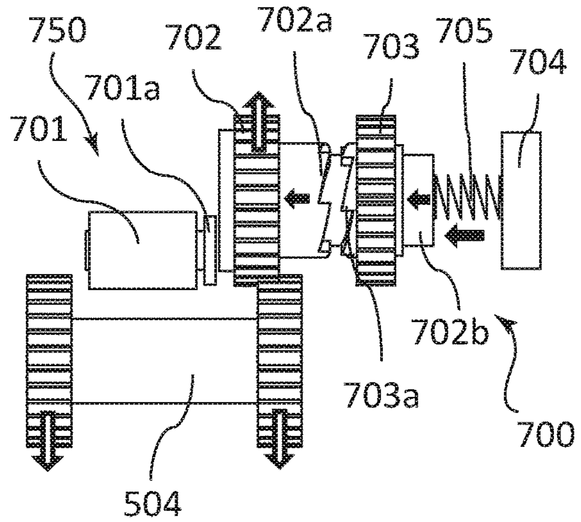
FIG. 11B is a front view illustrating an uncoupling unit in a non-transmission state.
Figure 11C:
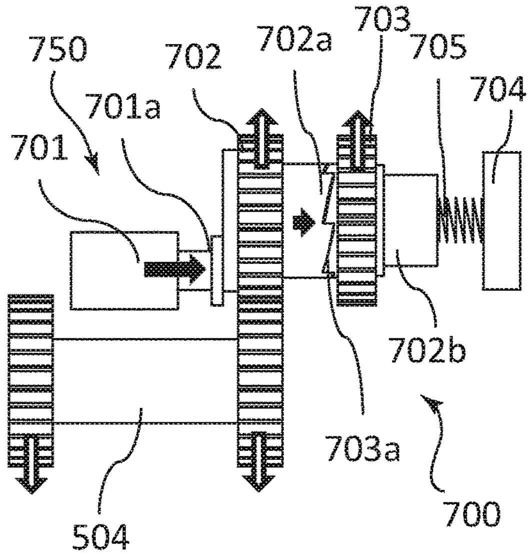
FIG. 11C is a front view illustrating the uncoupling unit in a transmission state.

The uncoupling unit 700 serving as a drive interruption unit includes a push solenoid 701, a first ratchet gear 702, a second ratchet gear 703, a spring seat 704, and an uncoupling spring 705. As illustrated in FIGS. 11B and 11C, the first ratchet gear 702 includes a first ratchet portion 702*a*. The second ratchet gear 703 has a second ratchet portion 703*a* facing the first ratchet portion 702*a*, and is supported to be relatively rotatable with respect to a rotation shaft 702*b* of the first ratchet gear 702.

An uncoupling spring 705 is provided between the rotation shaft 702*b* of the first ratchet gear 702 and the spring seat 704, and the uncoupling spring 705 presses the rotation shaft 702*b* in a direction in which the first ratchet portion 702*a* separates from the second ratchet portion 703*a*. The spring seat 704 is fixed to a fixing member such as a frame of the apparatus body 2. The push solenoid 701 is a push type solenoid including a solenoid shaft 701*a* that can be pushed out when energized, and the solenoid shaft 701*a* is disposed so as to abut on the first ratchet gear 702. The push solenoid 701 and the solenoid shaft 701*a* constitute a contact-separation mechanism 750 that engages or separates the first ratchet portion 702*a* with or from the second ratchet portion 703*a*.

In the power failure state in which the push solenoid 701 is in the non-transmission state, as illustrated in FIG. 11B, the first ratchet portion 702*a* and the second ratchet portion 703*a* are separated from each other by the action of the uncoupling spring 705. Therefore, the first ratchet gear 702 and the second ratchet gear 703 are not drivingly connected. Meanwhile, when the push solenoid 701 is in the energized state as the transmission state, as illustrated in FIG. 11C, the first ratchet gear 702 is pressed toward the second ratchet gear 703 by the solenoid shaft 701*a* against the biasing force of the uncoupling spring 705. As a result, the first ratchet portion 702*a* and the second ratchet portion 703*a* are engaged with each other, and the first ratchet gear 702 and the second ratchet gear 703 are drivingly connected.

The guide member 56 is biased in the direction of the arrow SD1 by the return spring 52. The return spring 52 is a torsion coil spring, and has one end in contact with a member (not illustrated) and the other end in contact with the guide member 56 to bias the guide member 56 in the direction of an arrow SD1. The guide member 56 biased by the return spring 52 abuts on a member (not illustrated) to be held at a first position (position indicated by a broken line in FIG. 9).

The guide member 56 includes a guide switching gear 56*a* that meshes with the second ratchet gear 703, and rotates from the first position to a second position (position indicated by a solid line in FIG. 9) by transmission of the driving force from the second ratchet gear 703 when the push solenoid 701 is in the energized state.

Operation of Discharge Reverse Conveyance Triple Roller and Guide Member

Figure 12A:
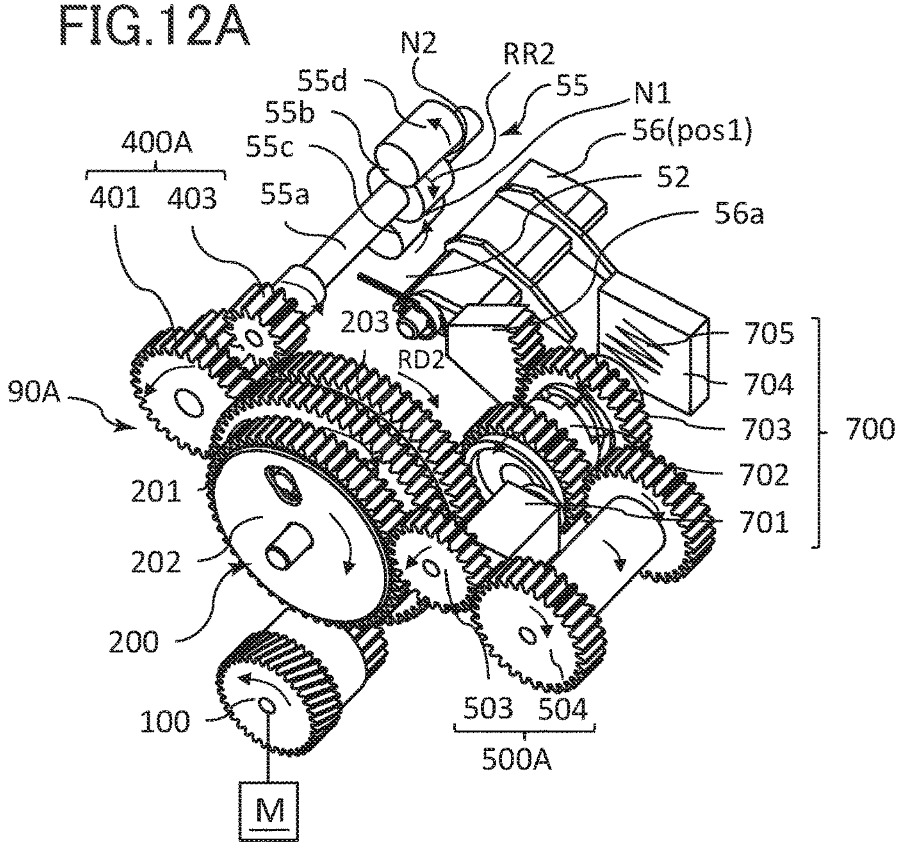
FIG. 12A is a perspective view illustrating a drive mechanism in which a push solenoid is in a power failure state.
Figure 12B:
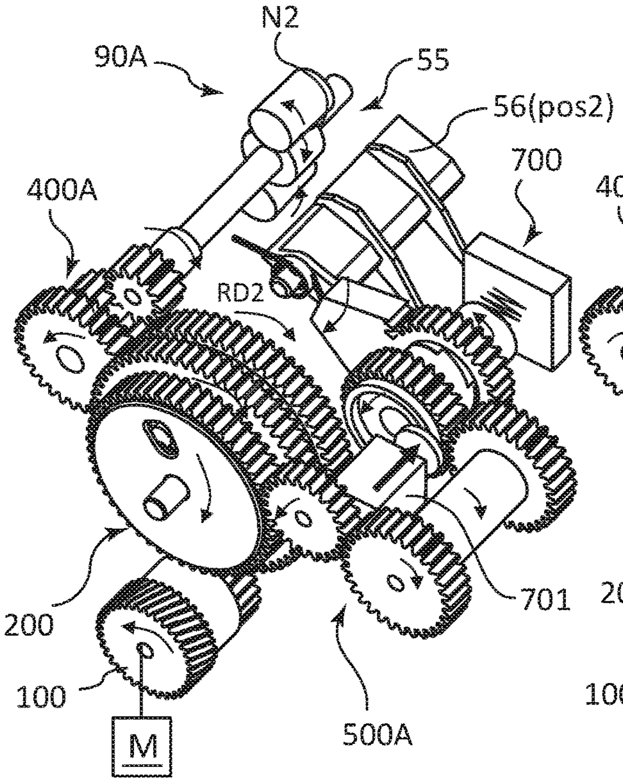
FIG. 12B is a perspective view illustrating the drive mechanism when the push solenoid is switched from the power failure state to an energized state.
Figure 12C:
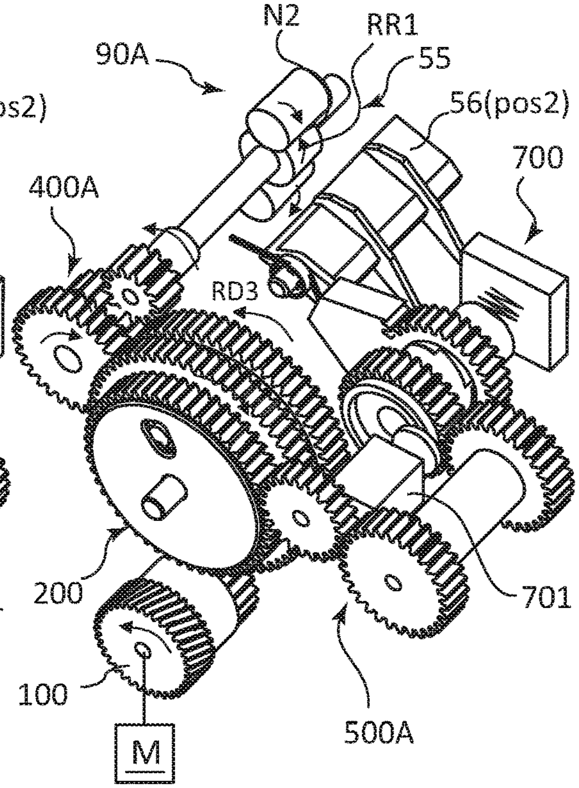
FIG. 12C is a perspective view illustrating the drive mechanism in which the push solenoid is in the energized state.

Next, operations of the discharge reverse conveyance triple roller 55 and the guide member 56 when the sheet S is switched back will be described with reference to FIGS. 12A to 13E. FIG. 12A is a perspective view illustrating the drive mechanism 90A in a power failure state of the push solenoid 701. FIG. 12B is a perspective view illustrating the drive mechanism 90A when the push solenoid 701 is switched from the power failure state to the energized state. FIG. 12C is a perspective view illustrating the drive mechanism 90A when the guide member 56 reaches the second position and abuts on a member (not illustrated). In FIGS. 12A to 12C, the rotation direction of each member is indicated by an arrow.

In the following description, for example, the printing operation is executed to drive the drive motor M, and the discharge reverse conveyance input gear 100 and the reverse conveyance input gear 201 are rotated by the driving force of the drive motor M.

As illustrated in FIG. 12A, when the push solenoid 701 is in a power failure state, the discharge reverse conveyance triple roller 55 rotates in the direction illustrated in the drawing. That is, the driving roller 55*b* of the discharge reverse conveyance triple roller 55 rotates in a second rotation direction RR2, and the sheet S can be discharged toward the sheet discharge tray 54 by the discharge nip N1 of the discharge reverse conveyance triple roller 55. In this case, the rotation direction of the discharge reverse conveyance triple roller 55 is defined as a backward rotation direction. A rotation direction of the discharge reverse conveyance triple roller 55 when the sheet S is conveyed in the first direction D1 (see FIG. 10B) by the reverse conveyance nip N2 of the discharge reverse conveyance triple roller 55 is defined as a forward rotation direction. In this case, the driving roller 55*b* of the discharge reverse conveyance triple roller 55 rotates in the first rotation direction RR1 (see FIG. 12C) opposite to the second rotation direction RR2.

Since the drive connection between the first ratchet gear 702 and the second ratchet gear 703 is released when the push solenoid 701 is in the power failure state, the rotation of the first ratchet gear 702 is not transmitted to the guide switching gear 56*a*. Therefore, the guide member 56 is located at the first position (denoted as pos1 in the drawing) by the biasing force of the return spring 52, and can guide the sheet S toward the discharge conveyance path R1 by the discharge nip N1 as illustrated in FIG. 13B. That is, when the single-sided printing mode is executed and when the sheet S is discharged in the double-sided printing mode, the push solenoid 701 is in a power failure state.

Figure 13A:
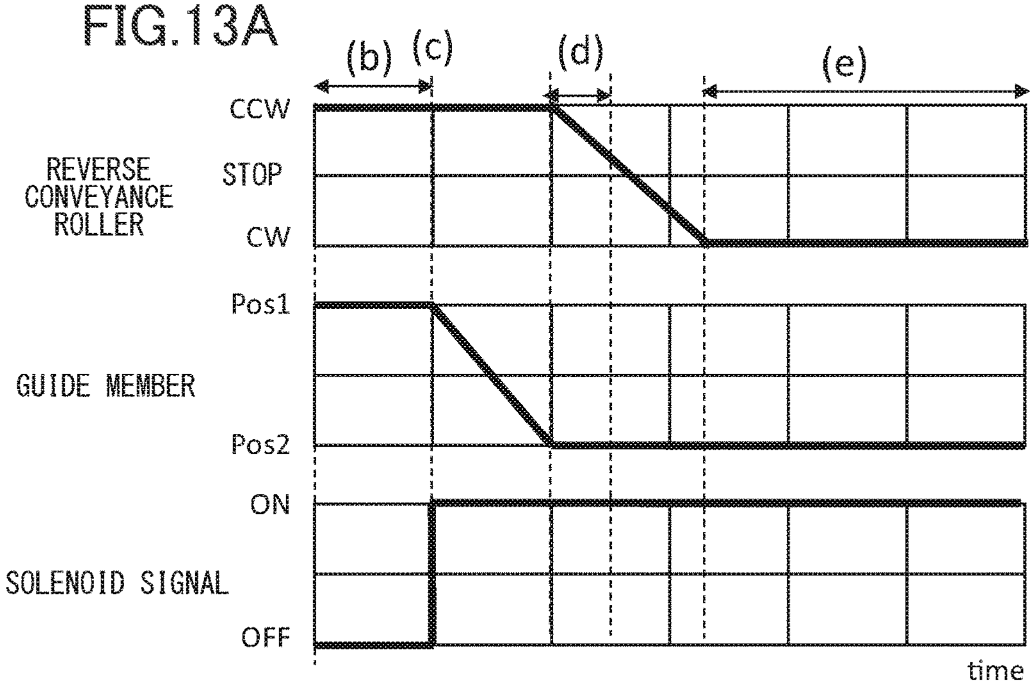
FIG. 13A is a timing chart illustrating operation timings of a reverse conveyance roller, a guide member, and a solenoid signal.
Figure 13B:
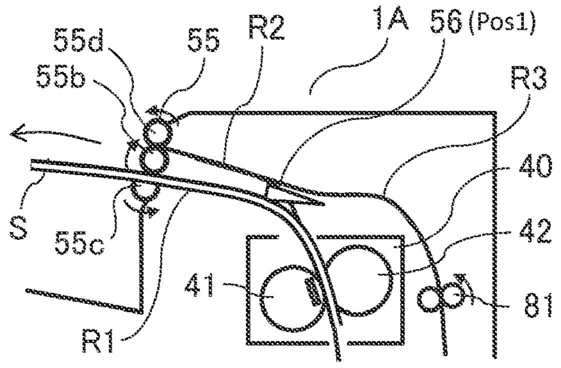
FIG. 13B is a schematic view illustrating conveyance of a sheet in a period (b) of FIG. 13A.
Figure 13C:
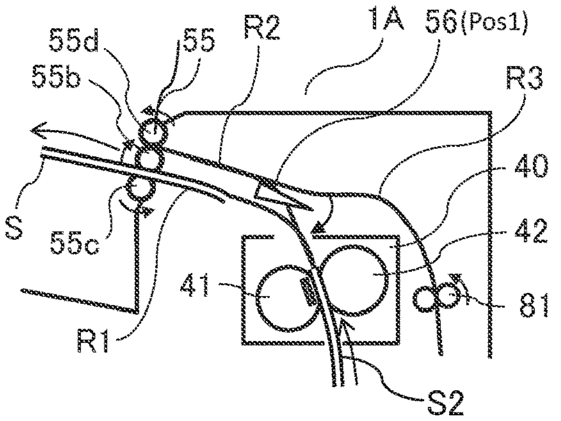
FIG. 13C is a schematic view illustrating conveyance of the sheet at time (c) in FIG. 13A.

When the sheet S is conveyed to the reverse conveyance path R2 in the double-sided printing mode, the signal of the push solenoid 701 is switched from OFF to ON as illustrated in FIGS. 12B and 13A and 13C. When the signal of the push solenoid 701 is switched from OFF to ON, the push solenoid 701 transitions from the power failure state to the energized state. As a result, the first ratchet gear 702 and the second ratchet gear 703 are drivingly connected. The guide switching gear 56*a* is rotated by the driving force transmitted from the second ratchet gear 703 to move the guide member 56 from the first position to the second position (denoted as Pos2 in the drawings). In addition, while the guide member 56 rotates from the first position to the second position, the rotation of the reverse conveyance switching gear 202 is not restricted and the reverse conveyance switching gear 202 rotates integrally with the reverse conveyance input gear 201. That is, the discharge reverse conveyance triple roller 55 remains rotated in the backward rotation direction in which the sheet S is conveyed to the outside of the apparatus by the discharge nip N1.

Figure 13D:
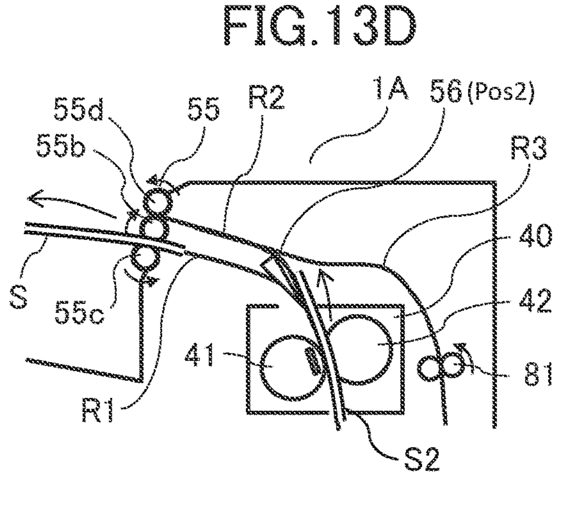
FIG. 13D is a schematic view illustrating conveyance of the sheet in a period (d) in FIG. 13A.

After guide member 56 moves to the second position, the guide member 56 abuts on a member (not illustrated), and thus, the rotation thereof stops as illustrated in FIG. 13D. Since the driving force is continuously transmitted from the reverse conveyance unit 200 to the guide switching gear 56*a*, the guide member 56 is continuously held at the second position. As illustrated in FIG. 12C, when the rotation of the guide member 56 is stopped, the uncoupling unit 700, the connection switching gear train 500A, and the reverse conveyance switching gear 202 linked with the guide member 56 are simultaneously stopped.

Figure 13E:
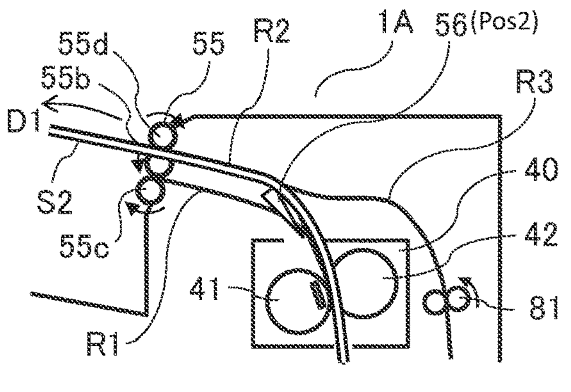
FIG. 13E is a schematic view illustrating conveyance of the sheet in a period (e) in FIG. 13A.

When the reverse conveyance switching gear 202 is stopped, the above-described reverse conveyance unit 200 is switched from the forward rotation state to the backward rotation state, and the rotation direction of the reverse conveyance output gear 203 is switched from the direction of the arrow RD2 to the direction of the arrow RD3. Therefore, the rotation direction of the reverse conveyance drive train 400A meshing with the reverse conveyance output gear 203 and the discharge reverse conveyance triple roller 55 are also switched in conjunction with each other. As a result, the discharge reverse conveyance triple roller 55 rotates in the forward rotation direction as illustrated in FIG. 13E. As a result, the sheet S is guided to the reverse conveyance path R2 by the guide member 56 located at the second position, and is conveyed in the first direction D1 by the reverse conveyance nip N2 of the discharge reverse conveyance triple roller 55 as illustrated in FIG. 10B.

As illustrated in FIG. 13E, when the push solenoid 701 of the uncoupling unit 700 is in the energized state, as described above, the guide member 56 is held at the second position, and the discharge reverse conveyance triple roller 55 rotates in the forward rotation direction. When the trailing edge of the sheet S passes through the guide member 56, the signal of the push solenoid 701 is switched from ON to OFF, and the push solenoid 701 is switched from the energized state to the power failure state. As a result, the drive connection between the first ratchet gear 702 and the second ratchet gear 703 is released.

Since the driving force is not input to the guide switching gear 56*a*, the guide member 56 rotates from the second position to the first position by the biasing force of the return spring 52. When the guide member 56 starts to rotate from the second position to the first position, the rotation restriction of the reverse conveyance switching gear 202 is released, and the reverse conveyance switching gear can freely rotate. As a result, the reverse conveyance unit 200 is switched from the backward rotation state to the forward rotation state, and the rotation direction of the reverse conveyance output gear 203 is switched from the direction of the arrow RD3 to the direction of the arrow RD2 as illustrated in FIG. 12A.

Therefore, the rotation direction of the reverse conveyance drive train 400A meshing with the reverse conveyance output gear 203 and the discharge reverse conveyance triple roller 55 are also switched in conjunction with each other. As a result, the discharge reverse conveyance triple roller 55 rotates in the second direction D2 (see FIG. 10C) by the reverse conveyance nip N2, that is, in the backward rotation direction in which the sheet S is conveyed toward the inside of the printer 1. In other words, while the guide member 56 rotates between the first position and the second position, the discharge reverse conveyance triple roller 55 is configured to be rotatable by the driving force output from the reverse conveyance output gear 203. Therefore, the sheet S is switched back, and the sheet S is guided to the duplex conveyance path R3 by the guide member 56 located at the first position. Even in a state where the guide member 56 is located at the first position, since the uncoupling unit 700 is in the disconnection state, the rotation of the reverse conveyance switching gear 202 is not restricted. Therefore, the discharge reverse conveyance triple roller 55 remains rotated in the backward rotation direction.

Effects of Second Embodiment

As described above, the drive mechanism 90A according to the present embodiment is a mechanism that drives the discharge reverse conveyance triple roller 55 and the guide member 56 using the driving force of the drive motor M. As described above, by using the drive mechanism 90A of the present embodiment, the stopped state of the discharge reverse conveyance triple roller 55 is made as short as possible while the rotation direction of the discharge reverse conveyance triple roller 55 is switched after the signal of the push solenoid 701 is switched. Since the time for switching the rotation direction of the discharge reverse conveyance triple roller 55 is shortened and the sheet interval at the time of duplex printing can be reduced, productivity can be improved.

More specifically, when the signal of the push solenoid 701 is switched from OFF to ON, the guide member 56 rotates from the first position to the second position by the action of the reverse conveyance unit 200 and the uncoupling unit 700. While the guide member 56 rotates from the first position to the second position, the rotation of the reverse conveyance switching gear 202 is not restricted and rotates integrally with the reverse conveyance input gear 201. That is, the discharge reverse conveyance triple roller 55 remains rotated in the backward rotation direction. Therefore, as illustrated in FIGS. 13C and 13D, the guide member 56 can start to move from the first position to the second position before the sheet S comes out of the discharge nip N1 of the discharge reverse conveyance triple roller 55 and is discharged to the outside of the apparatus. As a result, the timing of switching the signal of the push solenoid 701 can be advanced, and the productivity can be improved.

When the signal of the push solenoid 701 is switched from ON to OFF, the guide member 56 rotates from the second position to the first position by the actions of the reverse conveyance unit 200 and the uncoupling unit 700. Further, the rotation direction of the discharge reverse conveyance triple roller 55 is switched from the forward rotation direction to the backward rotation direction.

In this case, the switching operation in the rotation direction of the discharge reverse conveyance triple roller 55 is performed in parallel with the operation in which the guide member 56 rotates from the second position to the first position. Therefore, the switching operation in the rotation direction of the discharge reverse conveyance triple roller 55 is performed without waiting for the completion of the rotation of the guide member 56 to the first position, and there is almost no stop time of the discharge reverse conveyance triple roller 55 in the switching operation in the rotation direction of the discharge reverse conveyance triple roller 55.

As described above, the time for switching the rotation direction of the discharge reverse conveyance triple roller 55 is shortened, the timing for switching the signal of the push solenoid 701 can be advanced, and thus, productivity can be improved.

Third Embodiment

Next, a printer 1B according to a third embodiment of the present invention will be described. The printer 1B is different from that of the first embodiment in that a discharge reverse conveyance roller pair 57 is provided instead of the sheet discharge roller pair 50 and the reverse conveyance roller pair 51. Further, the printer 1B is different from that of the first embodiment in that the guide member 58 is provided instead of the guide member 53 and the guide switching lever 605, and the clutch unit 600 is provided coaxially with the rotation center of the guide member 58. Therefore, configurations similar to those of the first embodiment will be described by omitting illustration or attaching the same reference numerals to the drawings.

Overall Configuration

Figure 14:
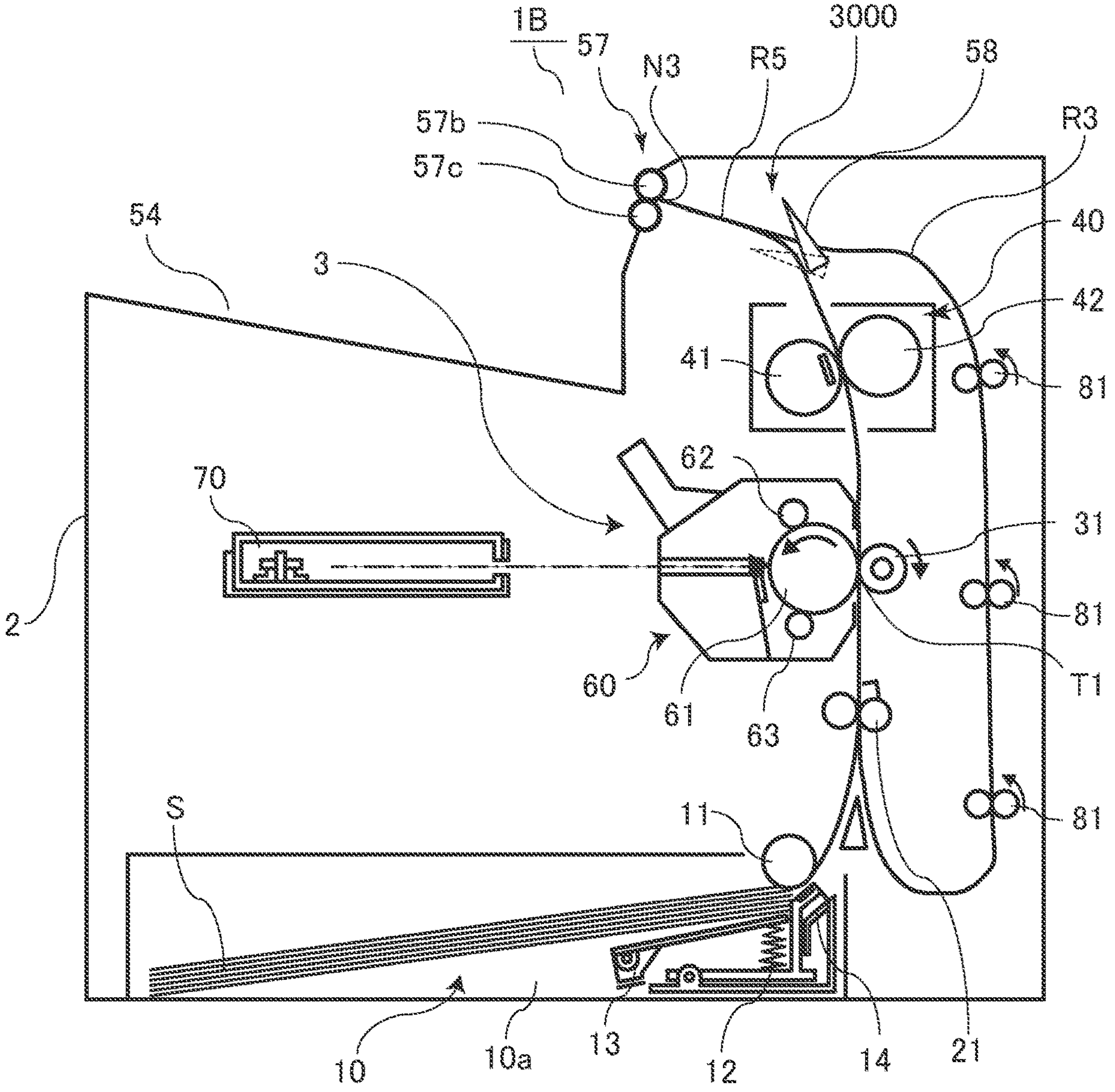
FIG. 14 is an overall schematic view illustrating a printer according to a third embodiment.

As illustrated in FIG. 14, the printer 1B as an image forming apparatus includes a feeding unit 10 that feeds a stacked sheet S, an image forming unit 3 that forms an image on the sheet S, and a fixing unit 40 that fixes the image transferred to the sheet S. Further, the printer 1B includes a discharge reverse conveyance roller pair 57 capable of discharging and switching back the sheet S to a sheet discharge tray 54 and conveying the sheet S to a duplex conveyance path R3, and a guide member 58.

The discharge reverse conveyance roller pair 57 as a conveyance section includes a driving roller 57*b* that is rotatable forward and backward, and a driven roller 57*c* that is in pressure contact with the driving roller 57*b* to form a discharge reverse conveyance nip N3 as a third nip. The driven roller 57*c* serving as a third driven roller rotates following a driving roller 57*b* serving as a roller. The guide member 58 is movable to a first position indicated by a solid line in FIG. 15 and a second position indicated by a broken line in FIG. 15. The discharge reverse conveyance roller pair 57, the guide member 58, and a drive mechanism 90B to be described later constitute a sheet conveyance apparatus 3000.

Figure 15A:
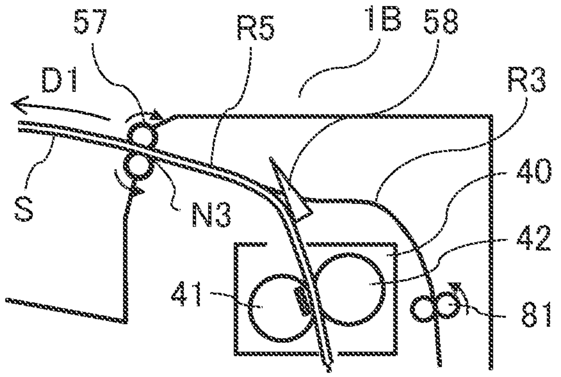
FIG. 15A is a schematic view illustrating conveyance of a sheet in a single-sided printing mode.

In a case of a single-sided printing mode in which an image is formed only on one side of the sheet S, as illustrated in FIG. 15A, the sheet S is guided to the discharge reverse conveyance path R5 by the guide member 58 located at the first position, and is discharged to the sheet discharge tray 54 by the discharge reverse conveyance nip N3.

Figure 15B:
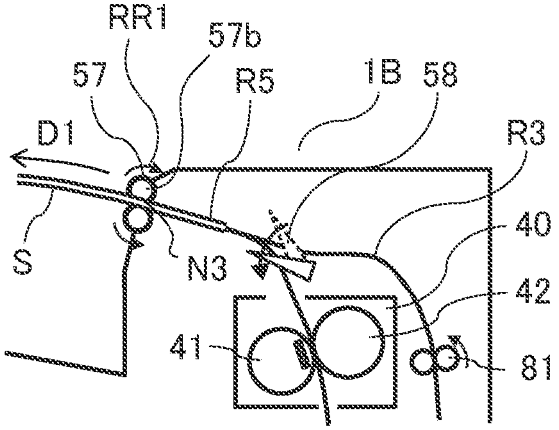
FIG. 15B is a schematic view illustrating conveyance of a sheet in a first direction in a double-sided printing mode.
Figure 15C:
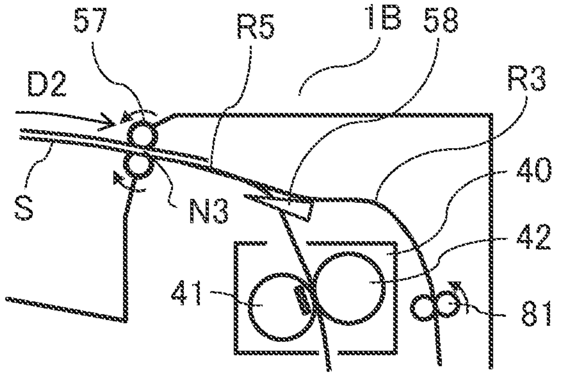
FIG. 15C is a schematic view illustrating a state in which the sheet is switched back from the first direction to the second direction in the double-sided printing mode.
Figure 15D:
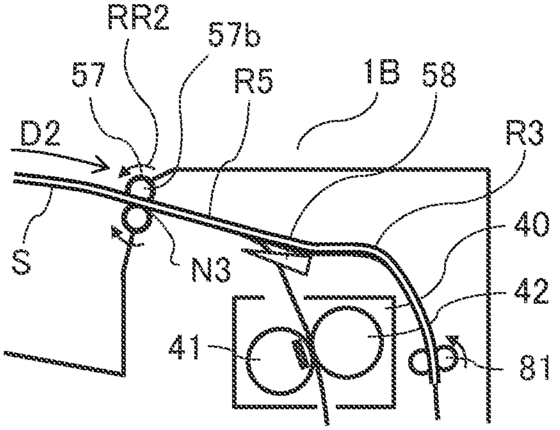
FIG. 15D is a schematic view illustrating a state in which the sheet is conveyed in the second direction in the double-sided printing mode.

In a double-sided printing mode in which images are formed on both surfaces of the sheet S, the sheet S on which the images are formed on a first surface is guided to the discharge reverse conveyance path R5 by the guide member 58 located at the first position as illustrated in FIGS. 15A and 15B. Then, the sheet S is first conveyed in a first direction D1 by the discharge reverse conveyance nip N3. In this case, the driving roller 57*b* of the discharge reverse conveyance roller pair 57 rotates in a first rotation direction RR1. When the trailing edge of the sheet S passes through the guide member 58, as illustrated in FIG. 15C, the driving roller 57*b* is reversed, and the guide member 58 moves from the first position indicated by the broken line to the second position indicated by the solid line. As a result, as illustrated in FIG. 15D, the sheet S is switched back and conveyed in a second direction D2 opposite to the first direction D1, and is guided to the duplex conveyance path R3 by the guide member 58 located at the first position. In this case, the driving roller 57*b* of the discharge reverse conveyance roller pair 57 rotates in the second rotation direction RR2.

As illustrated in FIG. 14, the sheet S is conveyed on the duplex conveyance path R3 by the conveyance roller pair 81, and is conveyed again to the transfer nip T1 by the registration roller pair 21. Then, an image is formed on the second surface of the sheet S at the transfer nip T1, and the sheet S is discharged to the sheet discharge tray 54 by the discharge reverse conveyance nip N3.

Drive Mechanism

Figure 16A:
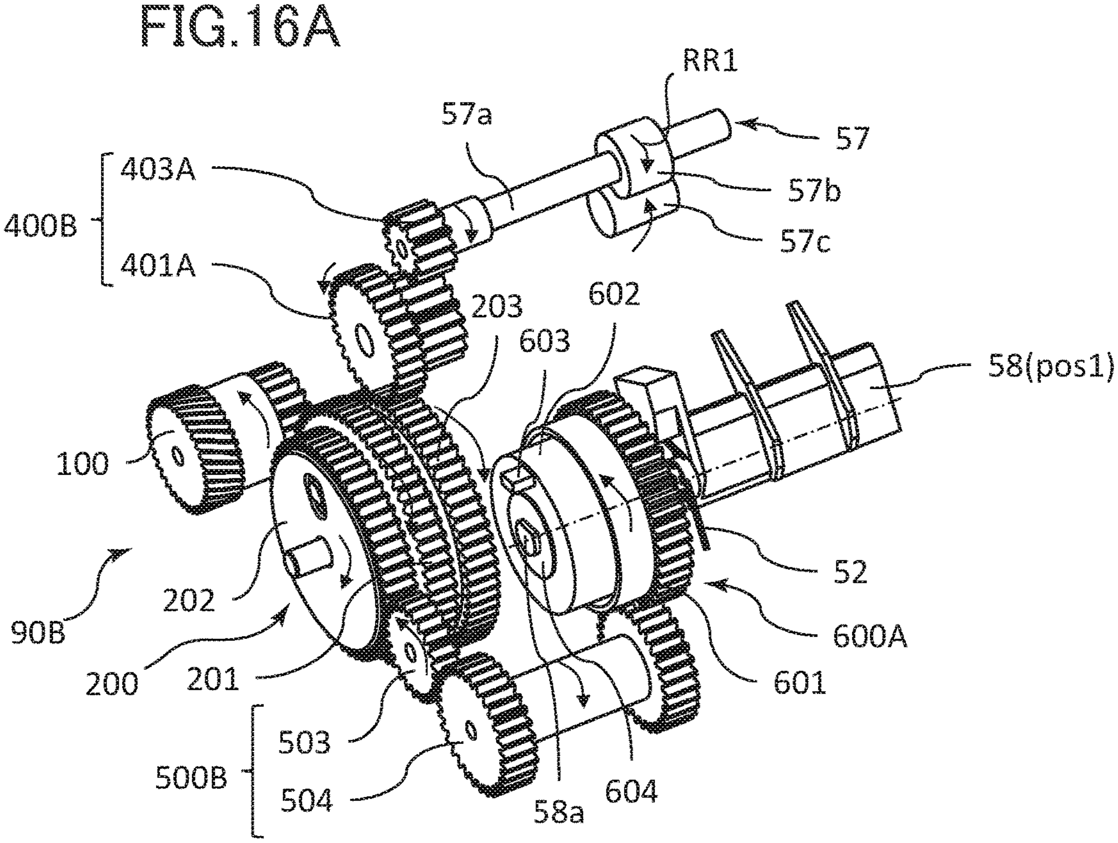
FIG. 16A is a perspective view illustrating a drive mechanism in which a clutch unit is in a power failure state.

Next, the drive mechanism 90B for driving the discharge reverse conveyance roller pair 57 and the guide member 58 will be described. As illustrated in FIG. 16A, the drive mechanism 90B includes a drive motor M, a discharge reverse conveyance input gear 100, a reverse conveyance unit 200, a discharge reverse conveyance drive train 400B, a connection switching gear train 500B, and a clutch unit 600A.

The discharge reverse conveyance input gear 100 is driven by the drive motor M via a gear train (not illustrated). The reverse conveyance unit 200 is driven by the discharge reverse conveyance input gear 100, and outputs driving force to the discharge reverse conveyance drive train 400B and the connection switching gear train 500B. The discharge reverse conveyance roller pair 57 is driven by the driving force transmitted to the discharge reverse conveyance drive train 400B. The driving force transmitted from the reverse conveyance unit 200 to the connection switching gear train 500B is transmitted to the clutch unit 600A. The guide member 58 is driven by the driving force transmitted to the clutch unit 600A.

Next, the reverse conveyance unit 200, the discharge reverse conveyance drive train 400B, the connection switching gear train 500B, and the clutch unit 600A will be described in more detail. The reverse conveyance unit 200 includes a reverse conveyance input gear 201, a reverse conveyance switching gear 202, and a reverse conveyance output gear 203. As described in the first embodiment, the reverse conveyance unit 200 can output the forward rotation or the backward rotation (clockwise or counterclockwise) by switching the rotation state of the reverse conveyance switching gear 202.

The discharge reverse conveyance drive train 400B includes a discharge reverse conveyance stage gear 401A that meshes with the reverse conveyance output gear 203 and a reverse conveyance roller gear 403A that meshes with the discharge reverse conveyance stage gear 401A. The reverse conveyance roller gear 403A is fixed to the drive shaft 57*a* of the driving roller 57*b* of the discharge reverse conveyance roller pair 57, and the driving roller 57*b* rotates via the drive shaft 57*a* as the reverse conveyance roller gear 403A rotates.

The connection switching gear train 500B includes a connection switching idler gear 503 and a connection switching gear pair 504. The connection switching idler gear 503 meshes with the reverse conveyance switching gear 202 and the connection switching gear pair 504, and the rotation of the reverse conveyance switching gear 202 is transmitted to the clutch unit 600A via the connection switching idler gear 503 and the connection switching gear pair 504.

The clutch unit 600A serving as a drive interruption unit includes a clutch input gear 601 that meshes with the connection switching gear pair 504, a clutch fixing portion 602, and a clutch output portion 604. The clutch fixing portion 602 is held by fixing a rotation stopper 603. The clutch output portion 604 engages with the D-cut rotation shaft 58*a* of the guide member 58 and rotates integrally with the guide member 58.

The clutch unit 600A switches the connection state between the clutch input gear 601 and the clutch output portion 604 according to the energized state of the clutch unit 600A. That is, when the clutch unit 600A is in the power failure state, the clutch input gear 601 and the clutch output portion 604 are not drivingly connected. Meanwhile, when the clutch unit 600A is in the energized state, the clutch input gear 601 and the clutch output portion 604 are drivingly connected.

The guide member 58 is biased to the first position by a return spring 52. The return spring 52 is a torsion coil spring, and has one end in contact with a member (not illustrated) and the other end in contact with the guide member 58. The guide member 58 moves against the biasing force of the return spring 52 by the driving force transmitted from the clutch input gear 601. As a result, the guide member 58 moves from the first position to the second position (the position indicated by the broken line in FIG. 14).

Operation of Discharge Reverse Conveyance Roller Pair and Guide Member

Figure 16B:
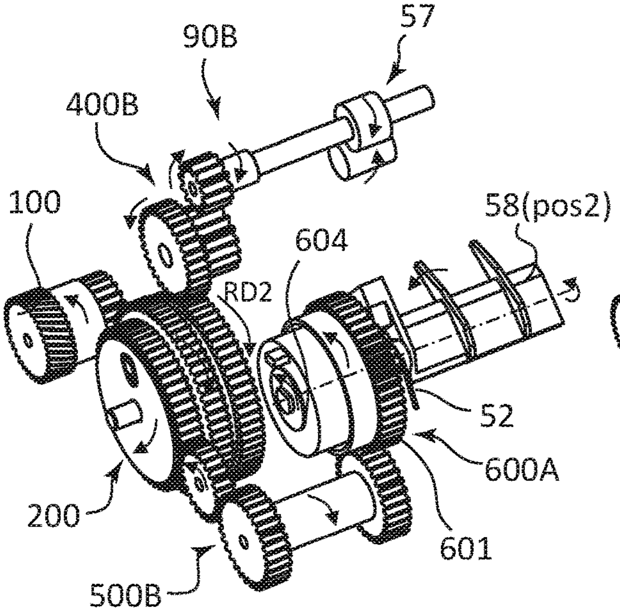
FIG. 16B is a perspective view illustrating the drive mechanism when the clutch unit is switched from the power failure state to an energized state.
Figure 16C:
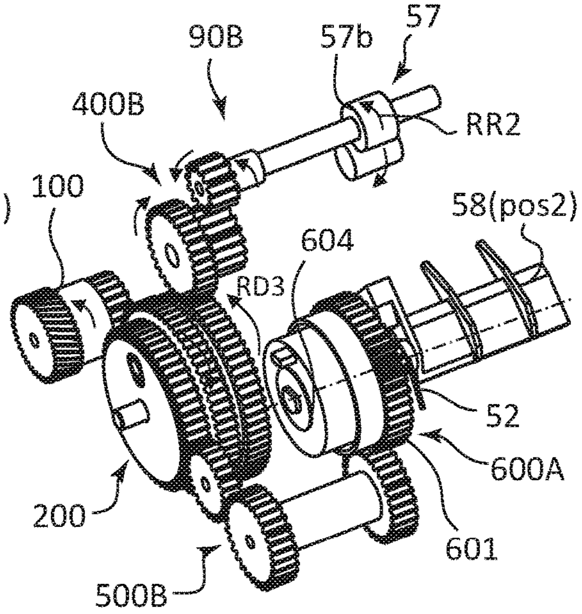
FIG. 16C is a perspective view illustrating the drive mechanism in which the clutch unit is in the energized state.

Next, operations of the discharge reverse conveyance roller pair 57 and the guide member 58 when the sheet S is switched back will be described. In FIGS. 16A to 16C, the rotation direction of each member is indicated by an arrow. In the following description, for example, the printing operation is executed to drive the drive motor M, and the discharge reverse conveyance input gear 100 and the reverse conveyance input gear 201 are rotated by the driving force of the drive motor M.

As illustrated in FIG. 16A, when the clutch unit 600A is in a power failure state, the discharge reverse conveyance roller pair 57 rotates in a direction of conveying the sheet S in the first direction D1 (see FIG. 15A). That is, the driving roller 51*d* of the reverse conveyance roller pair 51 rotates in a first rotation direction RR1. In this case, the rotation direction of the discharge reverse conveyance roller pair 57 is defined as a forward rotation direction. A rotation direction of the discharge reverse conveyance roller pair 57 when the sheet S is conveyed in the second direction D2 (see FIG. 15C) is defined as a backward rotation direction. In this case, the driving roller 51*d* of the reverse conveyance roller pair 51 rotates in the second rotation direction RR2.

When the clutch unit 600A is in the power failure state, since the drive connection between the clutch input gear 601 and the clutch output portion 604 is released, the rotation of the clutch input gear 601 is not transmitted to the guide member 58. Therefore, the guide member 58 is located at the first position (denoted as pos1 in the drawing) by the biasing force of the return spring 52, and can guide the sheet S toward the discharge reverse conveyance path R5. The discharge reverse conveyance roller pair 57 rotates in the forward rotation direction. That is, when the single-sided printing mode is executed and when the sheet S is discharged in the double-sided printing mode, the clutch unit 600A is in the power failure state.

When the sheet S is conveyed to the discharge reverse conveyance path R5 in the double-sided printing mode, first, the clutch unit 600A is in a power failure state as in the single-sided printing mode. Then, the sheet S is conveyed in the first direction D1, that is, toward the outside of the apparatus by the discharge reverse conveyance nip N3 of the discharge reverse conveyance roller pair 57. When the trailing edge of the sheet S passes through the guide member 58, as illustrated in FIG. 16B, the signal of the clutch unit 600A is switched from OFF to ON, and the clutch unit 600A is changed from the power failure state to the energized state. Thus, the clutch input gear 601 and the drive of the clutch output portion 604 are drivingly connected.

The guide member 58 moves from the first position to the second position against the biasing force of the return spring 52 by the driving force transmitted from the clutch input gear 601. In addition, while the guide member 58 is rotating from the first position to the second position, the rotation of the reverse conveyance switching gear 202 is not restricted and the reverse conveyance switching gear 202 rotates integrally with the reverse conveyance input gear 201. That is, the discharge reverse conveyance roller pair 57 remains rotated in the forward rotation direction.

After the guide member 58 moves to the second position, the guide member 58 abuts on a member (not illustrated) and the rotation thereof stops. Since the driving force is continuously transmitted from the reverse conveyance unit 200 to the clutch output portion 604, the guide member 58 is continuously held at the second position. As illustrated in FIG. 16C, when the rotation of the guide member 58 is stopped, the clutch unit 600A, the connection switching gear train 500B, and the reverse conveyance switching gear 202 linked with the guide member 58 are simultaneously stopped.

When the reverse conveyance switching gear 202 is stopped, the reverse conveyance unit 200 is switched from the forward rotation state to the backward rotation state, and the rotation direction of the reverse conveyance output gear 203 is switched from a direction of an arrow RD2 to a direction of an arrow RD3. Therefore, the rotation directions of the discharge reverse conveyance drive train 400B meshing with the reverse conveyance output gear 203 and the discharge reverse conveyance roller pair 57 are also switched in conjunction with each other. As a result, the discharge reverse conveyance roller pair 57 rotates in the second direction D2 (see FIG. 15D), that is, the backward rotation direction in which the sheet S is conveyed toward the inside of the printer 1. As a result, the sheet S is guided to the duplex conveyance path R3 by the guide member 58 located at the second position.

When the trailing edge of the sheet S passes through the guide member 58, the clutch unit 600A is switched from the energized state to the power failure state, and the drive mechanism 90B returns to the state illustrated in FIG. 16A.

Effects of Third Embodiment

As described above, the drive mechanism 90B according to the present embodiment is a mechanism that drives the discharge reverse conveyance roller pair 57 and the guide member 58 using the driving force of the drive motor M. As described above, by using the drive mechanism 90B of the present embodiment, the stopped state of the discharge reverse conveyance roller pair 57 is made as short as possible while the rotation direction of the discharge reverse conveyance roller pair 57 is switched after the signal of the clutch unit 600A is switched. Since the time for switching the rotation direction of the discharge reverse conveyance roller pair 57 is shortened and the sheet interval at the time of duplex printing can be reduced, productivity can be increased.

Fourth Embodiment

Next, a printer 1C (see FIG. 1) according to a fourth embodiment of the present invention will be described. The printer 1C is different from that the first embodiment in that a guide member 59 and a guide switching lever 605A are provided instead of the guide member 53 and the guide switching lever 605. The printer 1C serving as an image forming apparatus is different from that of the first embodiment in that a reverse conveyance unit 200C is provided instead of the reverse conveyance unit 200 and a clutch drive train 500C is provided instead of the clutch drive train 500. Therefore, configurations similar to those of the first embodiment will be described by omitting illustration or attaching the same reference numerals to the drawings.

Drive Mechanism

Figure 17A:
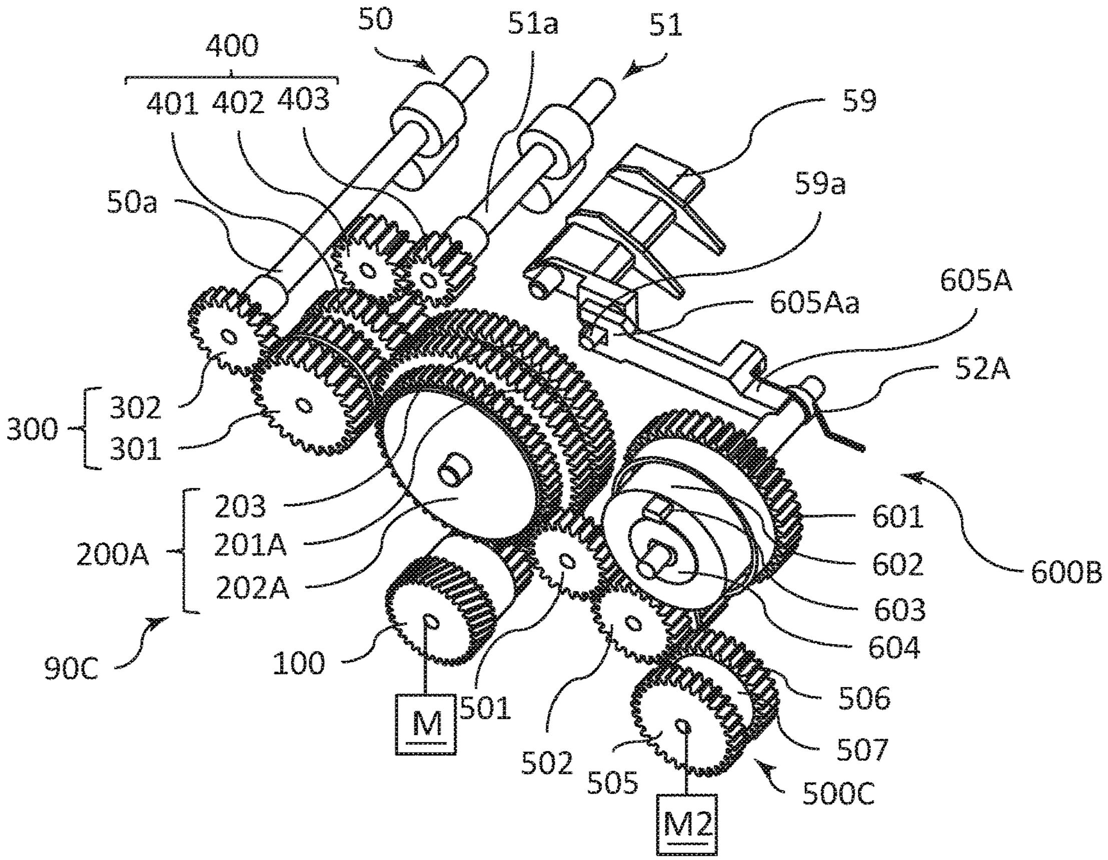
FIG. 17A is a perspective view illustrating a drive mechanism according to a fourth embodiment.
Figure 17B:
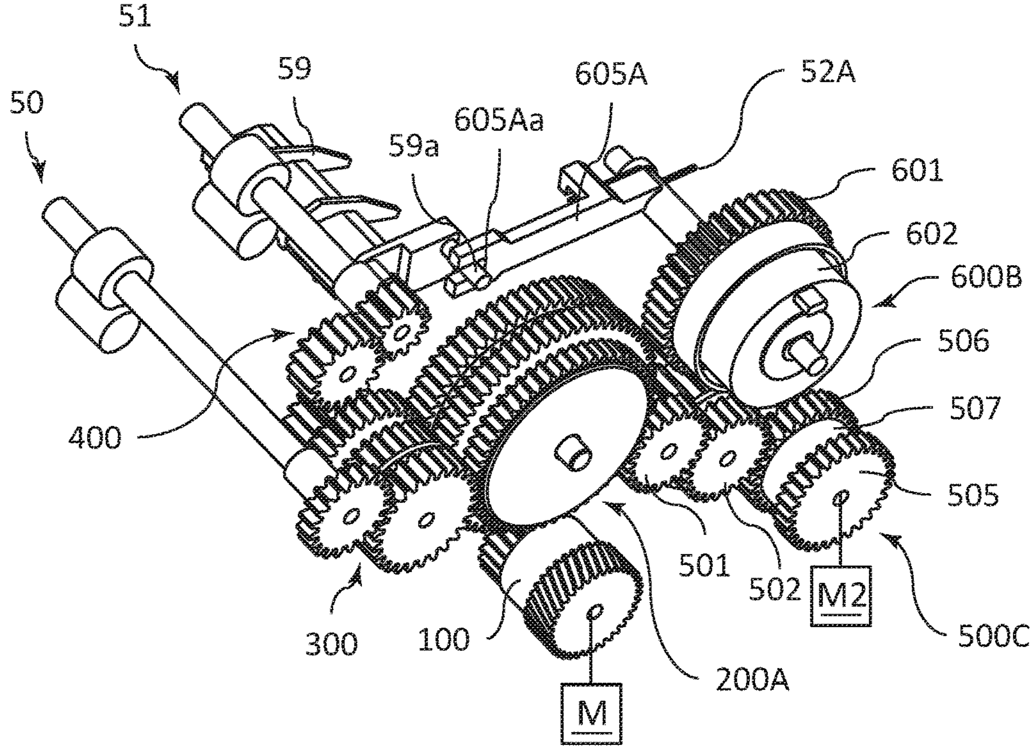
FIG. 17B is another perspective view illustrating the drive mechanism according to the fourth embodiment.

First, a drive mechanism 90C for driving a sheet discharge roller pair 50, a reverse conveyance roller pair 51, and a guide member 59 will be described. As illustrated in FIGS. 17A and 17B, the drive mechanism 90C includes a drive motor M, a discharge reverse conveyance input gear 100, a reverse conveyance unit 200A, a discharge drive train 300, and a reverse conveyance drive train 400. The drive mechanism 90C includes a clutch drive train 500C, a clutch unit 600B, and a drive switching motor M2.

The discharge reverse conveyance input gear 100 is driven by the drive motor M via a gear train (not illustrated). The reverse conveyance unit 200A is driven by the discharge reverse conveyance input gear 100, and outputs driving force to the discharge drive train 300, the reverse conveyance drive train 400, and the clutch drive train 500C. The sheet discharge roller pair 50 is driven by the driving force transmitted to the discharge drive train 300. The reverse conveyance roller pair 51 is driven by the driving force transmitted to the reverse conveyance drive train 400A. The driving force transmitted from the reverse conveyance unit 200A to the clutch drive train 500C is transmitted to the clutch unit 600B. The guide member 59 is driven by the driving force transmitted to the clutch unit 600B.

Next, the reverse conveyance unit 200A, the clutch drive train 500C, and the clutch unit 600B will be described in more detail. The reverse conveyance unit 200A serving as a drive switching unit includes a reverse conveyance input gear 201A, a reverse conveyance switching gear 202A, and a reverse conveyance output gear 203. As will be described later, the reverse conveyance unit 200A can output forward rotation or reverse rotation (clockwise or counterclockwise) by switching the rotation state of the reverse conveyance switching gear 202. The reverse conveyance switching gear 202A is configured to rotate in the same rotation direction and at the same rotational speed as the reverse conveyance input gear 201A by the driving force of the drive switching motor M2 serving as a second drive source.

The discharge drive train 300 and the reverse conveyance drive train 400 transmit driving forces to the sheet discharge roller pair 50 and the reverse conveyance roller pair 51, respectively, in the same configuration as in the first embodiment.

The clutch drive train 500C includes a clutch idler gear 501 that meshes with the reverse conveyance switching gear 202A, and a clutch stage gear 502 that meshes with the clutch idler gear 501 and the clutch input gear 601. The clutch drive train 500C includes a clutch first input gear 505, a clutch second input gear 506, and a torque limiter 507. The clutch second input gear 506 meshes with the clutch stage gear 502, and is drivingly connected to the clutch first input gear 505 via the torque limiter 507. The clutch first input gear 505 is driven by the drive switching motor M2 via a drive gear train (not illustrated).

The clutch unit 600B serving as a drive interruption unit includes a clutch input gear 601 that meshes with the clutch stage gear 502, a clutch fixing portion 602, a clutch output portion 604, and a guide switching lever 605A. The clutch fixing portion 602 is held by fixing a rotation stopper 603. The clutch output portion 604 is connected to the guide switching lever 605A.

The clutch unit 600B switches the connection state between the clutch input gear 601 and the clutch output portion 604 according to the energized state of the clutch unit 600B. That is, when the clutch unit 600B is in the power failure state, the clutch input gear 601 and the clutch output portion 604 are not drivingly connected. Meanwhile, when the clutch unit 600B is in the energized state, the clutch input gear 601 and the clutch output portion 604 are drivingly connected.

The guide switching lever 605A rotated integrally with the clutch output portion 604 has a groove-shaped engagement portion 605Aa engageable with a protrusion 59*a* of the guide member 59. A return spring 52A is a torsion coil spring, and has one end in contact with a member (not illustrated) and the other end in contact with the guide switching lever 605A to bias the guide member 59 in a direction of an arrow SD1. In addition, the guide member 59 biased by the return spring 52A abuts on a member (not illustrated) to be held at the first position (position indicated by the broken line in FIG. 1).

When the guide switching lever 605A rotates, the engagement portion 605Aa of the guide switching lever 605A presses the protrusion 59*a* of the guide member 59, and the guide member 59 moves in the direction opposite to the direction of the arrow SD1 against the biasing force of the return spring 52A. As a result, the guide member 59 moves from the first position to the second position (the position indicated by the solid line in FIG. 1).

Internal Configuration of Reverse Conveyance Unit

Figure 18A:
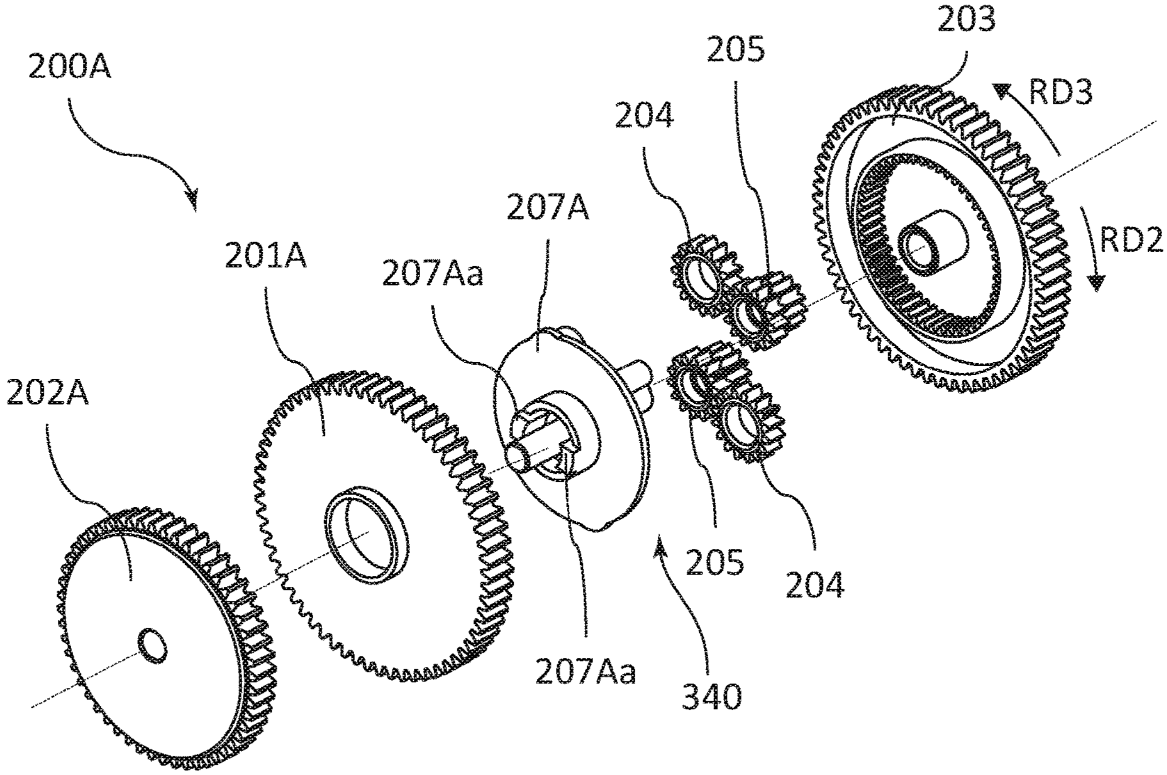
FIG. 18A is an exploded perspective view illustrating a reverse conveyance unit.
Figure 18B:
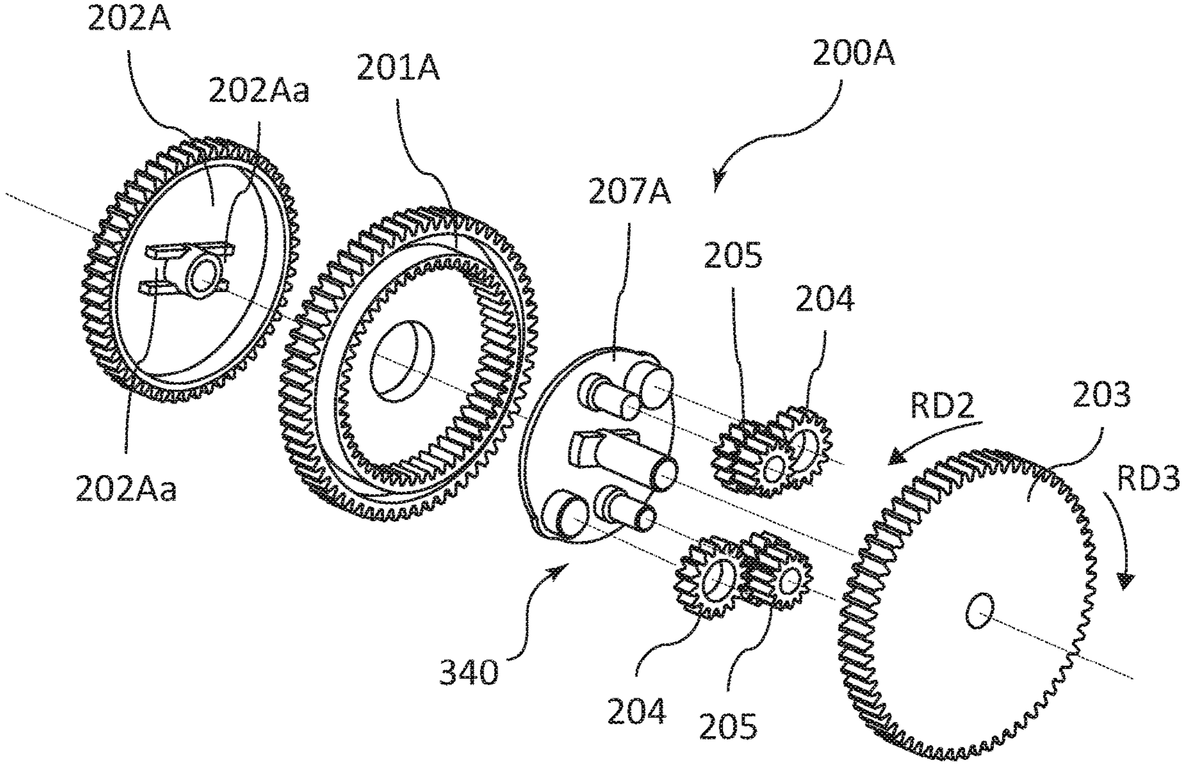
FIG. 18B is another exploded perspective view illustrating the reverse conveyance unit.

Next, an internal configuration of the reverse conveyance unit 200A will be described with reference to FIGS. 18A and 18B. As illustrated in FIGS. 18A and 18B, the reverse conveyance unit 200A includes a reverse conveyance input gear 201A, a reverse conveyance switching gear 202A, a reverse conveyance output gear 203, an internal idler gear 204, an internal stage gear 205, and an internal holder 207A. The reverse conveyance input gear 201A serving as an input unit is an input member that rotates by receiving the driving force transmitted from the discharge reverse conveyance input gear 100 described above. The reverse conveyance output gear 203 is an output member that outputs driving force to the reverse conveyance drive train 400 that rotates the reverse conveyance roller pair 51. The internal idler gear 204 and the internal stage gear 205 are configured by two symmetrically arranged gear trains, and are drive transmission members for transmitting drive from the reverse conveyance input gear 201A to the reverse conveyance output gear 203.

The internal holder 207A rotatably supports the reverse conveyance input gear 201A, and includes a reverse conveyance switching gear 202A, a reverse conveyance output gear 203, an internal idler gear 204, and a rotation shaft of the internal stage gear 205. In addition, the internal holder 207A and the reverse conveyance switching gear 202A are integrally connected by engagement between a protrusion 207Aa provided in the internal holder 207A and an engagement portion 202Aa provided in the reverse conveyance switching gear 202A. The reverse conveyance switching gear 202A, the internal holder 207A, the internal idler gear 204, and the internal stage gear 205 constitute a switching unit 340 that forward and backward rotates the driving force transmitted from the reverse conveyance input gear 201A according to the state of the reverse conveyance switching gear 202A and outputs the driving force to the reverse conveyance output gear 203.

A meshing relationship among the reverse conveyance input gear 201A, the reverse conveyance output gear 203, the internal idler gear 204, and the internal stage gear 205 in the reverse conveyance unit 200A is the same as that in FIGS. 5A to 5D of the first embodiment, and thus the description thereof will be omitted. In addition, the relationship between the rotation states of the reverse conveyance input gear 201A and the reverse conveyance output gear 203 depending on the operation state of the reverse conveyance switching gear 202A is the same operation as that of the first embodiment.

The reverse conveyance switching gear 202A is in an operation state (rotation state) as the driving force from the drive switching motor M2 is transmitted via the clutch drive train 500C. Further, the guide member 59 is stopped when the clutch unit 600B is in the energized state, and thus, the clutch stage gear 502 is in the stopped state. As a result, the clutch second input gear 506 meshing with the clutch stage gear 502 is also stopped, and the drive is not transmitted from the clutch first input gear 505 to the clutch second input gear 506 by the action of the torque limiter 507. Therefore, the reverse conveyance switching gear 202A is stopped without transmission of the driving force from the drive switching motor M2. When the clutch unit 600B is in the power failure state, the reverse conveyance switching gear 202A is in the operation state regardless of the position of the guide member 59.

That is, when the reverse conveyance switching gear 202A is in the stopped state, the rotation of the reverse conveyance input gear 201A is transmitted to the reverse conveyance output gear 203 via the internal idler gear 204 and the internal stage gear 205. In this case, the reverse conveyance output gear 203 rotates in a direction of an arrow RD3 which is a rotation direction opposite to that of the reverse conveyance input gear 201A. In this case, the switching unit 340 is in the second state, and outputs the driving force to the reverse conveyance output gear 203 so that the driving roller 51*d* of the reverse conveyance roller pair 51 rotates in a first rotation direction RR1 (see FIG. 19C).

Meanwhile, when the reverse conveyance switching gear 202A is in the operation state (rotation state) by the driving force of the drive switching motor M2, the reverse conveyance switching gear 202A rotates in the same direction and at the same rotational speed as the reverse conveyance input gear 201A. Therefore, it is equivalent to that the reverse conveyance input gear 201A and the reverse conveyance switching gear 202A rotate integrally. Therefore, the reverse conveyance output gear 203 receives a rotational driving force from the internal stage gear 205 that revolves orbitally while being fixed to the internal holder 207A, thereby rotating in the same direction as the reverse conveyance input gear 201A, that is, in the direction of the arrow RD2. In this case, the switching unit 340 is in the first state, and outputs the driving force to the reverse conveyance output gear 203 so that the driving roller 51*d* of the reverse conveyance roller pair 51 rotates in the second rotation direction RR2 (see FIG. 19A).

Operation of Reverse Conveyance Roller Pair and Guide Member

Next, operations of the reverse conveyance roller pair 51 and the guide member 59 when the sheet S is switched back will be described with reference to FIGS. 19A to 19C. Hereinafter, the state of the reverse conveyance unit 200A when the reverse conveyance output gear 203 rotates in the direction of the arrow RD2 that is the same as the direction of the arrow RD1 that is the rotation direction of the reverse conveyance input gear 201A is referred to as the time of a forward rotation or the forward rotation state. In addition, a state in which the reverse conveyance output gear 203 rotates in the direction of the arrow RD3 opposite to the direction of the arrow RD1, which is the rotation direction of the reverse conveyance input gear 201A, is referred to as the time of a backward rotation or a backward rotation state. In the following description, for example, the printing operation is executed to drive the drive motor M, and the discharge reverse conveyance input gear 100 and the reverse conveyance input gear 201A are rotated by the driving force of the drive motor M.

Figure 19A:
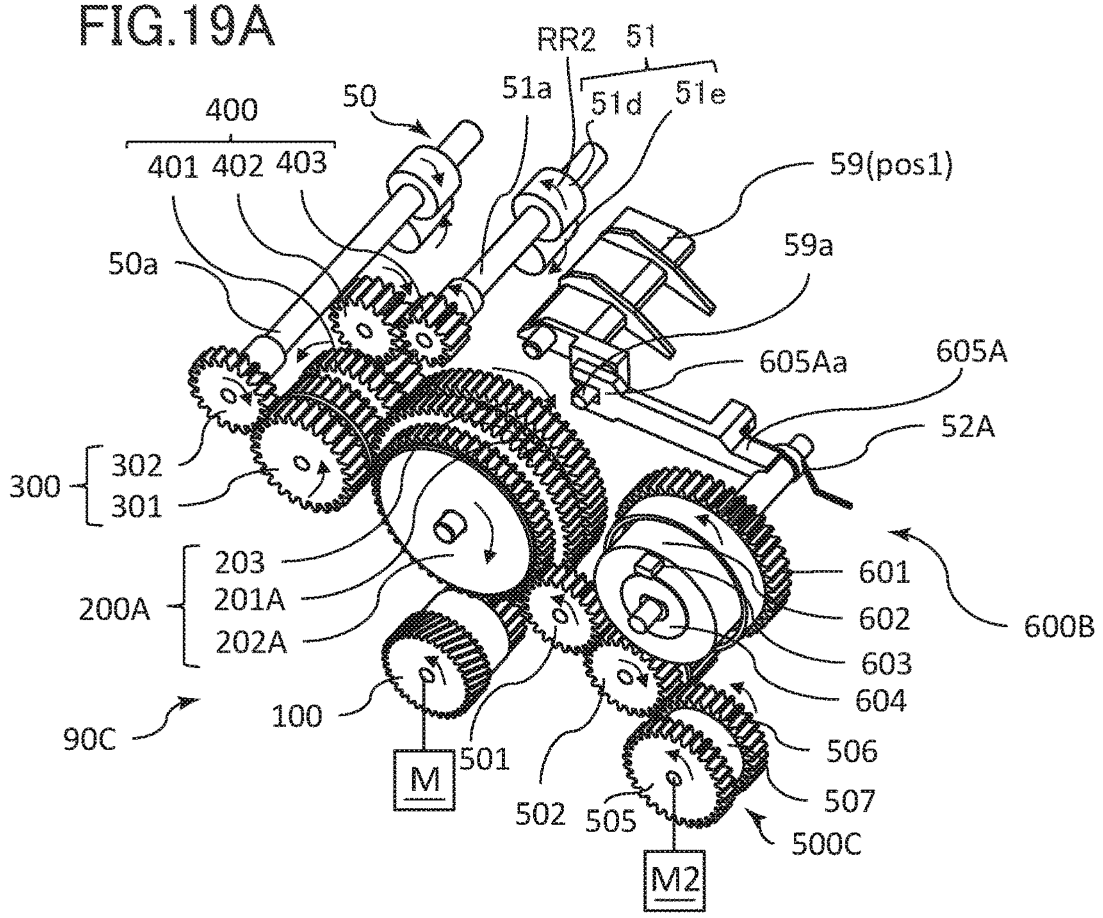
FIG. 19A is a perspective view illustrating the drive mechanism in which the clutch unit is in the power failure state.
Figure 19B:
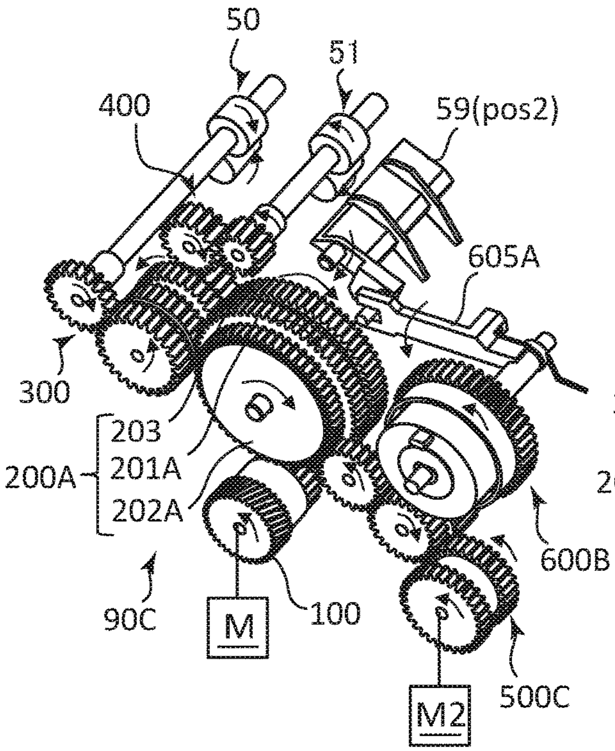
FIG. 19B is a perspective view illustrating the drive mechanism when the clutch unit is switched from the power failure state to the energized state.
Figure 19C:
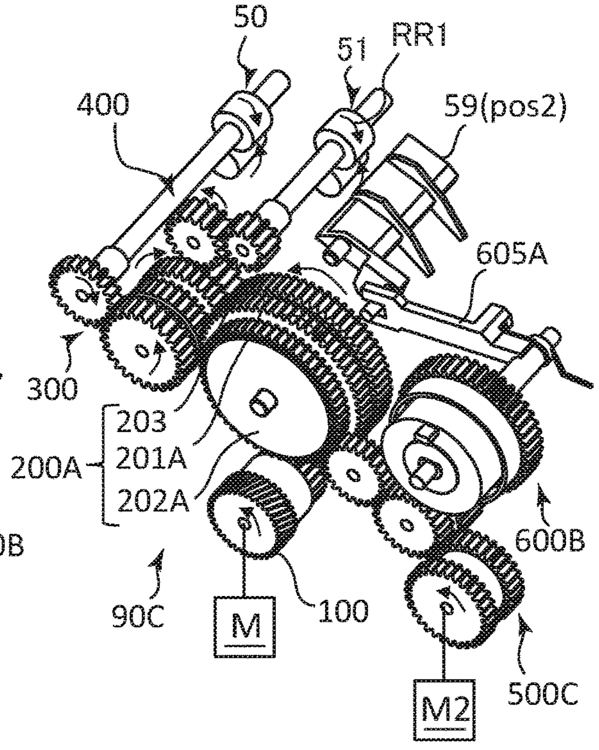
FIG. 19C is a perspective view illustrating the drive mechanism in which the clutch unit is in the energized state.

As illustrated in FIG. 19A, when the clutch unit 600B is in the power failure state, the reverse conveyance switching gear 202A rotates in the same direction and at the same rotational speed as the reverse conveyance input gear 201A by the driving force of the drive switching motor M2 being transmitted through the clutch drive train 500C. Therefore, the reverse conveyance output gear 203 of the reverse conveyance unit 200A is in the forward rotation state, and the reverse conveyance roller pair 51 is rotated in the direction of conveying the sheet S in the second direction D2 (see FIG. 2C), that is, in the backward rotation direction.

When the clutch unit 600B is in the power failure state, since the drive connection between the clutch input gear 601 and the guide switching lever 605A is released, the rotation of the clutch input gear 601 is not transmitted to the guide switching lever 605A. Therefore, the guide member 59 is located at the first position (denoted as pos1 in the drawing) by the biasing force of the return spring 52A, and can guide the sheet S conveyed by the fixing unit 40 toward the sheet discharge roller pair 50. The sheet discharge roller pair 50 rotates in the forward rotation direction. That is, when the single-sided printing mode is executed and when the sheet S is discharged in the double-sided printing mode, the clutch unit 600B is in a power failure state.

When the sheet is conveyed to the reverse conveyance path R2 in the double-sided printing mode, the signal of the clutch unit 600B is switched from OFF to ON. As illustrated in FIG. 19B, when the signal of clutch unit 600B is switched from OFF to ON, the clutch unit 600B is changed from the power failure state to the energized state. Thus, the clutch input gear 601 and the guide switching lever 605A are drivingly connected. The guide switching lever 605A is rotated by the driving force transmitted from the clutch input gear 601 via the reverse conveyance switching gear 202A and the clutch drive train 500C to move the guide member 59 to the second position (denoted as Pos2 in the drawing). While the guide member 59 is rotates from the first position to the second position, the rotation of the reverse conveyance switching gear 202A is not restricted, and the reverse conveyance switching gear 202A rotates integrally with the reverse conveyance input gear 201A. That is, the sheet discharge roller pair 50 remains rotated in the forward rotation direction.

After the guide member 59 moves to the second position, the guide member 59 abuts on a member (not illustrated) and the rotation thereof stops. Since the driving force is continuously transmitted from the reverse conveyance unit 200 to the guide switching lever 605A, the guide member 59 is continuously held at the second position. Since the operation of the guide switching lever 605A is restricted, the torque limiter 507 does not transmit a predetermined torque or more, and the clutch first input gear 505 rotates, but the drive train downstream of the clutch second input gear 506 stops. That is, as illustrated in FIG. 19C, when the rotation of the guide member 59 is stopped, the guide switching lever 605A, the clutch drive train 500C, and the reverse conveyance switching gear 202A linked with the guide member 59 are simultaneously stopped.

When the reverse conveyance switching gear 202A is stopped, the above-described reverse conveyance unit 200A is switched from the forward rotation state to the backward rotation state, and the rotation direction of the reverse conveyance output gear 203 is switched from the direction of the arrow RD2 to the direction of the arrow RD3 (see FIG. 18A). Therefore, the rotation direction of the reverse conveyance drive train 400 meshing with the reverse conveyance output gear 203 and the rotation direction of the reverse conveyance roller pair 51 are also switched in conjunction with each other. As a result, the reverse conveyance roller pair 51 rotates in the forward rotation direction to convey the sheet S in the first direction D1 (see FIG. 2B), that is, convey the sheet S toward the outside of the printer 1. As a result, the sheet S is guided to the reverse conveyance path R2 by the guide member 53 located at the second position, and is conveyed in the first direction D1 by the reverse conveyance roller pair 51.

When the clutch unit 600B is in the energized state, as described above, the guide member 59 is held at the second position, and the reverse conveyance roller pair 51 rotates in the forward rotation direction. When the trailing edge of the sheet S passes through the guide member 53, the signal of the clutch unit 600B is switched from ON to OFF, and the clutch unit 600B is changed from the energized state to the power failure state. Accordingly, the drive connection between the clutch input gear 601 and the guide switching lever 605A is released.

Since no driving force is input to the guide switching lever 605A, the guide member 59 rotates from the second position to the first position by the biasing force of the return spring 52A as illustrated in FIG. 19A. When the guide member 59 starts to rotate from the second position to the first position, the rotation restriction of the reverse conveyance switching gear 202A is released, and the reverse conveyance switching gear 202A can freely rotate. As a result, the reverse conveyance unit 200A is switched from the backward rotation state to the forward rotation state, and the rotation direction of the reverse conveyance output gear 203 is switched from the direction of the arrow RD3 to the direction of the arrow RD2 (see FIG. 18A).

Therefore, the rotation direction of the reverse conveyance drive train 400 meshing with the reverse conveyance output gear 203 and the rotation direction of the reverse conveyance roller pair 51 are also switched in conjunction with each other. As a result, the reverse conveyance roller pair 51 rotates in the backward rotation direction to convey the sheet S in the second direction D2 (see FIG. 2C), that is, convey the sheet S toward the inside of the printer 1. Therefore, the sheet S is switched back, and the sheet S is guided to the duplex conveyance path R3 by the guide member 59 located at the first position. Even when the guide member 59 is located at the first position, the rotation of the reverse conveyance switching gear 202 is not restricted because the clutch unit 600B is in the power failure state. Therefore, the sheet discharge roller pair 50 remains rotated in the forward rotation direction.

Effects of Fourth Embodiment

As described above, the drive mechanism 90C according to the present embodiment is a mechanism that drives the reverse conveyance roller pair 51 and the guide member 59 using the driving force of the drive motor M. As described above, by using the drive mechanism 90C of the present embodiment, the stopped state of the reverse conveyance roller pair 51 is made as short as possible while the rotation direction of the reverse conveyance roller pair 51 is switched after the signal of the clutch unit 600B is switched. Since the time when the rotation direction of the reverse conveyance roller pair 51 is switched is shortened and the sheet interval at the time of duplex printing can be reduced, productivity can be increased.

Further, the reverse conveyance unit 200A has a configuration in which the locking lever 209 and the stopper holder 208 are omitted as compared with the reverse conveyance unit 200 of the first embodiment. This is because the reverse conveyance switching gear 202A is configured to rotate in the same rotation direction and at the same rotational speed as the reverse conveyance input gear 201 by the driving force of the drive switching motor M2. As a result, the reverse conveyance unit 200A can be downsized in the width direction (axial direction), and the drive mechanism 90C can be downsized.

Modification of Fourth Embodiment

In the present embodiment, the rotation state of the reverse conveyance switching gear 202A is switched to be rotated or stopped, but the rotation direction of the reverse conveyance output gear 203 may be switched by changing the rotational speed or the rotation direction instead of stopping.

Further, in the present embodiment, the drive source for driving the reverse conveyance roller pair 51 and the drive source for driving the guide member 59 are the same, but a configuration in which driving is performed using two different driving sources may be used.

Fifth Embodiment

Next, a printer 1D (see FIG. 1) according to a fifth embodiment of the present invention will be described. The printer 1D as an image forming apparatus is different from that of the fourth embodiment in that a reverse conveyance unit 200B is provided instead of the reverse conveyance unit 200A and a clutch drive train 500D is provided instead of the clutch drive train 500C. Therefore, configurations similar to those of the fourth embodiment will be described by omitting illustration or attaching the same reference numerals to the drawings.

Drive Mechanism

Figure 20A:
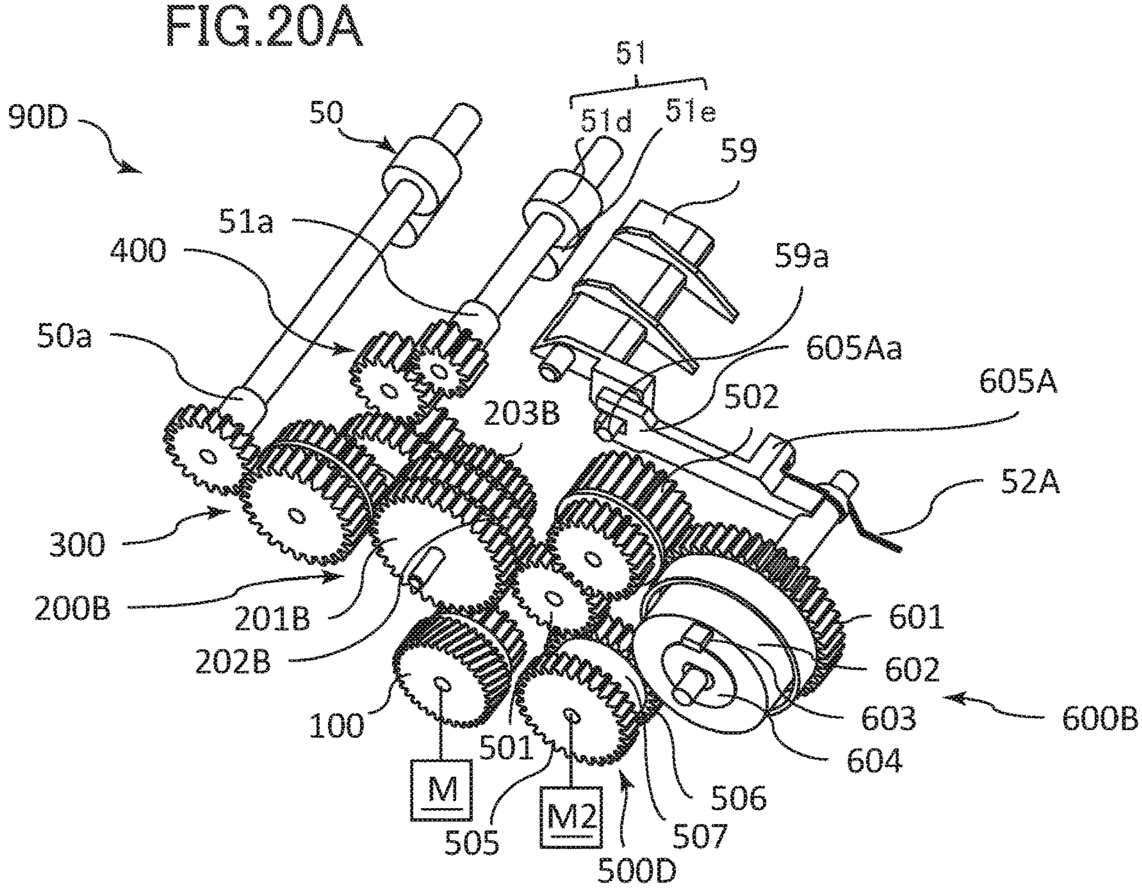
FIG. 20A is a perspective view illustrating a drive mechanism according to a fifth embodiment.
Figure 20B:
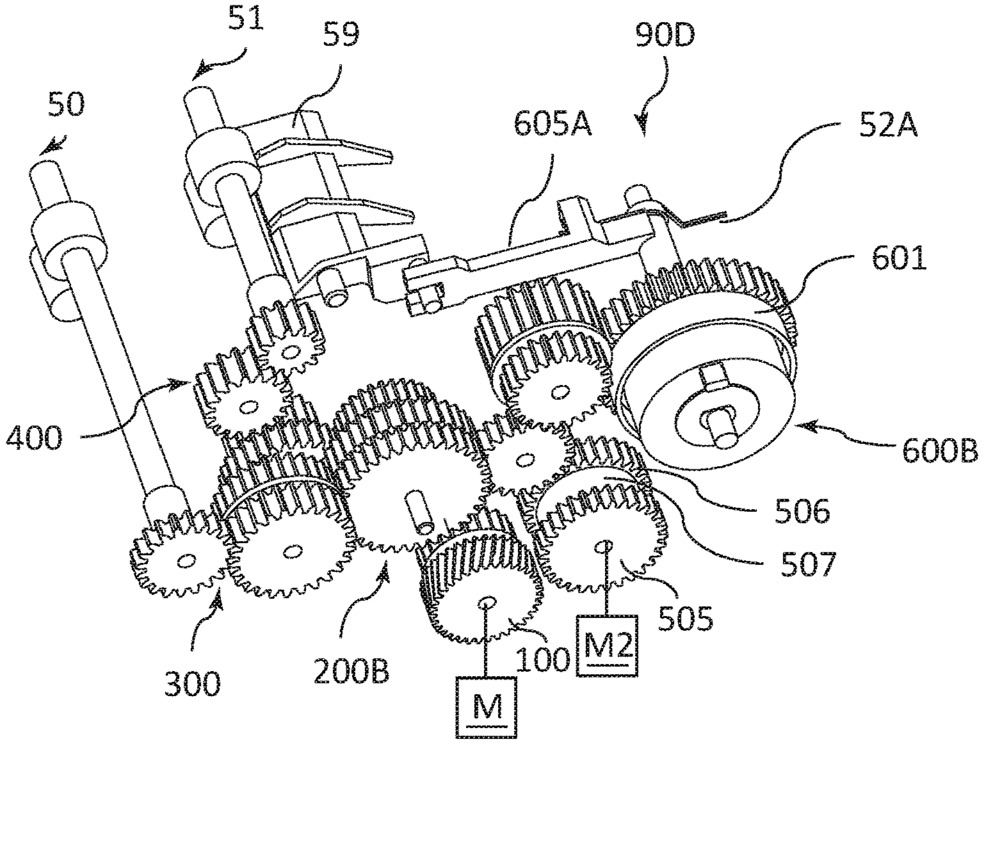
FIG. 20B is another perspective view illustrating the drive mechanism according to the fifth embodiment.

First, a drive mechanism 90D for driving a sheet discharge roller pair 50, a reverse conveyance roller pair 51, and a guide member 59 will be described. As illustrated in FIGS. 20A and 20B, the drive mechanism 90D includes a drive motor M, a discharge reverse conveyance input gear 100, a reverse conveyance unit 200B, a discharge drive train 300, and a reverse conveyance drive train 400. The drive mechanism 90D includes a clutch drive train 500D, a clutch unit 600B, and a drive switching motor M2.

The discharge reverse conveyance input gear 100 is driven by the drive motor M via a gear train (not illustrated). The reverse conveyance unit 200B is driven by the discharge reverse conveyance input gear 100, and outputs driving force to the discharge drive train 300, the reverse conveyance drive train 400, and the clutch drive train 500D. The sheet discharge roller pair 50 is driven by the driving force transmitted to the discharge drive train 300. The reverse conveyance roller pair 51 is driven by the driving force transmitted to the reverse conveyance drive train 400A. The driving force transmitted from the reverse conveyance unit 200B to the clutch drive train 500D is transmitted to the clutch unit 600B serving as a drive interruption unit. The guide member 59 is driven by the driving force transmitted to the clutch unit 600B.

Next, the reverse conveyance unit 200B and the clutch drive train 500D will be described in more detail. The reverse conveyance unit 200B serving as a drive switching unit includes a reverse conveyance input gear 201B, a reverse conveyance switching gear 202B, and a reverse conveyance output gear 203B. As will be described later, the reverse conveyance unit 200B can output forward rotation or reverse rotation (clockwise or counterclockwise) by switching the rotation state of the reverse conveyance switching gear 202B. The reverse conveyance switching gear 202B is configured to rotate in the same rotation direction and at the same rotational speed as the reverse conveyance input gear 201A by the driving force of the drive switching motor M2.

The clutch drive train 500D includes a clutch idler gear 501 that meshes with the reverse conveyance switching gear 202B, and a clutch stage gear 502 that meshes with the clutch idler gear 501 and the clutch input gear 601. The clutch drive train 500C includes a clutch first input gear 505, a clutch second input gear 506, and a torque limiter 507. The clutch second input gear 506 meshes with the clutch idler gear 501, and is drivingly connected to the clutch first input gear 505 via the torque limiter 507. The clutch first input gear 505 is driven by the drive switching motor M2 via a drive gear train (not illustrated).

Internal Configuration of Reverse Conveyance Unit

Figure 21A:
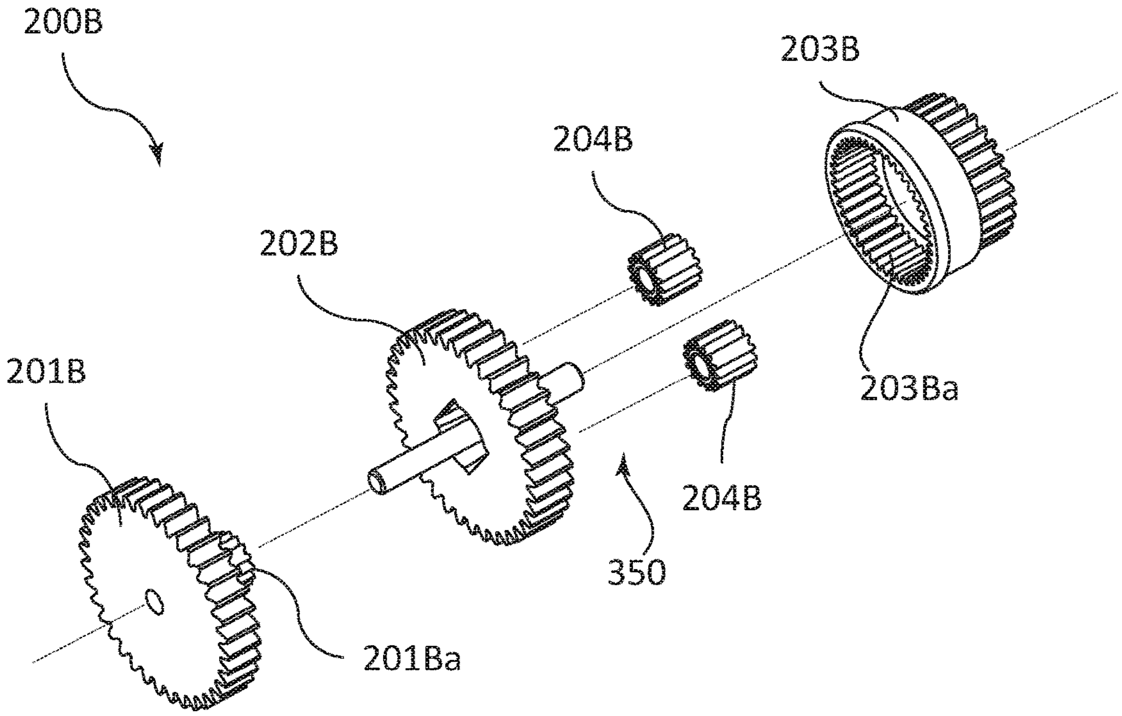
FIG. 21A is an exploded perspective view illustrating a reverse conveyance unit.
Figure 21B:
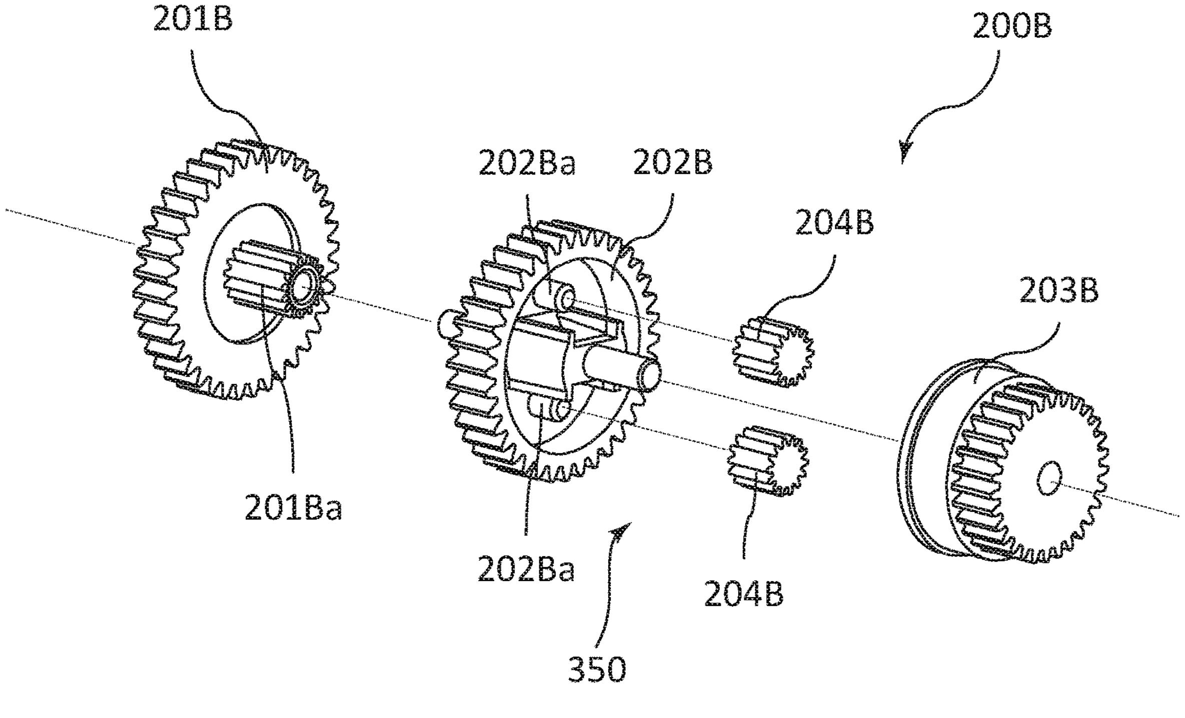
FIG. 21B is another exploded perspective view illustrating the reverse conveyance unit.

Next, an internal configuration of the reverse conveyance unit 200B will be described with reference to FIGS. 21A to 22D. As illustrated in FIGS. 21A and 21B, the reverse conveyance unit 200B includes a reverse conveyance input gear 201B serving as an input unit, a reverse conveyance switching gear 202B, a reverse conveyance output gear 203B serving as an output unit, and an internal idler gear 204B. The reverse conveyance input gear 201A is an input member that rotates by receiving the driving force transmitted from the discharge reverse conveyance input gear 100 described above. The reverse conveyance output gear 203B is an output member that outputs driving force to the reverse conveyance drive train 400 that rotates the reverse conveyance roller pair 51. The internal idler gear 204B includes a pair of symmetrically disposed gears, and is a drive transmission member for transmitting drive from the reverse conveyance input gear 201B to the reverse conveyance output gear 203B. The reverse conveyance switching gear 202B includes a reverse conveyance input gear 201B, a reverse conveyance output gear 203B, and rotation shafts of the internal idler gear 204B, and is configured to hold the respective gears.

The internal idler gear 204B is rotatably disposed on a pair of rotation shafts 202Ba provided in the reverse conveyance switching gear 202B, and meshes with a sun gear 201Ba provided at the center of the reverse conveyance input gear 201B. The internal idler gear 204B meshes with an internal tooth gear 203Ba provided in the reverse conveyance output gear 203B. That is, the driving force of the reverse conveyance input gear 201B is transmitted to the reverse conveyance output gear 203B via the sun gear 201Ba, the pair of internal idler gears 204B, and the internal tooth gear 203Ba. The reverse conveyance switching gear 202B and the internal idler gear 204B constitute a switching unit 350 that forward and backward rotates the driving force transmitted from the reverse conveyance input gear 201B according to the state of the reverse conveyance switching gear 202B and outputs the driving force to the reverse conveyance output gear 203B.

Drive Switching Operation of Reverse Conveyance Unit

Figure 22A:
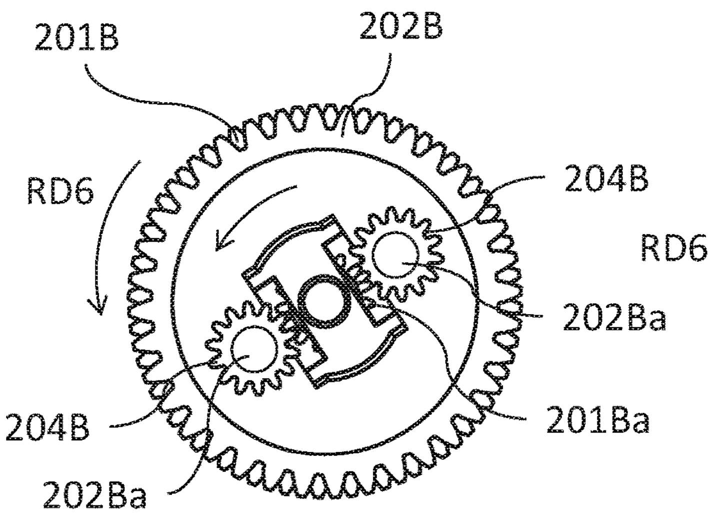
FIG. 22A is a front view illustrating an operation of the reverse conveyance unit when a reverse conveyance switching gear is in a rotation state.
Figure 22C:
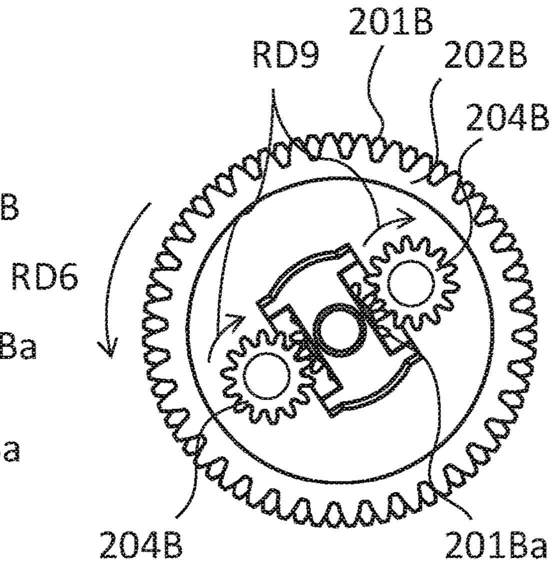
FIG. 22C is a front view illustrating an operation of the reverse conveyance unit when the reverse conveyance switching gear is in a stopped state.
Figure 22B:
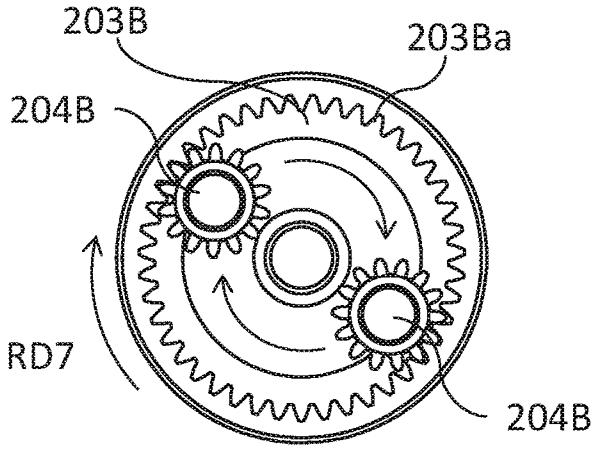
FIG. 22B is a rear view illustrating the operation of the reverse conveyance unit when the reverse conveyance switching gear is in the rotation state.
Figure 22D:
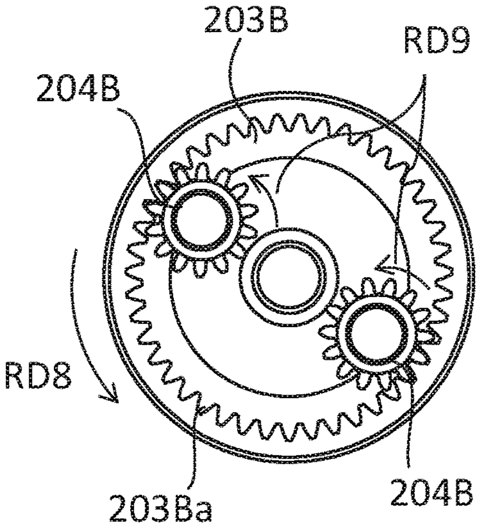
FIG. 22D is a rear view illustrating an operation of the reverse conveyance unit when the reverse conveyance switching gear is in the stopped state.

An operation of switching the rotation direction of the reverse conveyance output gear 203B of the reverse conveyance unit 200B will be described with reference to FIGS. 22A to 22D. FIGS. 22A and 22B are a front view and a rear view illustrating the operation of the reverse conveyance unit 200B when the reverse conveyance switching gear 202B is in the rotation state. FIGS. 22C and 22D are a front view and a rear view illustrating the operation of the reverse conveyance unit 200B when the reverse conveyance switching gear 202B is in the stopped state. Here, FIGS. 22A and 22C do not illustrate the reverse conveyance output gear 203B, and FIGS. 22B and 22D do not illustrate the reverse conveyance input gear 201B and the reverse conveyance switching gear 202B.

As illustrated in FIGS. 22A and 22B, when the reverse conveyance switching gear 202B is in the rotation state, the driving force from the clutch first input gear 505 is transmitted to the reverse conveyance switching gear 202B, and the reverse conveyance switching gear 202B rotates in the same rotation direction and at the same rotational speed as the reverse conveyance input gear 201B. In this case, it is equivalent that the reverse conveyance switching gear 202B and the reverse conveyance input gear 201B rotate integrally. Since relative displacement does not occur between the reverse conveyance switching gear 202B and the reverse conveyance input gear 201B, the internal idler gear 204B rotatably supported by the reverse conveyance switching gear 202B is maintained in a stopped (fixed) state with respect to the reverse conveyance switching gear 202B.

Therefore, the internal idler gear 204B revolves integrally with the reverse conveyance input gear 201B and the reverse conveyance switching gear 202B in the same direction as the direction of the arrow RD6 around the rotation shaft of the reverse conveyance input gear 201B. The rotation in the direction of an arrow RD6 input to the reverse conveyance input gear 201B is transmitted to the reverse conveyance output gear 203B via the internal idler gear 204B that revolves in the same direction as the reverse conveyance input gear 201B and the reverse conveyance switching gear 202B rotate integrally. That is, as illustrated in FIG. 22B, the reverse conveyance output gear 203B receives a rotational driving force from the internal idler gear 204B, which revolves orbitally while being fixed with respect to the reverse conveyance switching gear 202B, to the internal teeth 203*ba*. As a result, the reverse conveyance output gear 203B rotates in the direction of the arrow RD7, which is the same direction as the direction of the arrow RD6, and outputs the rotational driving force. In this case, the switching unit 350 is in the first state, and outputs the driving force to the reverse conveyance output gear 203B so that the driving roller 51*d* of the reverse conveyance roller pair 51 rotates in the second rotation direction RR2 (see FIG. 23A).

As illustrated in FIG. 22C, when the reverse conveyance switching gear 202B is in the stopped state, the rotation of the reverse conveyance input gear 201B in the direction of the arrow RD6 is transmitted to the internal idler gear 204B meshing with the sun gear 201Ba. The internal idler gear 204B rotates about the rotation shaft 202Ba in an arrow RD9 direction opposite to the arrow RD6 direction which is the rotation direction of the reverse conveyance input gear 201B. As illustrated in FIG. 22D, since the reverse conveyance output gear 203B meshes with the internal idler gear 204B with the internal teeth 203*ba*, the reverse conveyance output gear 203B rotates in the direction of an arrow RD8 that is the same as the direction of an arrow RD9 which is the rotation direction of the internal idler gear 204B. That is, the reverse conveyance output gear 203B rotates in the direction of the arrow RD8 opposite to the direction of the arrow RD6, which is the rotation direction of the reverse conveyance input gear 201B. The rotation direction of the rotational driving force input from the reverse conveyance input gear 201B is changed between the sun gear 201Ba and the internal idler gear 204B. In this case, the switching unit 350 is in the second state, and outputs the driving force to the reverse conveyance output gear 203B so that the driving roller 51*d* of the reverse conveyance roller pair 51 rotates in the first rotation direction RR1 (see FIG. 23C).

Operation of Reverse Conveyance Roller Pair and Guide Member

Next, the operations of the reverse conveyance roller pair 51 and the guide member 59 when the sheet S is switched back will be described with reference to FIGS. 23A to 23C. Hereinafter, the state of the reverse conveyance unit 200B when the reverse conveyance output gear 203B is rotating in the direction of the arrow RD8 which is the same as the direction of the arrow RD6 which is the rotation direction of the reverse conveyance input gear 201B is referred to as the time of a forward rotation or a forward rotation state. A state in which the reverse conveyance output gear 203B rotates in the direction of the arrow RD8 opposite to the direction of the arrow RD6, which is the rotation direction of the reverse conveyance input gear 201B, is referred to as the time of a backward rotation or a backward rotation state. In the following description, for example, the printing operation is executed to drive the drive motor M, and the discharge reverse conveyance input gear 100 and the reverse conveyance input gear 201B are rotated by the driving force of the drive motor M.

Figure 23A:
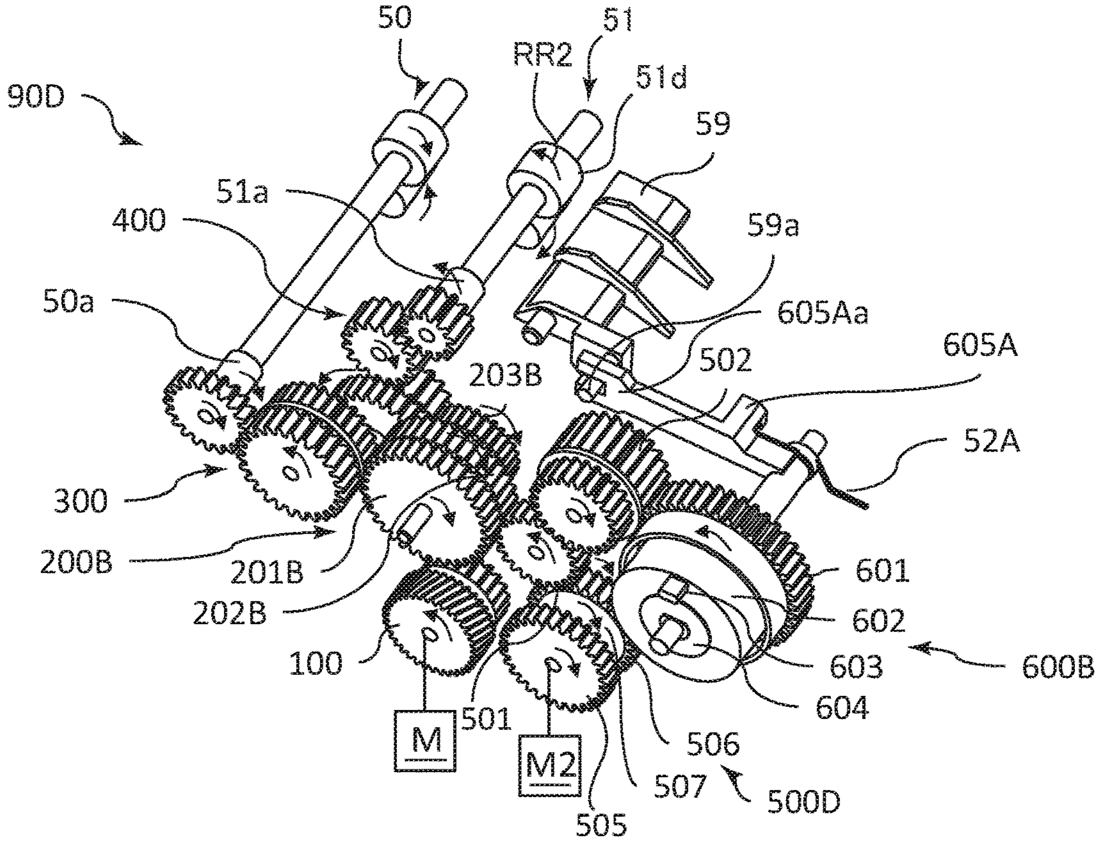
FIG. 23A is a perspective view illustrating a drive mechanism in which a clutch unit is in a power failure state.
Figure 23B:
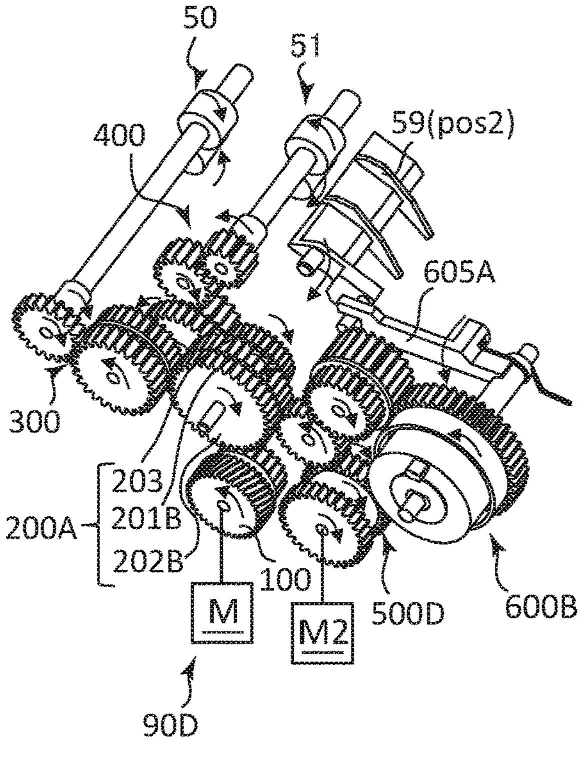
FIG. 23B is a perspective view illustrating the drive mechanism when the clutch unit is switched from the power failure state to an energized state.
Figure 23C:
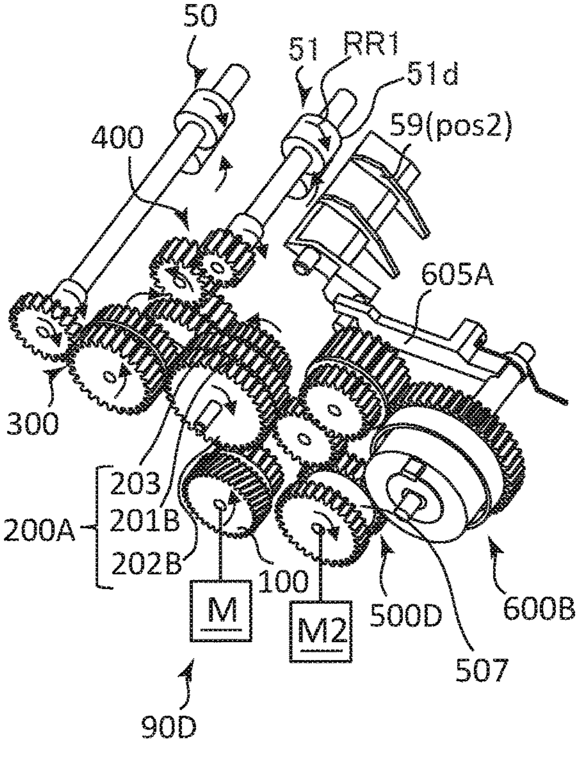
FIG. 23C is a perspective view illustrating the drive mechanism in which the clutch unit is in the energized state.

As illustrated in FIG. 23A, when the clutch unit 600B is in the power failure state, the reverse conveyance switching gear 202B rotates in the same direction and at the same rotational speed as the reverse conveyance input gear 201B by the driving force of the drive switching motor M2 being transmitted through the clutch drive train 500D. Therefore, the reverse conveyance output gear 203B of the reverse conveyance unit 200B is in the forward rotation state, and the reverse conveyance roller pair 51 rotates in the direction of conveying the sheet S in the second direction D2 (see FIG. 2C), that is, in the backward rotation direction.

When the clutch unit 600B is in the power failure state, since the drive connection between the clutch input gear 601 and the guide switching lever 605A is released, the rotation of the clutch input gear 601 is not transmitted to the guide switching lever 605A. Therefore, the guide member 59 is located at the first position (denoted as pos1 in the drawing) by the biasing force of the return spring 52A, and can guide the sheet S conveyed by the fixing unit 40 toward the sheet discharge roller pair 50. The sheet discharge roller pair 50 rotates in the forward rotation direction. That is, when the single-sided printing mode is executed and when the sheet S is discharged in the double-sided printing mode, the clutch unit 600B is in a power failure state.

When the sheet S is conveyed to the reverse conveyance path R2 in the double-sided printing mode, the signal of the clutch unit 600B is switched from OFF to ON. As illustrated in FIG. 23B, when the signal of the clutch unit 600B is switched from OFF to ON, the clutch unit 600B is changed from the power failure state to the energized state. Thus, the clutch input gear 601 and the guide switching lever 605A are drivingly connected. The guide switching lever 605A is rotated by the driving force transmitted from the clutch input gear 601 via the reverse conveyance switching gear 202A and the clutch drive train 500D to move the guide member 59 to the second position (denoted as Pos2 in the drawing). In addition, while the guide member 59 rotates from the first position to the second position, the rotation of the reverse conveyance switching gear 202B is not restricted and the reverse conveyance switching gear 202B rotates integrally with the reverse conveyance input gear 201B. That is, the sheet discharge roller pair 50 remains rotated in the forward rotation direction.

After the guide member 59 moves to the second position, the guide member 59 abuts on a member (not illustrated) and the rotation thereof stops. Since the driving force is continuously transmitted from the reverse conveyance unit 200 to the guide switching lever 605A, the guide member 59 is continuously held at the second position. Since the operation of the guide switching lever 605A is restricted, the torque limiter 507 does not transmit a predetermined torque or more, and the clutch first input gear 505 rotates, but the drive train downstream of the clutch second input gear 506 stops. As illustrated in FIG. 23C, when the rotation of the guide member 59 is stopped, the guide switching lever 605A, the clutch drive train 500D, and the reverse conveyance switching gear 202B linked with the guide member 59 are simultaneously stopped.

When the reverse conveyance switching gear 202B is stopped, the above-described reverse conveyance unit 200B is switched from the forward rotation state to the backward rotation state, and the rotation direction of the reverse conveyance output gear 203B is switched from the direction of the arrow RD7 to the direction of the arrow RD8 (see FIGS. 22B and 22C). Therefore, the rotation directions of the reverse conveyance drive train 400 meshing with the reverse conveyance output gear 203B and the reverse conveyance roller pair 51 are also switched in conjunction with each other. As a result, the reverse conveyance roller pair 51 rotates in the forward rotation direction to convey the sheet S in the first direction D1 (see FIG. 2B), that is, convey the sheet S toward the outside of the printer 1. As a result, the sheet S is guided to the reverse conveyance path R2 by the guide member 59 located at the second position, and is conveyed in the first direction D1 by the reverse conveyance roller pair 51.

When the clutch unit 600B is in the energized state, as described above, the guide member 59 is held at the second position, and the reverse conveyance roller pair 51 rotates in the forward rotation direction. When the trailing edge of the sheet S passes through the guide member 53, the signal of the clutch unit 600B is switched from ON to OFF, and the clutch unit 600B is changed from the energized state to the power failure state. Accordingly, the drive connection between the clutch input gear 601 and the guide switching lever 605A is released.

Since no driving force is input to the guide switching lever 605A, the guide member 59 rotates from the second position to the first position by the biasing force of the return spring 52A as illustrated in FIG. 23A. When the guide member 59 starts to rotate from the second position to the first position, the rotation restriction of the reverse conveyance switching gear 202A is released, and the reverse conveyance switching gear 202A can freely rotate. As a result, the reverse conveyance unit 200B is switched from the backward rotation state to the forward rotation state, and the rotation direction of the reverse conveyance output gear 203B is switched from the direction of the arrow RD8 to the direction of the arrow RD7 (see FIGS. 22B and 22D).

Therefore, the rotation directions of the reverse conveyance drive train 400 meshing with the reverse conveyance output gear 203B and the reverse conveyance roller pair 51 are also switched in conjunction with each other. As a result, the reverse conveyance roller pair 51 rotates in the backward rotation direction to convey the sheet S in the second direction D2 (see FIG. 2C), that is, convey the sheet S toward the inside of the printer 1. Therefore, the sheet S is switched back, and the sheet S is guided to the duplex conveyance path R3 by the guide member 59 located at the first position. Even when the guide member 59 is located at the first position, the rotation of the reverse conveyance switching gear 202B is not restricted because the clutch unit 600B is in the power failure state. Therefore, the sheet discharge roller pair 50 remains rotated in the forward rotation direction.

Effects of Fifth Embodiment

As described above, the drive mechanism 90D according to the present embodiment is a mechanism that drives the reverse conveyance roller pair 51 and the guide member 59 using the driving force of the drive motor M. As described above, by using the drive mechanism 90D of the present embodiment, the stopped state of the reverse conveyance roller pair 51 is made as short as possible while the rotation direction of the reverse conveyance roller pair 51 is switched after the signal of the clutch unit 600B is switched. Since the time when the rotation direction of the reverse conveyance roller pair 51 is switched is shortened and the sheet interval at the time of duplex printing can be reduced, productivity can be increased.

Further, the reverse conveyance unit 200B has a configuration in which the internal holder 207A and the internal stage gear 205 are omitted as compared with the reverse conveyance unit 200A of the fourth embodiment. Therefore, the reverse conveyance unit 200B can be simply configured, and the cost of the drive mechanism 90D can be reduced.

Sixth Embodiment

Next, a printer 1E (see FIG. 9) according to a sixth embodiment of the present invention will be described. A printer 1E serving as an image forming apparatus has a schematic configuration same as that of the printer 1A according to the second embodiment, but a drive mechanism for driving a discharge reverse conveyance triple roller 55 and a guide member 71 is different from the drive mechanism 90A of the second embodiment.

Drive Mechanism

Figure 24A:
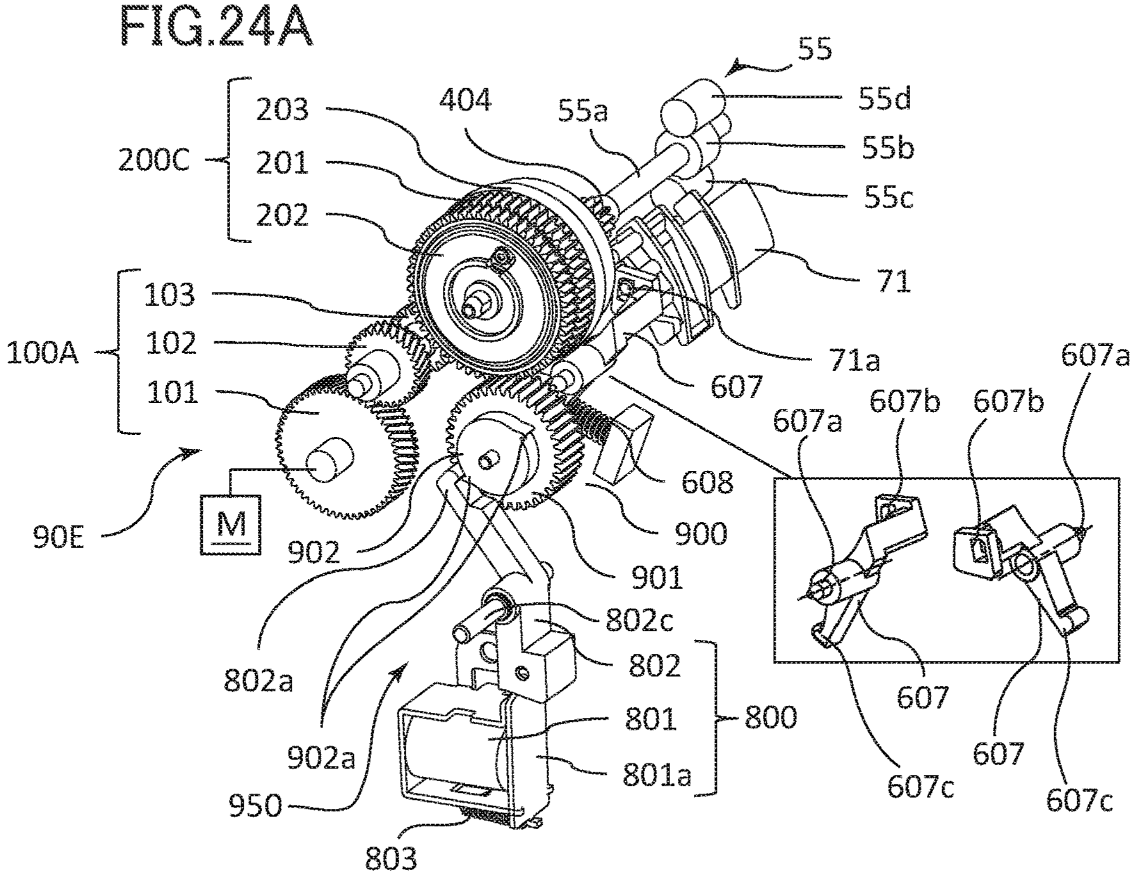
FIG. 24A is a perspective view illustrating a drive mechanism according to a sixth embodiment.
Figure 24B:
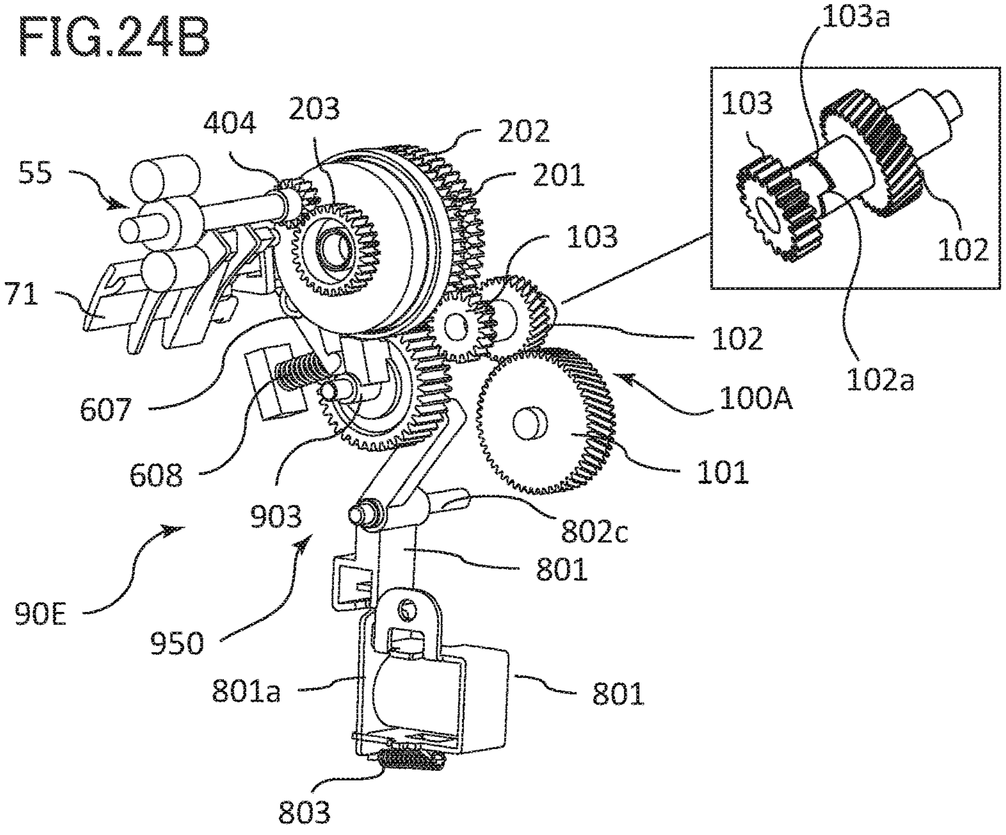
FIG. 24B is another perspective view illustrating the drive mechanism according to the sixth embodiment.

A drive mechanism 90E for driving the discharge reverse conveyance triple roller 55 and the guide member 71 will be described. As illustrated in FIGS. 24A and 24B, the drive mechanism 90E includes a drive motor M, a discharge reverse conveyance input gear train 100A, a reverse conveyance unit 200C, an intermediate lever 607, a solenoid unit 800, and a planetary gear unit 900.

The discharge reverse conveyance input gear train 100A is driven by the drive motor M via a gear train (not illustrated). The reverse conveyance unit 200C is driven by the discharge reverse conveyance input gear train 100A, and outputs driving force to a triple roller gear 404 and the planetary gear unit 900. The intermediate lever 607 is rotatably supported about a rotation shaft 607*a*. An engagement portion 607*b* engageable with a boss portion 71*a* of the guide member 71 is provided at one end portion of the intermediate lever 607, and a contact portion 607*c* which can be in contact with a planetary output gear lever 903 described later is provided at the other end portion of the intermediate lever 607. The intermediate lever 607 is biased by a lever return spring 608 such that the contact portion 607*c* presses the planetary output gear lever 903. The driving force transmitted to the planetary gear unit 900 is transmitted to the intermediate lever 607 via the planetary output gear lever 903, and thus, the guide member 71 is driven.

Next, the discharge reverse conveyance input gear train 100A, the reverse conveyance unit 200C, the solenoid unit 800, and the planetary gear unit 900 will be described in more detail. The discharge reverse conveyance input gear train 100A includes a first discharge reverse conveyance input gear 101, a second discharge reverse conveyance input gear 102, and a third discharge reverse conveyance input gear 103. The first discharge reverse conveyance input gear 101 is driven by the drive motor M and meshes with the second discharge reverse conveyance input gear 102. The third discharge reverse conveyance input gear 103 has a recess 103*a* engaged with a protrusion 102*a* of the second discharge reverse conveyance input gear 102, and rotates integrally with the second discharge reverse conveyance input gear 102 by engagement of the protrusion 102*a* and the recess 103*a*.

The reverse conveyance unit 200C serving as a drive switching unit includes a reverse conveyance input gear 201, a reverse conveyance switching gear 202, and a reverse conveyance output gear 203. As described in the first embodiment, the reverse conveyance unit 200C can output the forward rotation or the reverse rotation (clockwise or counterclockwise) by switching the rotation state of the reverse conveyance switching gear 202. A triple roller gear 404 meshes with the reverse conveyance output gear 203, and the triple roller gear 404 is fixed to the drive shaft 55*a* of the driving roller 55*b* of the discharge reverse conveyance triple roller 55. Therefore, when the triple roller gear 404 rotates, the discharge reverse conveyance triple roller 55 rotates.

The solenoid unit 800 includes a solenoid 801, a solenoid arm 801*a*, a solenoid lever 802, and an arm spring 803. The solenoid arm 801*a* is rotated when the solenoid 801 is shifted between a power failure state and an energized state. The solenoid lever 802 is rotatably supported about a rotation shaft 802*c*, and one end 802*b* is engaged with the solenoid arm 801*a*. A locking claw 802*a* capable of locking a locked claw 902*a* of the planetary sun gear 902 to be described later is provided at the other end of the solenoid lever 802.

When the solenoid 801 is in the power failure state, the solenoid arm 801*a* is positioned while being biased by the arm spring 803, and the solenoid lever 802 is at a position where the locking claw 802*a* is separated from the locked claw 902*a* of the planetary sun gear 902. When the solenoid 801 is in the energized state, the solenoid arm 801*a* is driven by the solenoid 801, and the solenoid lever 802 engaged with the solenoid arm 801*a* rotates about the rotation shaft 802*c*. As a result, the solenoid lever 802 is positioned at a position where the locking claw 802*a* is locked to the locked claw 902*a* of the planetary sun gear 902.

The solenoid unit 800 and the planetary gear unit 900 constitute a drive interruption unit 950 capable of transitioning to a transmission state in which the driving force transmitted from a switching unit 360 can be transmitted to the guide member 71 and a non-transmission state in which the driving force is not transmitted to the guide member 71. As described later, the drive interruption unit 950 is in the non-transmission state when the solenoid 801 of the solenoid unit 800 is in the power failure state, and is in the transmission state when the solenoid 801 is in the energized state.

Internal Configuration of Reverse Conveyance Unit

Figure 25A:
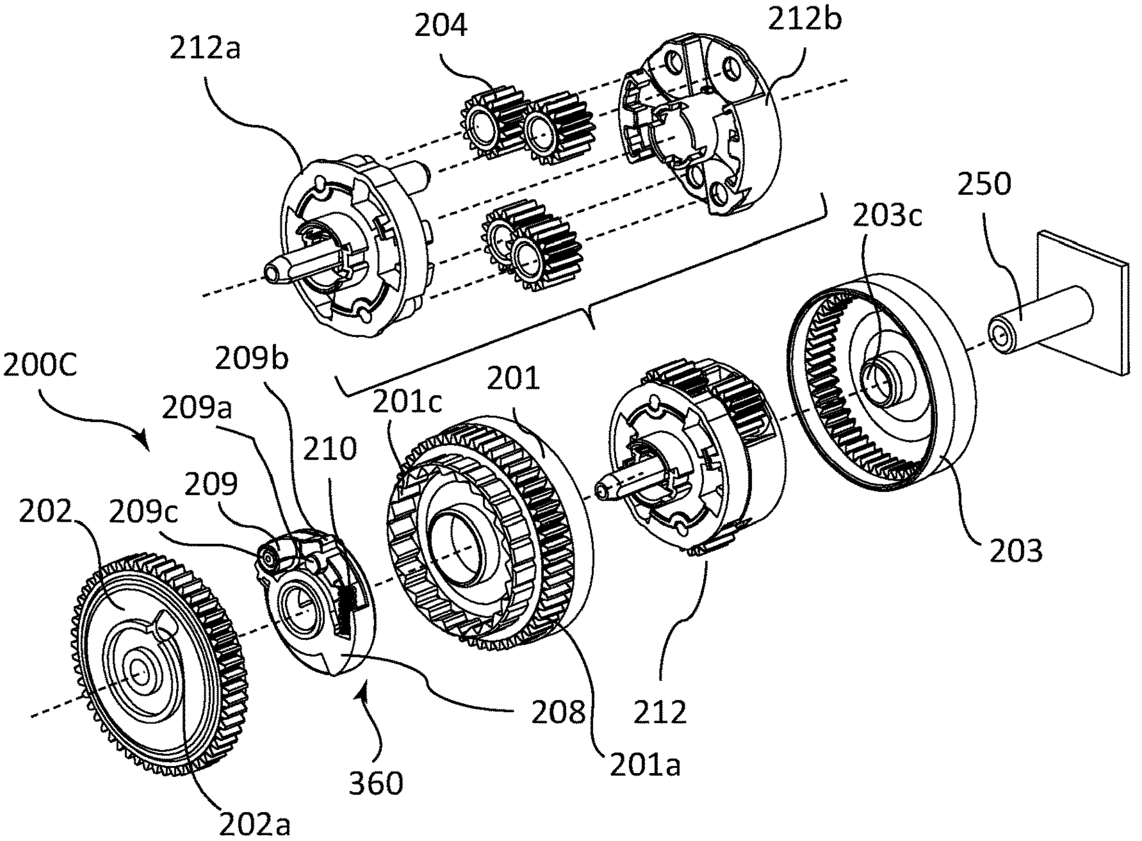
FIG. 25A is an exploded perspective view illustrating a reverse conveyance unit.
Figure 25B:
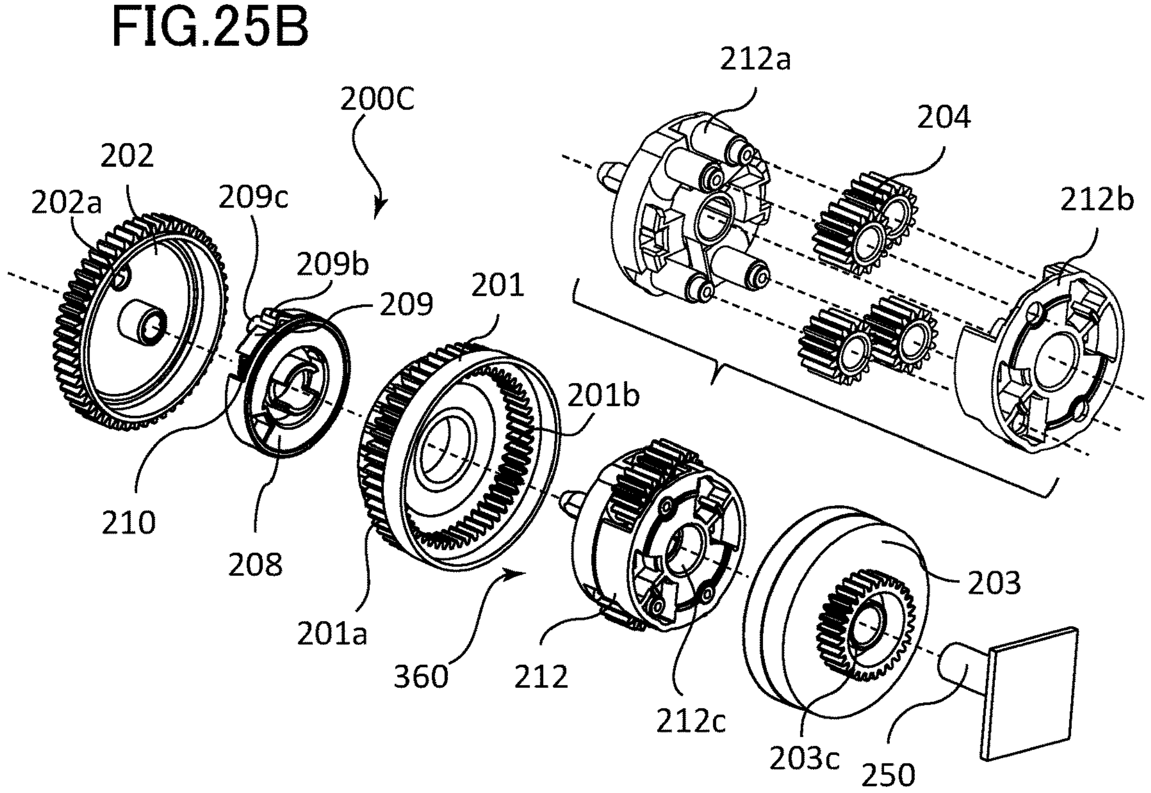
FIG. 25B is another exploded perspective view illustrating the reverse conveyance unit.

Next, an internal configuration of the reverse conveyance unit 200 will be described with reference to FIGS. 25A and 25B. As illustrated in FIGS. 25A and 25B, the reverse conveyance unit 200 includes a reverse conveyance input gear 201, a reverse conveyance switching gear 202, a reverse conveyance output gear 203, a stopper holder 208, and an internal holder unit 212 including an internal idler gear 204. The reverse conveyance input gear 201 is an input member that rotates by receiving the driving force transmitted from the discharge reverse conveyance input gear train 100A described above. The reverse conveyance output gear 203 is an output member that outputs driving force to the triple roller gear 404 that rotates the driving roller 55*b* of the discharge reverse conveyance triple roller 55. The internal idler gear 204 includes two symmetrically arranged gear trains, and is a drive transmission member for transmitting drive from the reverse conveyance input gear 201 to the reverse conveyance output gear 203. The internal holder unit 212 and the stopper holder 208 are connected so as to rotate integrally. As illustrated in FIGS. 25A and 25B, the reverse conveyance input gear 201 includes external teeth 201*a* to which the driving force, that is the rotation, is transmitted from the discharge reverse conveyance input gear train 100A, and internal teeth 201*b* transmitting the driving force, that is the rotation, to the internal idler gear 204. The external teeth 201*a* and the internal teeth 201*b* are constituted of gears same in the number of teeth and different in module, and are disposed in the same plane. In this way, the reverse conveyance input gear 201 is formed in a vertically and horizontally symmetrical shape. Since the external teeth 201*a* and the internal teeth 201*b* are formed symmetric with each other, it is possible to feed a resin in molding the reverse conveyance input gear 201. Thereby, manufacturing accuracy of the reverse conveyance input gear 201 is improved.

The internal holder unit 212 includes a first internal holder 212*a*, a second internal holder 212*b*, and an internal idler gear 204. The internal idler gear 204 is sandwiched and rotatably held between the first internal holder 212*a* and the second internal holder 212*b*. The internal holder unit 212 rotatably holds the reverse conveyance input gear 201, and has a support shaft that rotatably supports the reverse conveyance switching gear 202 and the internal idler gear 204.

The stopper holder 208 holds a locking lever 209 and a pressing spring 210. The locking lever 209 is rotatably supported about a rotation shaft 209*c* with respect to the stopper holder 208. The locking lever 209 includes a protrusion 209*a* engageable with the hole 202*a* formed in the reverse conveyance switching gear 202, and a locking portion 209*b* engageable with a locked portion 201*c* of the reverse conveyance input gear 201. The locking lever 209 is movable to an engagement position where the locking portion 209*b* is engaged with the locked portion 201*c* of the reverse conveyance input gear 201 and a non-engagement position where the locking portion 209*b* is not engaged with the locked portion 201*c*. The reverse conveyance switching gear 202, the stopper holder 208, the internal holder unit 212, the locking lever 209, and the pressing spring 210 constitute a switching unit 360 that outputs the driving force transmitted from the reverse conveyance input gear 201 to the reverse conveyance output gear 203.

The pressing spring 210 biases the locking lever 209 toward the engagement position. When the reverse conveyance input gear 201 is locked by the locking lever 209 located at the engagement position, the reverse conveyance input gear 201, the stopper holder 208, and the internal holder unit 212 are integrated. In this case, the switching unit 360 is in the first state, and outputs the driving force to the reverse conveyance output gear 203 so that the driving roller 55*b* of the discharge reverse conveyance triple roller 55 rotates in the second rotation direction RR2 (see FIG. 28B).

The reverse conveyance switching gear 202 is configured to control the operation of the locking lever 209 according to its own rotation state. When the locking lever 209 is located at the non-engagement position and the reverse conveyance switching gear 202 is stopped by an external force, the switching unit 360 is in the second state. In the second state, the switching unit 360 outputs the driving force to the reverse conveyance output gear 203 so that the driving roller 55*b* of the discharge reverse conveyance triple roller 55 rotates in the first rotation direction RR1 (see FIG. 29B).

Further, the reverse conveyance unit 200C is configured such that a discharge frame shaft 250 provided in a discharge frame (not illustrated) is engaged with the hole 212*c* of the internal holder unit 212 and the hole 203*c* of the reverse conveyance output gear 203 to be rotatably supported.

The meshing relationship among the reverse conveyance input gear 201, the reverse conveyance output gear 203, and the internal idler gear 204 in the reverse conveyance unit 200C is the same operation as in the first to third embodiments, and thus the description thereof will be omitted.

Internal Configuration of Planetary Gear Unit

Figure 26A:
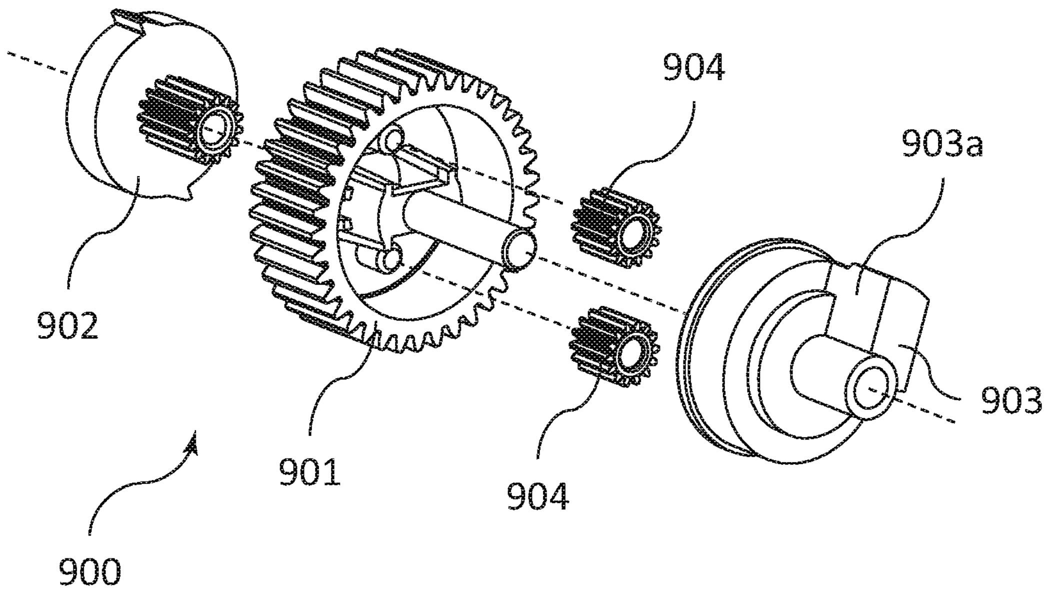
FIG. 26A is an exploded perspective view illustrating a planetary gear unit.
Figure 26B:
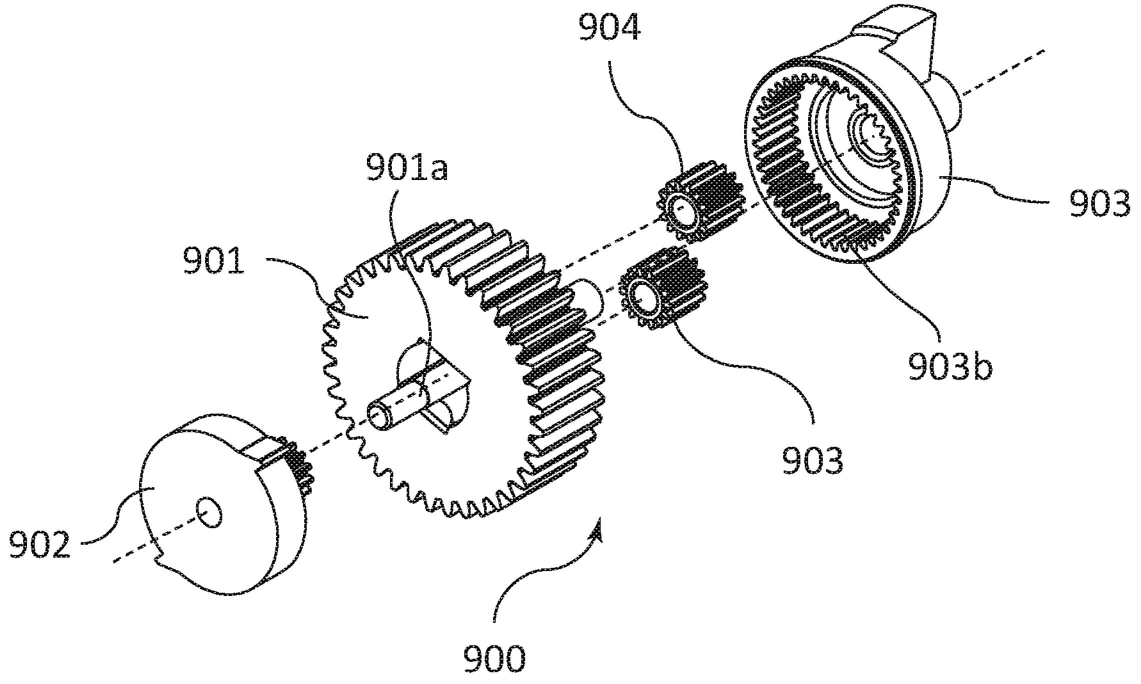
FIG. 26B is another exploded perspective view illustrating the planetary gear unit.

Next, an internal configuration of the planetary gear unit 900 will be described with reference to FIGS. 26A and 26B. As illustrated in FIGS. 26A and 26B, the planetary gear unit 900 includes a planetary input gear 901, a planetary sun gear 902, a planetary output gear lever 903, and a planetary gear 904.

The planetary input gear 901 serving as a first rotating element is an input member that rotates by receiving the driving force transmitted from the reverse conveyance switching gear 202 described above. The planetary output gear lever 903 serving as a third rotating element is an output member that outputs the driving force by bringing the lever portion 903*a* into contact with the contact portion 607*c* (see FIG. 24A) of the intermediate lever 607. The planetary gear 904 includes a pair of symmetrically disposed gears, and is a drive transmission member for transmitting drive from the planetary input gear 901 to the planetary output gear lever 903. The planetary input gear 901 has support shafts that rotatably support the planetary sun gear 902, the planetary output gear lever 903, and the planetary gear 904, and is configured to rotatably hold each gear.

The planetary gear 904 is rotatably disposed on a pair of support shafts provided in the planetary input gear 901, is inserted into the central axis 901*a* of the planetary input gear 901, and meshes with the planetary sun gear 902 serving as a second rotating element. The planetary gear 904 meshes with an internal tooth gear 903*b* provided on the planetary output gear lever 903. That is, the driving force of the planetary input gear 901 is transmitted to the planetary output gear lever 903 via the planetary sun gear 902, the pair of planetary gears 904, and the internal tooth gear 903*b*. The rotation of the planetary sun gear 902 can be restricted by a solenoid unit 800 serving as a restriction unit.

Drive Switching Operation of Planetary Gear Unit

Figure 27A:
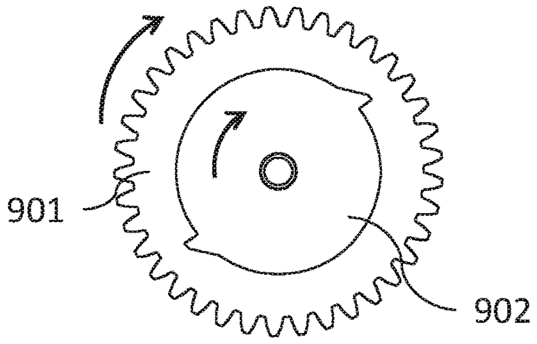
FIG. 27A is a front view illustrating the planetary gear unit when a planetary sun gear is in a rotation state.
Figure 27E:
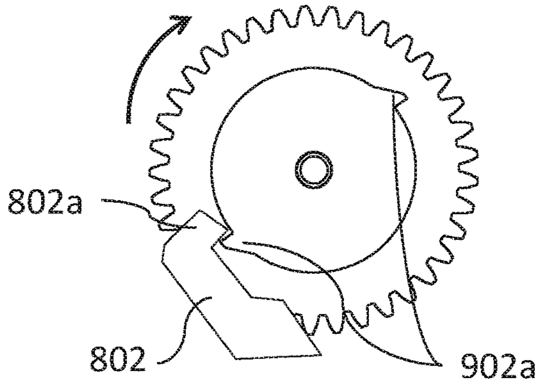
FIG. 27E is a front view illustrating the planetary gear unit when the planetary sun gear is in a stopped state.
Figure 27B:
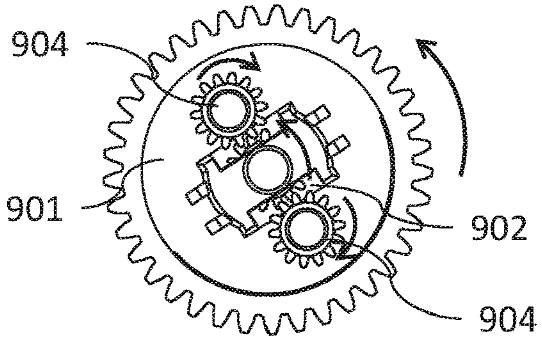
FIG. 27B is a rear view illustrating the planetary gear unit when the planetary sun gear is in a rotation state.
Figure 27F:
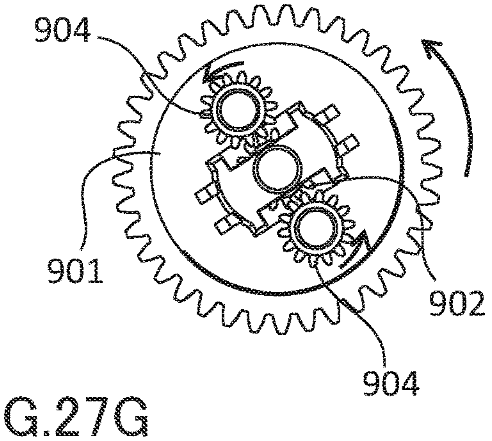
FIG. 27F is a rear view illustrating the planetary gear unit when the planetary sun gear is in the stopped state.
Figure 27C:
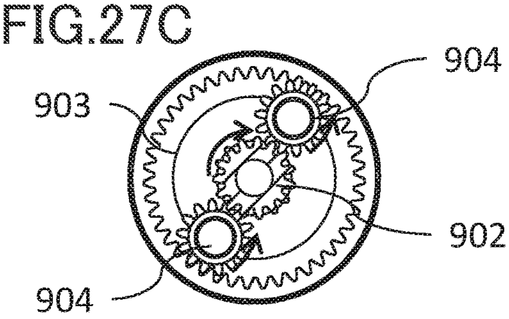
FIG. 27C is a front view illustrating the planetary gear unit in which a planetary input gear and the planetary sun gear are omitted.
Figure 27G:
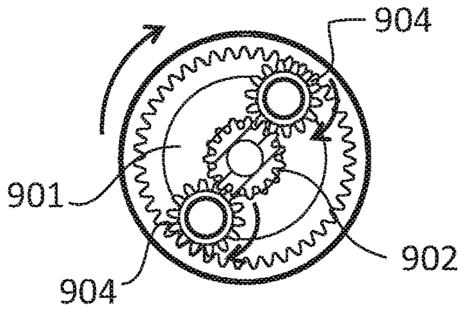
FIG. 27G is a front view illustrating the planetary gear unit in which the planetary input gear and the planetary sun gear are omitted.
Figure 27D:
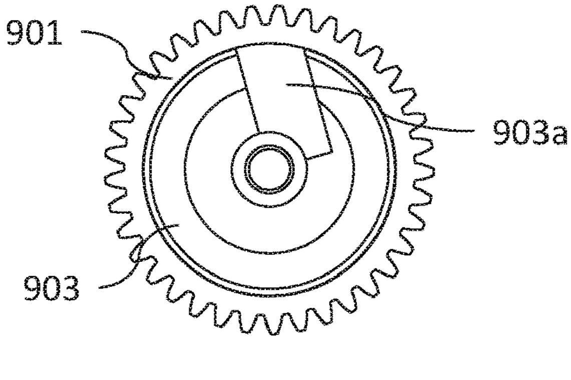
FIG. 27D is a rear view illustrating the planetary gear unit.
Figure 27H:
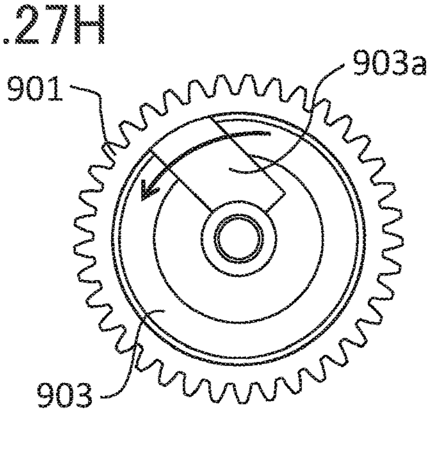
FIG. 27H is a rear view illustrating the planetary gear unit.

Next, a drive switching operation of the planetary gear unit 900 will be described with reference to FIGS. 27A to 27H. FIGS. 27A to 27D are views illustrating when the planetary sun gear 902 is not locked to the solenoid lever 802 and is in a rotation state, and FIGS. 27E to 27H are views illustrating when the planetary sun gear 902 is locked to the solenoid lever 802 and is in a stopped state. FIGS. 27A and 27E are front views of the planetary gear unit 900, and FIGS. 27B and 27F are rear views of the planetary gear unit 900 in which the planetary output gear lever 903 is omitted. FIGS. 27C and 27G are front views of the planetary gear unit 900 in which the planetary input gear 901 and the planetary sun gear 902 are omitted, and FIGS. 27D and 27H are rear views of the planetary gear unit 900.

As illustrated in FIGS. 27A to 27D, when the planetary sun gear 902 is not locked by the solenoid lever 802, the planetary output gear lever 903 is pressed by the intermediate lever 607 biased by a lever return spring 608 and stops at a first lever position. The driving force transmitted to the planetary input gear 901 is transmitted to the planetary sun gear 902 via the planetary gear 904 because the planetary output gear lever 903 is stopped. When the driving force is transmitted to the planetary sun gear 902 to rotate, the planetary output gear lever 903 can be kept stopped at the first lever position. In this case, the guide member 71 is located at the first position (the position indicated by the broken line in FIG. 9).

In other words, in a state where the rotation of the planetary sun gear 902 is not restricted by the solenoid unit 800, the rotation of the planetary input gear 901 is transmitted to the planetary sun gear 902 via the planetary gear 904, and thus, the drive interruption unit 950 is in a non-transmission state.

As illustrated in FIGS. 27E to 27H, when the locked claw 902*a* of the planetary sun gear 902 is locked by the locking claw 802*a* of the solenoid lever 802, the planetary sun gear 902 is stopped. The driving force transmitted to the planetary input gear 901 is transmitted to the planetary output gear lever 903 via the planetary gear 904. The driving force is transmitted to the planetary output gear lever 903 and the planetary output gear lever 903 rotates to rotate the intermediate lever 607. As the intermediate lever 607 rotates, the guide member 71 is moved from the first position to the second position (the position indicated by the solid line in FIG. 9).

In other words, in a state where the rotation of the planetary sun gear 902 is restricted by the solenoid unit 800, the rotation of the planetary input gear 901 is transmitted to the planetary output gear lever 903 via the planetary gear 904, and thus, the drive interruption unit 950 is in the transmission state.

Operation of Discharge Reverse Conveyance Triple Roller and Guide Member

Figure 28A:
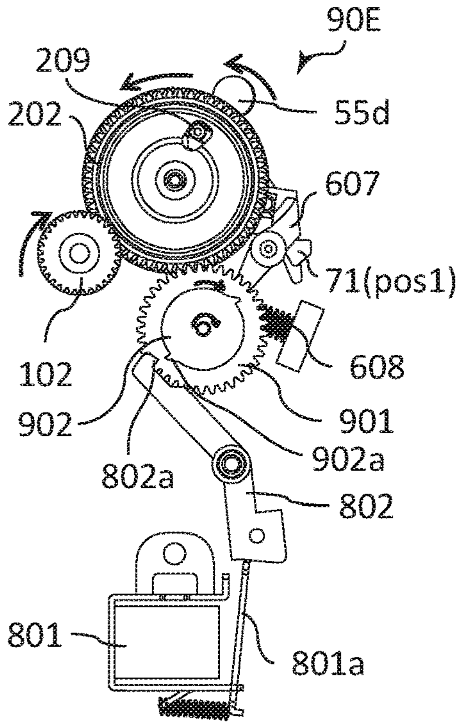
FIG. 28A is a front view illustrating a drive mechanism in which a solenoid is in a power failure state.
Figure 28C:
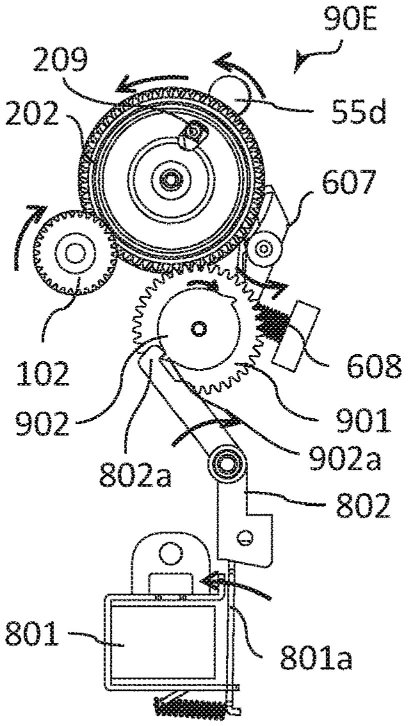
FIG. 28C is a front view illustrating the drive mechanism when the solenoid is switched from the power failure state to an energized state.
Figure 28B:
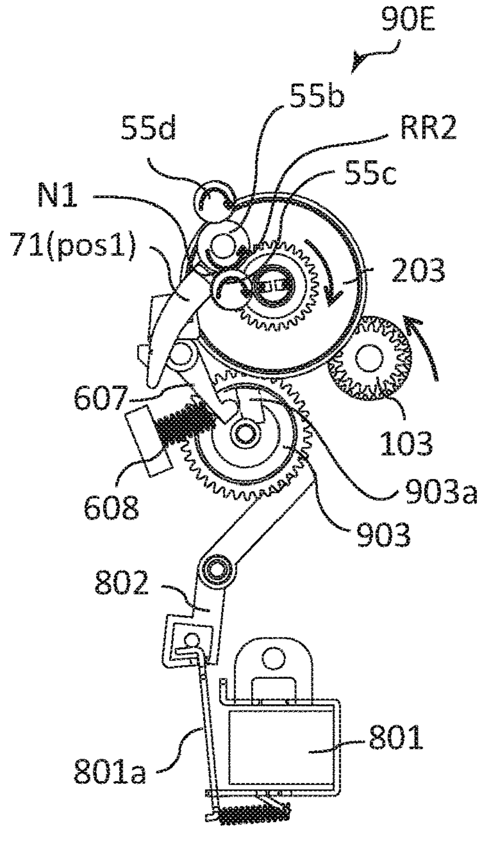
FIG. 28B is a rear view illustrating the drive mechanism in which the solenoid is in the power failure state.
Figure 28D:
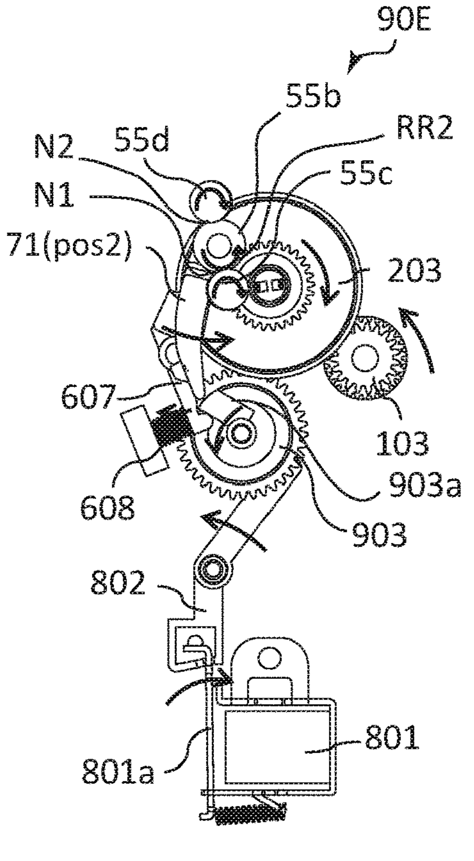
FIG. 28D is a rear view illustrating the drive mechanism when the solenoid is switched from the power failure state to the energized state.
Figure 29A:
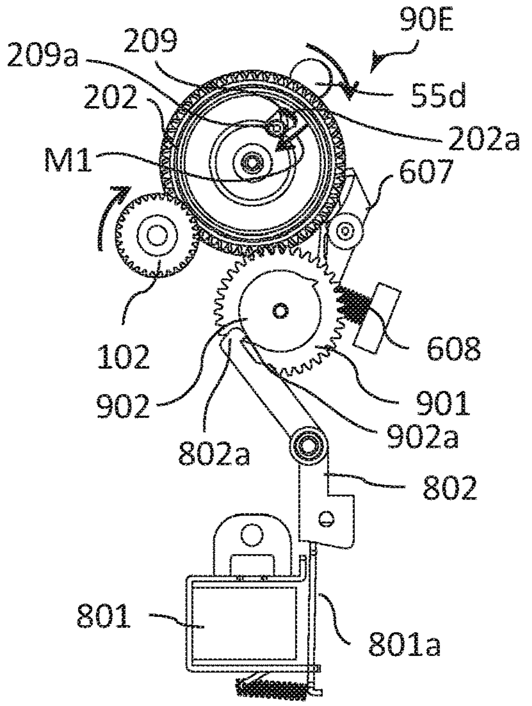
FIG. 29A is a front view illustrating a drive mechanism in which the solenoid is in the energized state.
Figure 29C:
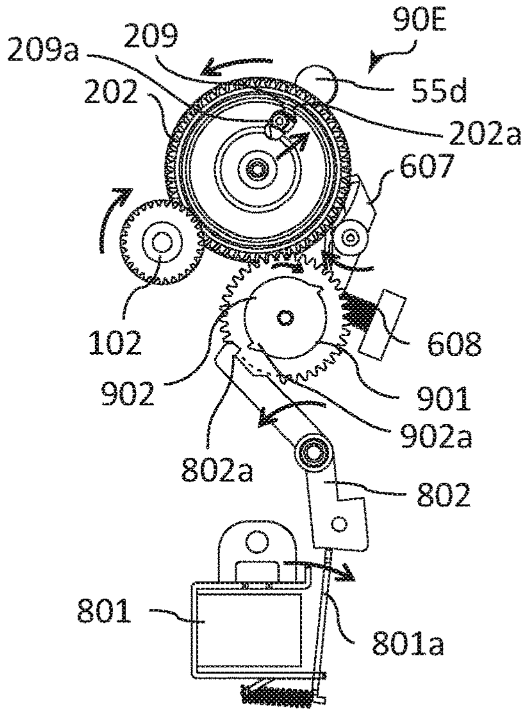
FIG. 29C is a front view illustrating a drive mechanism when the solenoid is switched from the energized state to the power failure state.
Figure 29B:
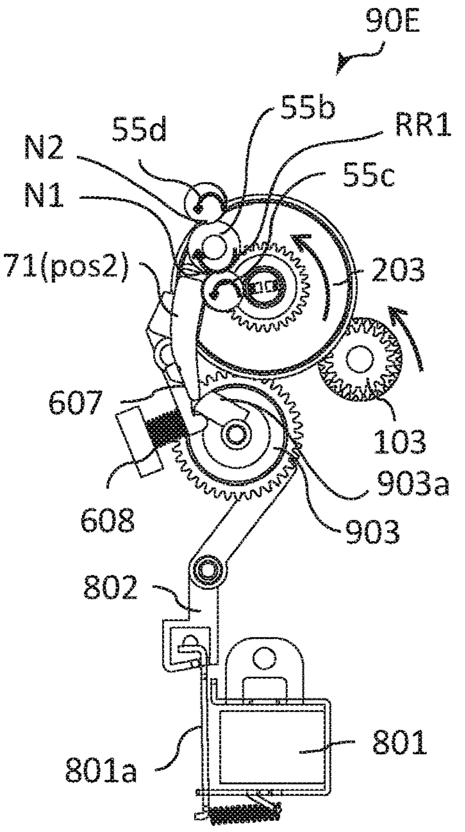
FIG. 29B is a rear view illustrating the drive mechanism in which the solenoid is in the energized state.
Figure 29D:
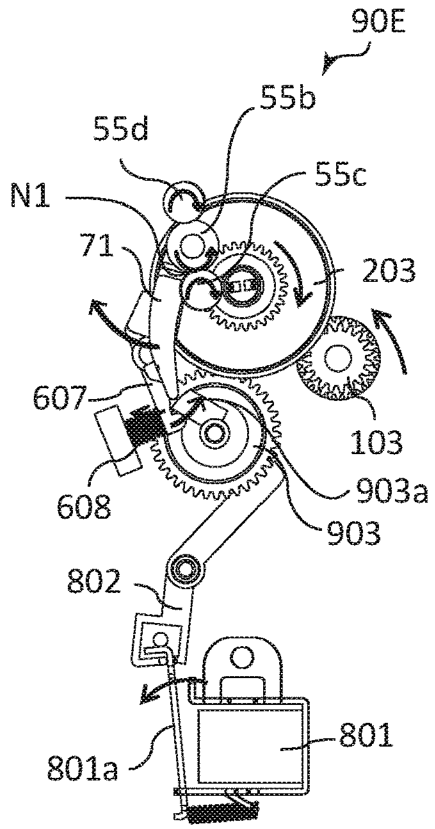
FIG. 29D is a rear view illustrating the drive mechanism when the solenoid is switched from the energized state to the power failure state.

Next, operations of the discharge reverse conveyance triple roller 55 and the guide member 71 when the sheet S is switched back will be described with reference to FIGS. 28A to 29D. FIGS. 28A and 28B are a front view and a rear view, respectively, illustrating the drive mechanism 90E in which the solenoid 801 is in a power failure state. FIGS. 28C and 28D are a front view and a rear view, respectively, illustrating the drive mechanism 90E when the solenoid 801 is switched from the power failure state to the energized state. FIGS. 29A and 29B are a front view and a rear view, respectively, illustrating the drive mechanism 90E in which the solenoid 801 is in the energized state. FIGS. 29C and 29D are a front view and a rear view, respectively, illustrating the drive mechanism 90E when the solenoid 801 is switched from the energized state to the power failure state.

In the following description, for example, the printing operation is executed to drive the drive motor M, and the discharge reverse conveyance input gear train 100A and the reverse conveyance input gear 201 are rotated by the driving force of the drive motor M.

As illustrated in FIGS. 28A and 28B, when the solenoid 801 is in a power failure state, the discharge reverse conveyance triple roller 55 rotates in the direction illustrated in the drawing. The sheet S can be discharged toward the sheet discharge tray 54 by the discharge nip N1 of the discharge reverse conveyance triple roller 55, and the rotation direction of the discharge reverse conveyance triple roller 55 at this time is defined as a backward rotation direction. A rotation direction of the discharge reverse conveyance triple roller 55 when the sheet S is conveyed in the first direction D1 (see FIG. 10B) by the reverse conveyance nip N2 of the discharge reverse conveyance triple roller 55 is defined as a forward rotation direction.

When the solenoid 801 is in the power failure state, the locking claw 802*a* of the solenoid lever 802 is separated from the locked claw 902*a* of the planetary sun gear 902, and thus, the planetary sun gear 902 can freely rotate. Meanwhile, the planetary output gear lever 903 is pressed by the intermediate lever 607 biased by the lever return spring 608 and stopped at the first lever position. Therefore, the driving force transmitted from the reverse conveyance switching gear 202 to the planetary input gear 901 is transmitted to the planetary sun gear 902, and the planetary sun gear 902 idles.

Since the planetary output gear lever 903 remains at the first lever position, the intermediate lever 607 and the guide member 71 are also stopped. That is, the guide member 71 is located at a first position (denoted as Pos1 in the drawings) where the sheet S is guided to the discharge nip N1 of the discharge reverse conveyance triple roller 55. When the single-sided printing mode is executed and when the sheet S is discharged in the double-sided printing mode, the push solenoid 701 is in the power failure state.

When the sheet S is conveyed to the reverse conveyance path R2 in the double-sided printing mode, the signal of the solenoid 801 is switched from OFF to ON as illustrated in FIGS. 28C and 28D. When the signal of the solenoid 801 is switched from OFF to ON, the solenoid 801 is changed from the power failure state to the energized state. As a result, the solenoid arm 801*a* is driven against the biasing force of the arm spring 803. Then, the locking claw 802*a* of the solenoid lever 802 interlocked with the solenoid arm 801*a* locks the locked claw 902*a* of the planetary sun gear 902, and the planetary sun gear 902 is stopped. As a result, the driving force input to the planetary input gear 901 is transmitted to the planetary output gear lever 903.

The planetary output gear lever 903 receiving the driving force rotates from the first lever position to the second lever position, and the lever portion 903*a* presses the contact portion 607*c* of the intermediate lever 607 to rotate the intermediate lever 607. When the intermediate lever 607 rotates, the guide member 71 engaged with the intermediate lever 607 rotates from the first position to the second position (denoted as Pos2 in the drawing) for guiding the sheet S to the reverse conveyance nip N2 of the discharge reverse conveyance triple roller 55. After rotating to the second position, the guide member 71 abuts on a frame (not illustrated) to be held at the second position. While the guide member 71 rotates from the first position to the second position, the rotation of the reverse conveyance switching gear 202 is not restricted and rotates integrally with the reverse conveyance input gear 201. That is, the discharge reverse conveyance triple roller 55 remains rotated in the backward rotation direction in which the sheet S is conveyed to the outside of the apparatus by the discharge nip N1.

As illustrated in FIGS. 29A and 29B, when the solenoid 801 is in the energized state and the guide member 71 is stopped at the second position, the intermediate lever 607 is in a state in which the planetary gear unit 900 and the reverse conveyance switching gear 202 are stopped. When the locking lever 209 rotates together with the reverse conveyance input gear 201 in this state, the protrusion 209*a* of the locking lever 209 moves in the direction of an arrow M1 along an edge of the hole 202*a* of the reverse conveyance switching gear 202 in the stopped state.

As a result, the locking lever 209 rotates about the rotation shaft 209*c* from the engagement position to the non-engagement position against the biasing force of the pressing spring 210 (see FIG. 25B). Then, as described in the first embodiment, the reverse conveyance unit 200 is switched from the forward rotation state to the backward rotation state, and the rotation direction of the reverse conveyance output gear 203 is switched. Therefore, the rotation directions of the triple roller gear 404 meshing with the reverse conveyance output gear 203 and the discharge reverse conveyance triple roller 55 are also switched in conjunction with each other. As a result, the discharge reverse conveyance triple roller 55 rotates in the forward rotation direction. As a result, the sheet S is guided to the reverse conveyance path R2 by the guide member 71 located at the second position, and is conveyed in the first direction D1 by the reverse conveyance nip N2 of the discharge reverse conveyance triple roller 55 as illustrated in FIG. 10B.

When the trailing edge of the sheet S passes through the guide member 71, the signal of the solenoid 801 is switched from ON to OFF as illustrated in FIGS. 29C and 29D. When the signal of the solenoid 801 is switched from ON to OFF, the solenoid 801 changes from the energized state to the power failure state. As a result, the solenoid arm 801*a* returns to the initial position by the biasing force of the arm spring 803. Then, the locking claw 802*a* of the solenoid lever 802 interlocked with the solenoid arm 801*a* is separated from the locked claw 902*a* of the planetary sun gear 902, and the planetary sun gear 902 is freely rotatable. As a result, the driving force input to the planetary input gear 901 is transmitted to the planetary sun gear 902, and transmission of the driving force to the planetary output gear lever 903 is suppressed.

Therefore, the intermediate lever 607 rotates by the biasing force of the lever return spring 608, and the guide member 71 interlocked with the intermediate lever 607 rotates from the second position to the first position. When the guide member 71 starts to rotate, the reverse conveyance switching gear 202 changes from the stopped state to the rotation state, and the locking lever 209 rotates from the engaged position to the engagement position (see FIG. 25B).

Then, as described in the first embodiment, the reverse conveyance unit 200 is switched from the backward rotation state to the forward rotation state, and the rotation direction of the reverse conveyance output gear 203 is switched. Therefore, the rotation directions of the triple roller gear 404 meshing with the reverse conveyance output gear 203 and the discharge reverse conveyance triple roller 55 are also switched in conjunction with each other. As a result, the discharge reverse conveyance triple roller 55 rotates in the backward rotation direction, and conveys the sheet S in the second direction D2 (see FIGS. 10C and 10D) by the reverse conveyance nip N2. Therefore, the sheet S is switched back, and the sheet S is guided to the duplex conveyance path R3 by the guide member 71 located at the first position.

Effects of Sixth Embodiment

As described above, the drive mechanism 90E according to the present embodiment is a mechanism that drives the discharge reverse conveyance triple roller 55 and the guide member 71 using the driving force of the drive motor M. The effects of the present embodiment are similar to those of the third embodiment. That is, while the rotation direction of the discharge reverse conveyance triple roller 55 is switched after the signal of the solenoid 801 is switched, the stopped state of the discharge reverse conveyance triple roller 55 is as short as possible. Since the time for switching the rotation direction of the discharge reverse conveyance triple roller 55 is shortened and the sheet interval at the time of duplex printing can be reduced, productivity can be improved.

Modification of Sixth Embodiment

In the present embodiment, the configuration in which two planetary gears 904 of the planetary gear unit 900 are arranged is used, but a configuration in which one or three or more planetary gears 904 are arranged may be used.

In the present embodiment, the configuration in which the planetary sun gear 902 is locked by the locking claw 802*a* of the solenoid lever 802 is used, but a configuration in which the planetary sun gear 902 may be directly locked by the claw of the solenoid arm 801*a* of the solenoid 801 may be used.

In the present embodiment, the configuration in which the driving force of the planetary output gear lever 903 is transmitted to the guide member 71 via the intermediate lever 607, but a configuration in which the driving force of the planetary output gear lever 903 may be directly transmitted to the guide member 71 may be used.

In the present embodiment, the configuration in which the sheet S is conveyed by the discharge reverse conveyance triple roller 55 is used, but a configuration in which the sheet discharge roller pair and the reverse conveyance roller pair are arranged may be used.

Figure 30A:
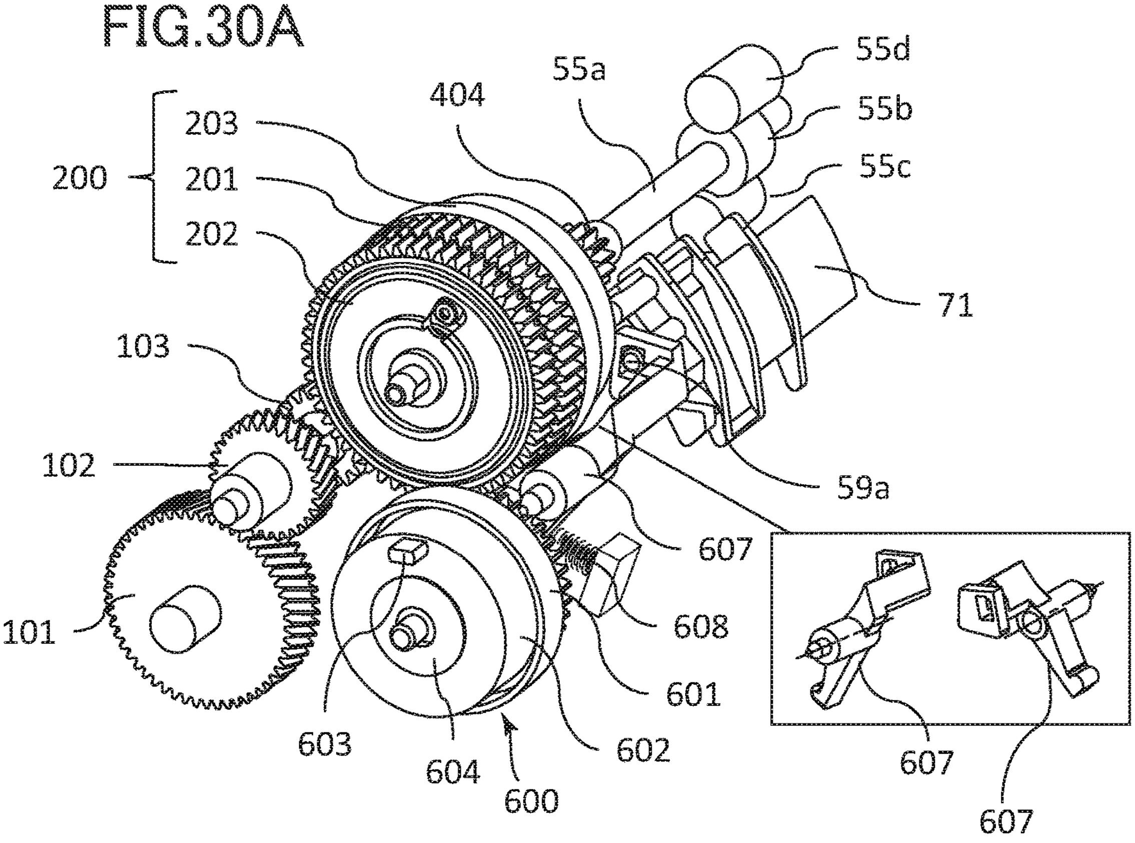
FIG. 30A is a perspective view illustrating a drive mechanism according to a first modification of the sixth embodiment.
Figure 30B:
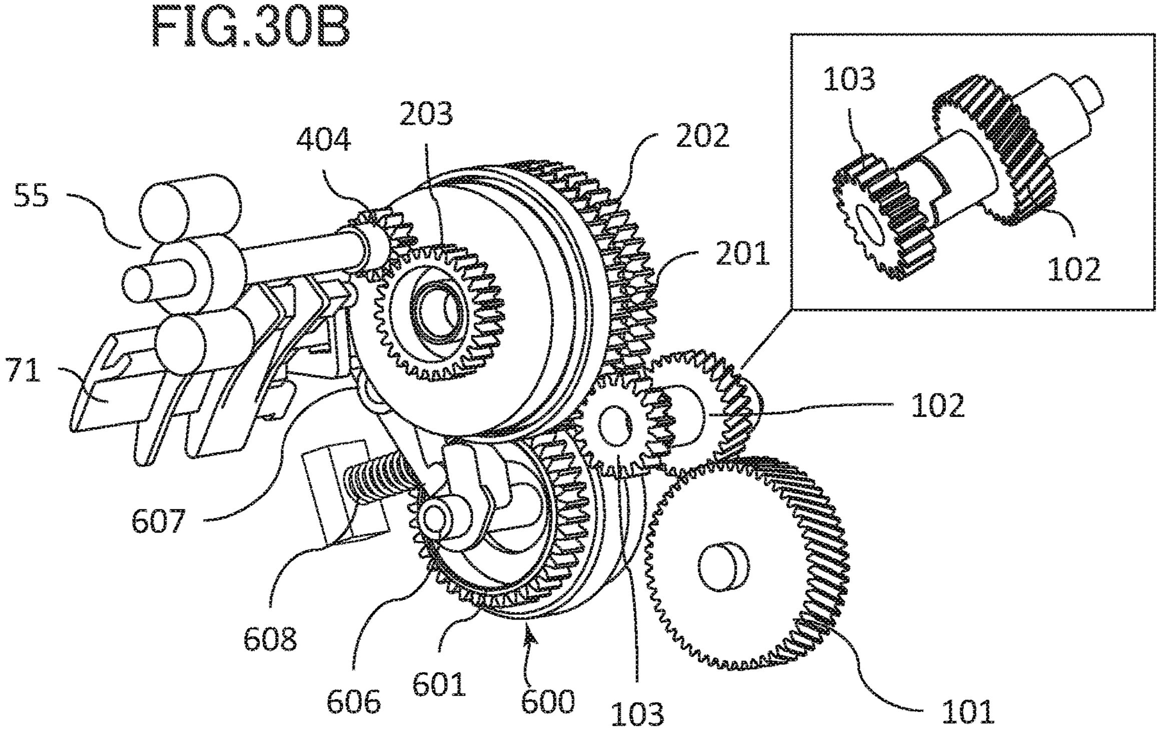
FIG. 30B is another perspective view illustrating the drive mechanism according to the first modification of the sixth embodiment.

In the present embodiment, the configuration in which the driving force transmitted to the guide member 71 is switched by the planetary gear unit 900 and the solenoid unit 800, but the present invention is not limited thereto. For example, as illustrated in FIGS. 30A and 30B, a configuration in which the driving force transmitted to the guide member 71 is switched using the clutch unit 600 may be used. Since the clutch unit 600 has been described in the first embodiment, the description thereof will be omitted.

Figure 31A:
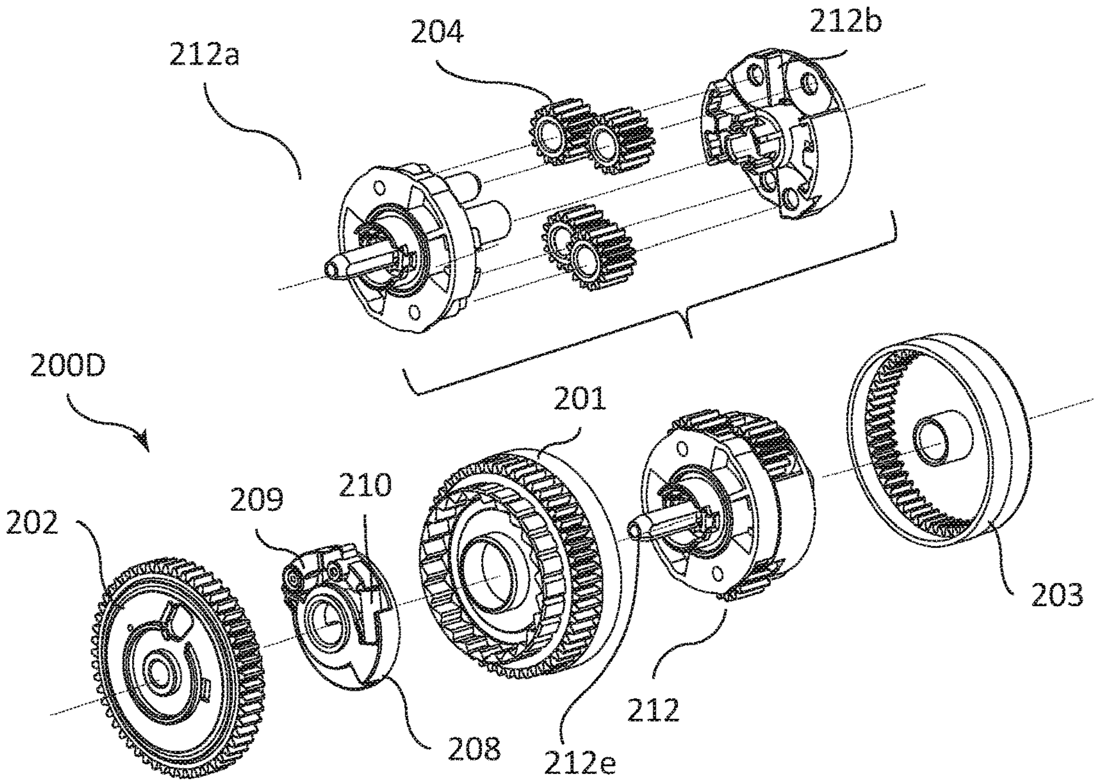
FIG. 31A is a perspective view illustrating a reverse conveyance unit according to a second modification of the sixth embodiment.
Figure 31B:
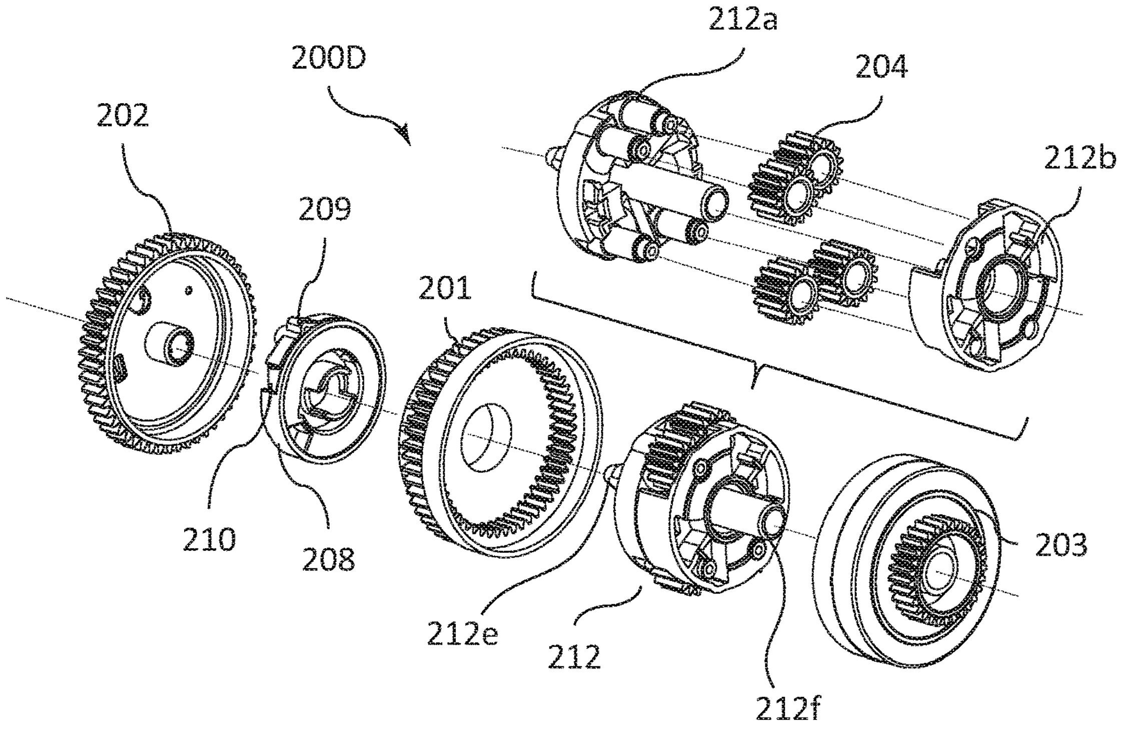
FIG. 31B is another perspective view illustrating the reverse conveyance unit according to the second modification of the sixth embodiment.

Further, in the present embodiment, the configuration in which the rotation direction of the discharge reverse conveyance triple roller 55 is switched by the reverse conveyance unit 200C is used, but a configuration in which a reverse conveyance unit 200D as illustrated in FIGS. 31A and 31B is arranged may be used. The reverse conveyance unit 200D has a different configuration of supporting the unit with respect to the reverse conveyance unit 200C. The internal holder unit 212 rotatably holds the reverse conveyance input gear 201 and has support shafts of the reverse conveyance switching gear 202, the internal idler gear 204, and the reverse conveyance output gear 203. The reverse conveyance unit 200C supports the unit with the discharge frame shaft 250 and the support shaft of the internal holder unit 212. Meanwhile, the reverse conveyance unit 200D is provided with two shafts 212*e* and 212*f* extending from the internal holder unit 212 to both ends, and the reverse conveyance unit 200D is supported by the two shafts 212*e* and 212*f*.

Other Embodiments

Although the embodiments of the present invention are described above, the present invention is not limited to the above-described first to sixth embodiments. In addition, the effects described in the embodiments of the present invention merely enumerate the most suitable effects resulting from the present invention, and the effects according to the present invention are not limited to those described in the embodiments of the present invention.

In any of the embodiments described above, the electrophotographic image forming process has been described as an example of the image forming unit that forms an image on the sheet S. However, the present invention is not limited thereto. For example, as an image forming unit that forms an image on the sheet S, an inkjet image forming process that forms an image by ejecting ink liquid from a nozzle may be used.

In any of the embodiments described above, the discharge reverse conveyance section of the printer has been described as an example of the sheet conveyance apparatus that switches the conveying direction of the sheet S. However, the present invention is not limited thereto. For example, the sheet conveyance apparatus may be used for another switchback mechanism of the image forming apparatus, or may be used for a switchback mechanism such as an automatic document feeder (ADF) capable of automatically feeding a document or a post-processing apparatus that performs post-processing of a sheet.

In any of the embodiments described above, the configuration in which the reverse conveyance unit drives the guide member that guides the sheet S and the discharge reverse conveyance section that discharges and reverses the sheet S has been described, but the present invention is not limited thereto. For example, the present invention may be applied to a configuration in which a feeding mechanism (lifting and lowering of a stacking plate, lifting and lowering of a feed roller, rotation of a feed roller, and the like) is operated or a configuration in which an image forming process mechanism (such as rotation of a photosensitive drum and a developing roller) is operated by the reverse conveyance unit.

In addition, the configurations described in the above-described embodiments may be appropriately combined.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-043044, filed Mar. 17, 2021, which is hereby incorporated by reference herein in its entirety.

What is claimed is:

1. A sheet conveyance apparatus comprising:

a conveyance section configured to convey a sheet, the conveyance section including a roller rotatable in a first rotation direction and a second rotation direction opposite to the first rotation direction;

a guide member configured to guide the sheet and to move between a first position and a second position different from the first position;

a drive source;

a drive switching unit including an input unit to which a driving force is input from the drive source, an output unit configured to output the driving force to the roller, and a switching unit, the switching unit, in a first state, outputting the driving force transmitted from the input unit to the output unit such that the roller rotates in the second rotation direction, the switching unit, in a second state different from the first state, outputting the driving force transmitted from the input unit to the output unit such that the roller rotates in the first rotation direction; and a drive interruption unit configured to transition between a transmission state in which the driving force transmitted from the switching unit is transmitted to the guide member and a non-transmission state in which the driving force is not transmitted to the guide member, wherein the roller is configured to rotate by the driving force output from the output unit of the drive switching unit while the guide member moves between the first position and the second position, and wherein the switching unit is configured to transition between the first state and the second state based on a transition of a state of the drive interruption unit between the transmission state and the non-transmission state.

2. The sheet conveyance apparatus according to claim 1, wherein the guide member moves from the first position to the second position by the driving force transmitted from the switching unit via the drive interruption unit when the drive interruption unit has transitioned from the non-transmission state to the transmission state.

3. The sheet conveyance apparatus according to claim 1, wherein the switching unit transitions from the first state to the second state based on that the drive interruption unit is in the transmission state and that the guide member moving from the first position to the second position stops at the second position.

4. The sheet conveyance apparatus according to claim 1, wherein the switching unit is maintained in the first state while the drive interruption unit is in the transmission state and the guide member is moving from the first position to the second position.

5. The sheet conveyance apparatus according to claim 1, wherein the switching unit is in the second state in a case where the drive interruption unit is in the transmission state and the guide member is stopped at the second position.

6. The sheet conveyance apparatus according to claim 1, wherein the switching unit transitions from the second state to the first state based on that the drive interruption unit transitions from the transmission state to the non-transmission state and the guide member moves from the second position to the first position.

7. The sheet conveyance apparatus according to claim 1, further comprising a biasing unit configured to bias the guide member to the first position in a case where the drive interruption unit is in the non-transmission state.

8. The sheet conveyance apparatus according to claim 1, wherein the drive source is a motor configured to rotate only in one direction.

9. The sheet conveyance apparatus according to claim 1, wherein the input unit rotates by the drive source, and the switching unit rotates in the same direction and at the same rotational speed as the input unit in the first state.

10. The sheet conveyance apparatus according to claim 9, wherein the switching unit stops in the second state.

11. The sheet conveyance apparatus according to claim 1, wherein the switching unit includes an engaging member engageable with the input unit, the switching unit rotates integrally with the input unit in the first state in a case where the engaging member is engaged with the input unit, and the engaging member is separated from the input unit in a case where the switching unit is in the second state.

12. The sheet conveyance apparatus according to claim 1, wherein the drive source is a first drive source, the sheet conveyance apparatus further comprises a second drive source configured to drive the switching unit, and the switching unit rotates in the same direction and at the same rotational speed as the input unit by a driving force of the second drive source in the first state.

13. The sheet conveyance apparatus according to claim 1, wherein the drive interruption unit is a clutch unit energized to be in the transmission state and not energized to be in the non-transmission state.

14. The sheet conveyance apparatus according to claim 1, wherein the drive interruption unit includes a first ratchet portion, a second ratchet portion configured to engage with the first ratchet portion, and a contact-separation mechanism configured to engage or separate the first ratchet portion with respect to the second ratchet portion, the drive interruption unit being brought into the transmission state by the contact-separation mechanism engaging the first ratchet portion and the second ratchet portion with each other and brought into the non-transmission state by the contact-separation mechanism separating the first ratchet portion and the second ratchet portion from each other.

15. The sheet conveyance apparatus according to claim 1, wherein the drive interruption unit includes a first rotating element configured to rotate in mesh with the switching unit and rotatably support a planetary gear, a second rotating element configured to mesh with the planetary gear, a third rotating element configured to mesh with the planetary gear to transmit a driving force to the guide member, and a restriction unit configured to restrict rotation of the second rotating element, in a state in which the rotation of the second rotating element is not restricted by the restriction unit, the drive interruption unit is brought into the non-transmission state by outputting the rotation of the first rotating element to the second rotating element via the planetary gear, and in a state in which the rotation of the second rotating element is restricted by the restriction unit, the drive interruption unit is brought into the transmission state by transmitting the rotation of the first rotating element to the third rotating element via the planetary gear.

16. The sheet conveyance apparatus according to claim 1, wherein the conveyance section includes a sheet discharge roller pair, and a reverse conveyance roller pair including the roller, the sheet discharge roller pair is configured to rotate in a direction of conveying the sheet toward an inside of the sheet conveyance apparatus in a case where the roller rotates in the second rotation direction, and rotate in a direction of discharging the sheet toward an outside of the sheet conveyance apparatus in a case where the roller rotates in the first rotation direction, and the reverse conveyance roller pair is configured to convey a sheet in a first direction in which the sheet is conveyed toward the inside of the sheet conveyance apparatus in a case where the roller rotates in the second rotation direction, and convey a sheet in a second direction opposite to the first direction in a case where the roller rotates in the first rotation direction.

17. The sheet conveyance apparatus according to claim 1, wherein the conveyance section includes the roller, a first driven roller configured to form a first nip together with the roller, and a second driven roller configured to form a second nip together with the roller, in a case where the roller rotates in the second rotation direction, the conveying unit is configured to convey the sheet toward an inside of the sheet conveyance apparatus at the first nip and conveys the sheet in a first direction in which the sheet is directed to an outside of the sheet conveyance apparatus at the second nip, and in a case where the roller rotates in the first rotation direction, the conveyance section is configured to discharge the sheet to the outside of the sheet conveyance apparatus at the first nip and convey the sheet in a second direction opposite to the first direction at the second nip.

18. The sheet conveyance apparatus according to claim 1, wherein the conveyance section includes the roller and a third driven roller configured to form a third nip together with the roller, and the third nip is configured to convey a sheet in a first direction in which the sheet is directed to an outside of the sheet conveyance apparatus in a case where the roller rotates in the second rotation direction and convey the sheet in a second direction opposite to the first direction in a case where the roller rotates in the first rotation direction.

19. An image forming apparatus comprising:

an image forming unit configured to form an image on a sheet; and the sheet conveyance apparatus according to claim 1 configured to convey the sheet on which the image is formed by the image forming unit.

* * * * *